(12) United States Patent
Oteo et al.

(10) Patent No.: US 11,681,081 B2
(45) Date of Patent: Jun. 20, 2023

(54) SYSTEMS AND METHODS TO REDUCE TEMPERATURE INDUCED DRIFT EFFECTS ON A LIQUID LENS

(71) Applicant: COGNEX CORPORATION, Natick, MA (US)

(72) Inventors: Esther Oteo, Aachen (DE); Andreas Weber, Aachen (DE); Saul Sanz Rodriguez, Aachen (DE); Jens Ruetten, Aachen (DE); Pepe Fernandez-Dorado, Aachen (DE)

(73) Assignee: COGNEX CORPORATION, Natick, MA (US)

( * ) Notice: Subject to any disclaimer, the term of this patent is extended or adjusted under 35 U.S.C. 154(b) by 84 days.

(21) Appl. No.: 17/475,059

(22) Filed: Sep. 14, 2021

(65) Prior Publication Data

US 2021/0405267 A1    Dec. 30, 2021

Related U.S. Application Data

(60) Continuation-in-part of application No. 16/997,289, filed on Aug. 19, 2020, which is a continuation of
(Continued)

(51) Int. Cl.
*G02B 3/14* (2006.01)
*G02B 7/00* (2021.01)
(Continued)

(52) U.S. Cl.
CPC .............. *G02B 3/14* (2013.01); *G02B 7/008* (2013.01); *G02B 7/028* (2013.01); *G02B 7/08* (2013.01); *G02B 26/004* (2013.01)

(58) Field of Classification Search
CPC .......... G02B 3/14; G02B 7/008; G02B 7/028; G02B 7/08; G02B 26/004
See application file for complete search history.

(56) References Cited

U.S. PATENT DOCUMENTS

| 4,838,665 A | 6/1989 | Hasegawa et al. |
| 7,248,796 B2 | 7/2007 | Triteyaprasert et al. |

(Continued)

FOREIGN PATENT DOCUMENTS

| CN | 1499220 A | 5/2004 |
| CN | 1947044 A | 4/2007 |

(Continued)

*Primary Examiner* — James C. Jones
(74) *Attorney, Agent, or Firm* — Quarles & Brady LLP

(57) ABSTRACT

Systems and methods reduce temperature induced drift effects on a liquid lens used in a vision system. A feedback loop receives a temperature value from a temperature sensor, and based on the received temperature value, controls a power to the heating element based on a difference between the measured temperature of the liquid lens and a predetermined control temperature to maintain the temperature value within a predetermined control temperature range to reduce the effects of drift. A processor can also control a bias signal applied to the lens or a lens actuator to control temperature variations and the associated induced drift effects. An image sharpness can also be determined over a series of images, alone or in combination with controlling the temperature of the liquid lens, to adjust a focal distance of the lens.

30 Claims, 24 Drawing Sheets

Related U.S. Application Data application No. 15/375,859, filed on Dec. 12, 2016, now Pat. No. 10,754,071, which is a division of application No. 14/145,185, filed on Dec. 31, 2013, now Pat. No. 9,575,221.

(51) Int. Cl.
*G02B 7/08* (2021.01)
*G02B 7/02* (2021.01)
*G02B 26/00* (2006.01)

(56) References Cited

U.S. PATENT DOCUMENTS

| | | | |
|---|---|---|---|
| 7,264,162 | B2 | 9/2007 | Barkan |
| 7,296,749 | B2 | 11/2007 | Massieu |
| 7,312,929 | B2 | 12/2007 | Choi et al. |
| 7,443,597 | B2 | 10/2008 | Humpston |
| 7,755,841 | B2 | 7/2010 | Christenson et al. |
| 7,911,526 | B2 | 3/2011 | Kageyama |
| 8,164,682 | B2 | 4/2012 | Border et al. |
| 8,487,228 | B2 | 7/2013 | Nunnink |
| 8,576,390 | B1 | 11/2013 | Nunnink |
| 8,864,035 | B2 | 10/2014 | Fukuba |
| 9,575,221 | B2 | 2/2017 | Nunnink et al. |
| 2005/0218231 | A1 | 10/2005 | Massieu |
| 2005/0264802 | A1 | 12/2005 | Shibata et al. |
| 2007/0279365 | A1 | 12/2007 | Kageyama |
| 2007/0279757 | A1* | 12/2007 | Renders .............. G02B 3/14 359/665 |
| 2008/0130146 | A1 | 6/2008 | Bloch et al. |
| 2008/0144185 | A1 | 6/2008 | Wang et al. |
| 2008/0144186 | A1 | 6/2008 | Feng et al. |
| 2008/0231818 | A1 | 9/2008 | Shinozaki |
| 2008/0277480 | A1 | 11/2008 | Thuries et al. |
| 2009/0302197 | A1 | 12/2009 | Uchino et al. |
| 2010/0276493 | A1 | 11/2010 | Havens et al. |
| 2011/0200314 | A1 | 8/2011 | Kawashima |
| 2011/0235177 | A1 | 9/2011 | Dube |
| 2012/0037820 | A1 | 2/2012 | Komi |
| 2012/0200686 | A1 | 8/2012 | Yu et al. |
| 2013/0148059 | A1 | 6/2013 | Park et al. |
| 2014/0152885 | A1 | 6/2014 | Nunnink et al. |
| 2014/0268361 | A1 | 9/2014 | Nunnink et al. |
| 2016/0259094 | A1 | 9/2016 | Aschwanden et al. |

FOREIGN PATENT DOCUMENTS

| | | |
|---|---|---|
| CN | 101144913 A | 3/2008 |
| CN | 101290388 A | 10/2008 |
| CN | 101494737 A | 7/2009 |
| CN | 101541367 A | 9/2009 |
| CN | 101840055 A | 9/2010 |
| CN | 102436018 A | 5/2012 |
| CN | 102466825 A | 5/2012 |
| CN | 103257428 A | 8/2013 |
| JP | 2009271095 A | 11/2009 |
| WO | 2008024821 A2 | 2/2008 |
| WO | 2009011384 A1 | 1/2009 |
| WO | 2012160613 A1 | 11/2012 |
| WO | 2014089870 A1 | 6/2014 |

\* cited by examiner

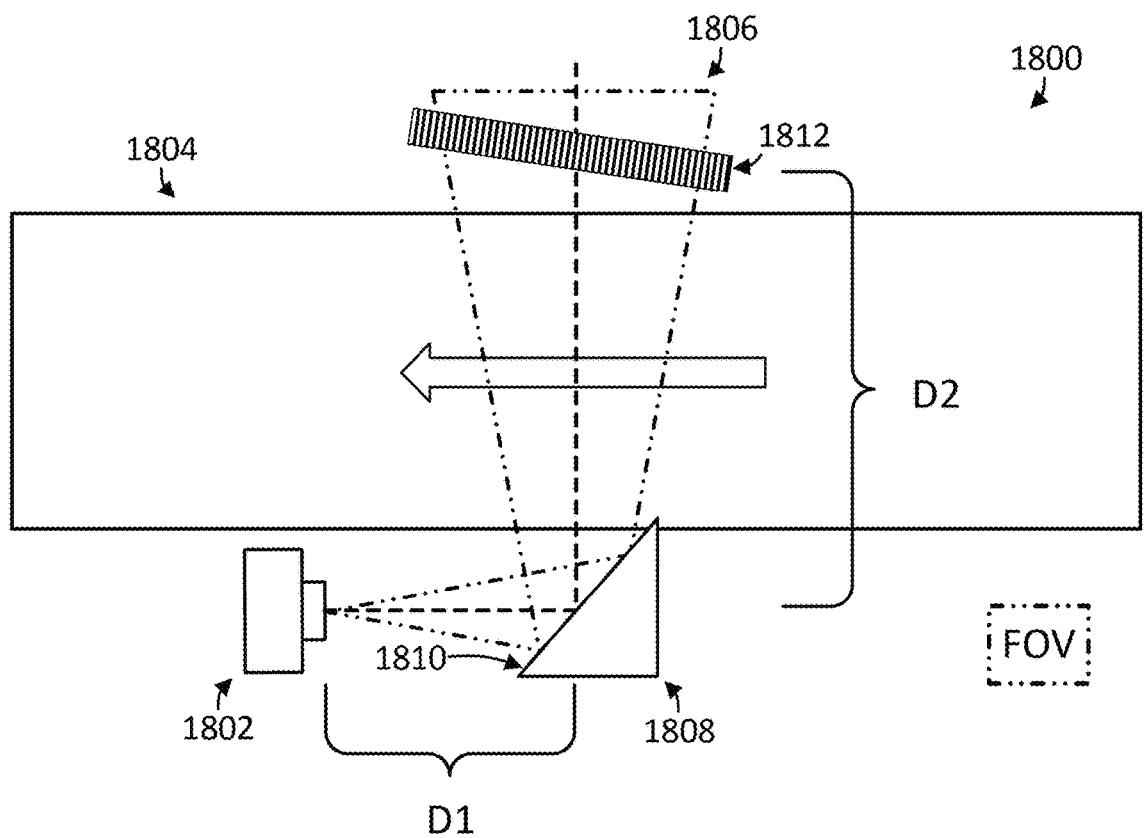
FIG. 18
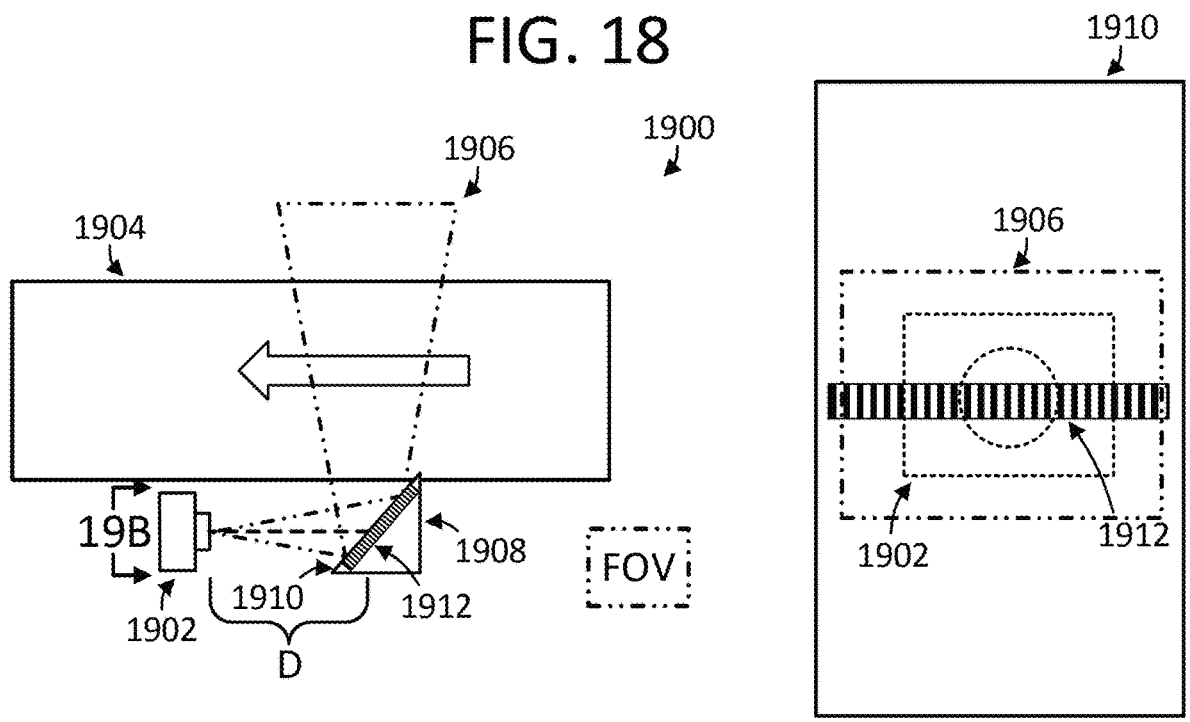
FIG. 19A
FIG. 19B

SYSTEMS AND METHODS TO REDUCE TEMPERATURE INDUCED DRIFT EFFECTS ON A LIQUID LENS

CROSS-REFERENCE TO RELATED APPLICATIONS

This application is a continuation-in-part of U.S. patent application Ser. No. 16/997,289 filed Aug. 19, 2020, which is a continuation of U.S. patent application Ser. No. 15/375,859 filed Dec. 12, 2016, now U.S. Pat. No. 10,754,071 granted Aug. 25, 2020, which is a divisional of U.S. patent application Ser. No. 14/145,185, filed Dec. 31, 2013, now U.S. Pat. No. 9,575,221 granted Feb. 21, 2017, and entitled "SYSTEMS AND METHODS REDUCE TEMPERATURE INDUCED DRIFT EFFECTS ON A LIQUID LENS," the entire contents of which are incorporated herein by reference.

STATEMENT REGARDING FEDERALLY SPONSORED RESEARCH OR DEVELOPMENT

Not applicable.

BACKGROUND OF THE TECHNOLOGY

The present technology relates to adjustable lenses used in a lens system, and more specifically, to systems and methods for reducing temperature induced drift effects on a microfluidic or liquid lens used in a vision system.

Vision systems have been developed for many different applications. For example, machine vision systems have been developed for reading bar codes and other types of symbols placed on packages or products to obtain information there from. Other machine vision systems have been developed for inspecting manufactured parts for features/characteristics.

Many vision systems include a camera for obtaining images of symbols or items to be imaged. A processor receives the images and extracts information that can then be used to perform one or more vision processes. In many applications, the distance between a camera sensor and a symbol or item to be imaged can vary between uses. In these cases, in order to obtain useful images, i.e., images from which data required to complete machine vision processes can be extracted, an adjustable lens and/or auto-focus system is often provided. In these cases, when the system is activated to perform a vision process, the lens and auto-focus system automatically focus the lens so that a clear image of the symbol or item to be imaged is generated on the camera sensor. After the focusing process is completed, a clear image of the symbol or item to be imaged is obtained and is processed to complete the vision process.

One type of adjustable lens that can be used in a machine vision system is a liquid lens. Liquid lenses are constructed of one or more fluids of different refractive indexes, and can be varied by controlling the meniscus, or surface of the liquid. In one type of liquid lens, for example, two fluids are contained in a tube with transparent end caps. The first is an electrically conducting aqueous solution, and the second is a non-conducting oil. The interior of the tube is coated with a hydrophobic material, which causes the aqueous solution to form a hemispherical lens which can be adjusted by applying a DC voltage across the coating to decrease its water repellency in a process called electrowetting. Electrowetting adjusts the surface tension of the liquid, which changes the radius of curvature and adjusts the focal length of the lens. Several liquid lens configurations utilizing an electrowetting process are known.

Another type of adjustable liquid lens utilizes an electrical/mechanical actuator system to induce movement to adjust the focus of the lens. For example, a voice coil type adjustable lens has a ring shaped voice coil actuator that presses onto a transparent membrane serving as a transparent sidewall of a container. The container is filled with a transparent liquid. A current applied through the actuator induces the actuator to apply a force to deform the membrane into a convex shape. The convex shape acts as the lens, and can be adjusted by adjusting the current.

Liquid lenses are extremely versatile, providing a highly variable focal length, and some without the need for moving parts. Liquid lenses, however, are inherently subject to undesirable changes in focal length (referred to herein as drift) due to temperature changes and aging of the liquids in the lens. Temperature and aging can, for example, alter the refractive index of the liquids, or the dielectric constant, thereby changing the focal length. For example, when small symbols are imaged at a fixed large distance, a temperature drift of the lens will cause blur in the image and decrease reading performance. This undesirable drift causes the liquid lens at a first temperature to have a first focal length, and the same liquid lens at a second temperature would have a second focal length different from the first focal length.

For adjustable lenses that use a current applied through the actuator to adjust the focus of the lens, the current applied through the actuator not only heats the actuator, but the lens heats up as well. Undesirably, this causes the temperature of the lens to vary with the applied control current. At large optical power (close object distances) the lens will heat up more than when used at small optical power (large object distance) due to the higher current need for the larger optical power.

Attempts have been made to compensate for liquid lens drift. These attempts measure the thermal behavior of the liquid lens during a calibration process, and then compensate the lens at normal operation based on the measured thermal behavior by adjusting the liquid lens driver voltage or current. This not only requires a time consuming calibration process for each lens, but the measured thermal behavior is made based on a typical drift behavior during calibration, which has limited accuracy.

Therefore, when using a variable lens in applications that induce changes in the temperature of the lens, the focusing of the variable lens will produce different results at different temperatures. For these applications, other systems and methods must be used in an attempt to maintain a more consistent focal length and a sharper resulting image. The present technology addresses solutions to these issues.

BRIEF SUMMARY OF THE TECHNOLOGY

In accordance with some embodiments of the disclosed subject matter, a vision system is provided, the vision system comprising: an image sensor; an adjustable focus liquid lens having a field of view and an optical axis, a focus of the liquid lens being adjustable with a control signal applied to the liquid lens for capture of an image using the image sensor; a reflective filter disposed between the image sensor and the adjustable focus liquid lens, the reflective filter configured to reflect light in a first range of wavelengths, and transmit light in a second range of wavelengths; a light source configured to emit light within the first range of wavelengths; a second sensor; and an optical element configured to direct light emitted by the light source through the adjustable focus liquid lens toward the reflective filter, and direct light reflected by the reflective filter through the adjustable focus liquid lens toward the second sensor.

In some embodiments, the second sensor comprises an area sensor.

In some embodiments, the second sensor comprises a quadrant photodiode.

In some embodiments, the light source comprises a laser diode.

In some embodiments, the laser diode is operated below a lasing threshold associated with the laser diode.

In some embodiments, the first range of wavelengths includes infrared.

In some embodiments, the system further comprises a processor that is configured to: receive output from the second sensor at a first time; receive output from the second sensor at a second time; determine a difference between a position of the light emitted by the light source at the first time and a position of the light emitted by the light source at the second time; and adjust the control signal applied to the liquid lens based on the difference.

In some embodiments, the optical element comprises a beam splitter configured to reflect light in at least a portion of the first range of wavelengths, and transmit light in at least a portion of the second range of wavelengths.

In accordance with some embodiments of the disclosed subject matter, a vision system is provided, the vision system comprising: an imaging device comprising: an image sensor; and an adjustable focus liquid lens having a field of view and an optical axis, a focus of the liquid lens being adjustable with a control signal applied to the liquid lens for capture of an image using the image sensor; and a patterned target mechanically coupled to the imaging device, and positioned within the field of view of the adjustable focus liquid lens.

In some embodiments, a long axis of the patterned target is not perpendicular to the optical axis.

In some embodiments, the long axis of the patterned target is rotated in a range of about 10 degrees to about 80 degrees to the optical axis.

In some embodiments, a long axis of the patterned target is perpendicular to the optical axis.

In some embodiments, a center of the patterned target is positioned at a predetermined distance from the adjustable focus liquid lens.

In some embodiments, the predetermined distance is in a range of about 100 millimeters (mm) to about 2 meters (m).

In some embodiments, the predetermined distance is in a range of about 100 mm to about 300 mm.

In some embodiments, the predetermined distance is in a range of about 120 centimeters (cm) to about 180 cm.

In some embodiments, the patterned target includes a plurality of stripes.

In some embodiments, the plurality of stripes are not perpendicular to a long axis of the patterned target.

In some embodiments, the plurality of stripes are not parallel to the long axis of the patterned target.

In some embodiments, the system further comprises: a mirror disposed along the optical axis between the adjustable focus liquid lens and the patterned target.

In some embodiments, the mirror is disposed at an angle to the optical axis.

In some embodiments, the imaging device is configured to scan for symbols using light in a first range of wavelengths, and wherein the pattern is provided to the image sensor in a second range of wavelengths.

In some embodiments, the first range of wavelengths includes red, and the second range of wavelengths excludes red.

In some embodiments, the first range of wavelengths excludes green, and the second range of wavelengths includes green.

In some embodiments, the imaging device is configured to: capture an image of the patterned target using the image sensor via the adjustable focal length liquid lens; determine a sharpness profile indicative of sharpness of different portions of the patterned target using the image; and adjust the control signal of the liquid lens based on the sharpness profile and a set focal distance.

In some embodiments, the sharpness profile is based on modulation transform function (MTF) 50.

In some embodiments, the imaging device is configured to: capture an image of the patterned target using the image sensor via the adjustable focal length liquid lens; determine a sharpness of the entire patterned target depicted in the image; and estimate a current focal distance of the liquid lens based on the sharpness.

In some embodiments, the imaging device is configured to: provide a control signal having a first value to the liquid lens, wherein the first value is associated with a set distance; perform an autofocus process using the patterned target; determine a second control signal value when the patterned target is in focus; adjust the first value of the liquid lens based on the determination of the second control signal value; and provide a control signal having the adjusted first value to the liquid lens such that the liquid lens is focused at the set focal distance.

In accordance with some embodiments of the disclosed subject matter, a vision system is provided, the vision system comprising: an image sensor; a first lens having a field of view; an adjustable focus liquid lens positioned between a proximate side of the first lens and the image sensor, a focus of the liquid lens being adjustable with a control signal applied to the liquid lens for capture of an image using the image sensor; a grating positioned a predetermined distance from a distal side of the first lens, wherein the grating is configured to generate an intermediate image comprising a plurality of grating features between the first lens and the adjustable focus liquid lens, the intermediate image is focused onto the image sensor by the adjustable focus liquid lens when an optical power of the adjustable focus liquid lens is a predetermined optical power, and is defocused when the optical power of the adjustable focus liquid lens diverges from the predetermined optical power.

In accordance with some embodiments of the disclosed subject matter, a vision system is provided, the vision system comprising: an image sensor; a first lens; an adjustable focus liquid lens having a field of view and positioned on a distal side of the first lens, a focus of the liquid lens being adjustable with a control signal applied to the liquid lens for capture of an image using the image sensor; a light source; an optical element positioned between the first lens and the adjustable focus liquid lens, the optical element configured to direct at least a portion of light emitted by the light source toward the adjustable focus liquid lens, and transmit at least a portion of light received from the adjustable focus liquid lens; a grating positioned between the optical element and the adjustable focus liquid lens at a predetermined distance from a proximate side of the adjustable focus liquid lens, wherein the grating is configured to generate a virtual image comprising a plurality of grating features, the virtual image is focused onto the image sensor by the first lens when the an optical power of the adjustable focus liquid lens is a predetermined optical power, and is defocused when the optical power of the adjustable focus liquid lens diverges from the predetermined optical power.

BRIEF DESCRIPTION OF THE SEVERAL VIEWS OF THE DRAWINGS

FIG. 9 is a chart showing relative positions a liquid lens is driven to, and the associated default positions the lens is returned to;

FIG. 18 is a top view illustrating another example of a system for controlling a focusing element susceptible to temperature effects using a patterned target at a known distance from the focusing element;

FIG. 19A is a top view illustrating yet another example of a system for controlling a focusing element susceptible to temperature effects using a patterned target at a known distance from the focusing element;

FIG. 19B is a front view illustrating the example of the system illustrated in FIG. 19A;

Figure 1:
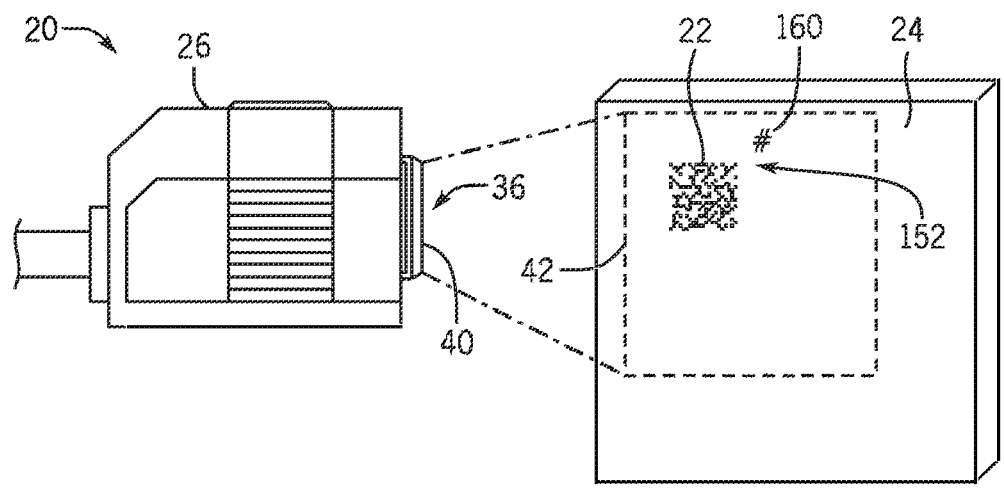
FIG. 1 is a perspective view of a fixed-mount reader device obtaining an image of a symbol on an item of interest according to embodiments of the technology.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "method" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to implement aspects detailed herein.

Unless specified or limited otherwise, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

As used herein, the term "memory" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, on which configuration data and programs may be stored and/or data communications may be buffered. The term "memory" may also include other types of known or future developed memory or combinations thereof.

Embodiments of the technology are described below by using diagrams to illustrate either the structure or processing of embodiments used to implement the present technology. Using the diagrams in this manner to present embodiments of the technology should not be construed as limiting of its scope. The present technology contemplates systems and methods for reducing and/or controlling temperature induced drift effects on an adjustable lens, and improving image quality.

The various embodiments will be described in connection with a liquid lens as part of a fixed-mount symbol reader, the reader adapted to acquire an image of an object and/or a mark on the object. That is because the features and advantages of the technology are well suited for this purpose. Still, it should be appreciated that the various aspects of the technology can be applied in other forms of electronic devices and is not limited to use of a liquid lens as part of a reader, as it will be understood that a wide variety of electronic devices that incorporate a heat sensitive lens may benefit from reducing temperature induced drift according to the features described herein.

Referring now to the drawings wherein like reference numerals correspond with similar elements throughout the several views and, more specifically, referring to FIG. 1, the present technology will be described in the context of an exemplary fixed mount symbol reader 20 that can be used to obtain images of symbols, e.g., two dimensional symbol 22, placed on a surface of an item 24 and that can decode the symbols in the obtained images. While the technologies herein are described in the context of a fixed-mount symbol reader 20, for example where a conveyor moves items or packages of various sizes through the field of view of the reader 20 such that the distance between the reader lens/sensor and the surface of a package or item on which the symbol is applied may vary item to item, it should be appreciated that the technologies may also be useful in hand-held symbol readers as well as stationary cameras, as non-limiting examples.

Figure 2:
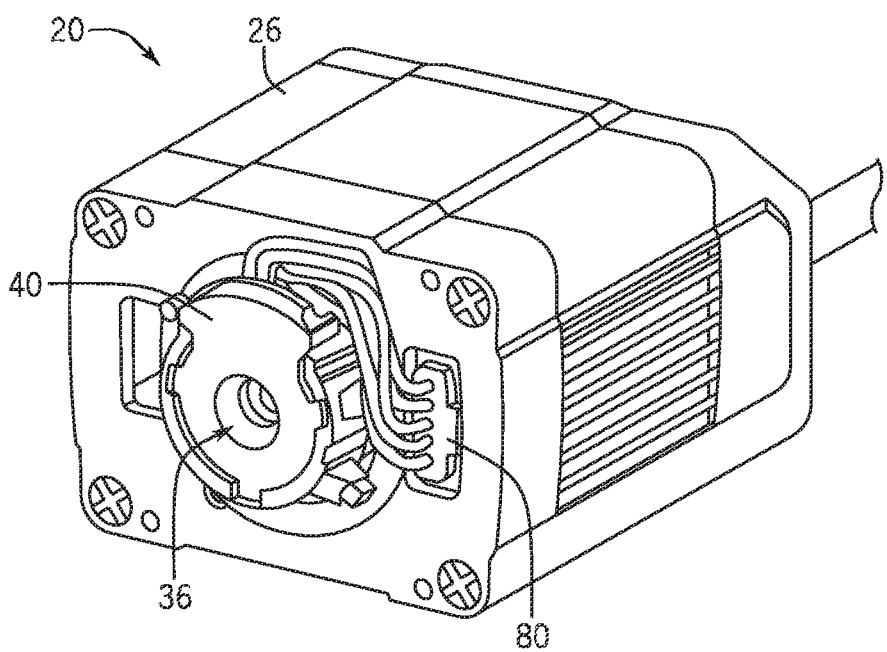
FIG. 2 is a perspective view of the fixed-mount reader device illustrating a front end of the reader device.

Referring now to FIGS. 1 and 2, reader 20 can include a metal or rigid plastic housing 26. An adjustable focal length lens 36 can be provided behind a lens housing 40 positioned near the distal end of the reader housing 26, and has a field of view 42. Lens 36 can be a known multi-focal liquid lens that is commercially available. In these types of lenses, the focal length is adjusted by varying a control signal applied to the liquid lens.

Figure 3:
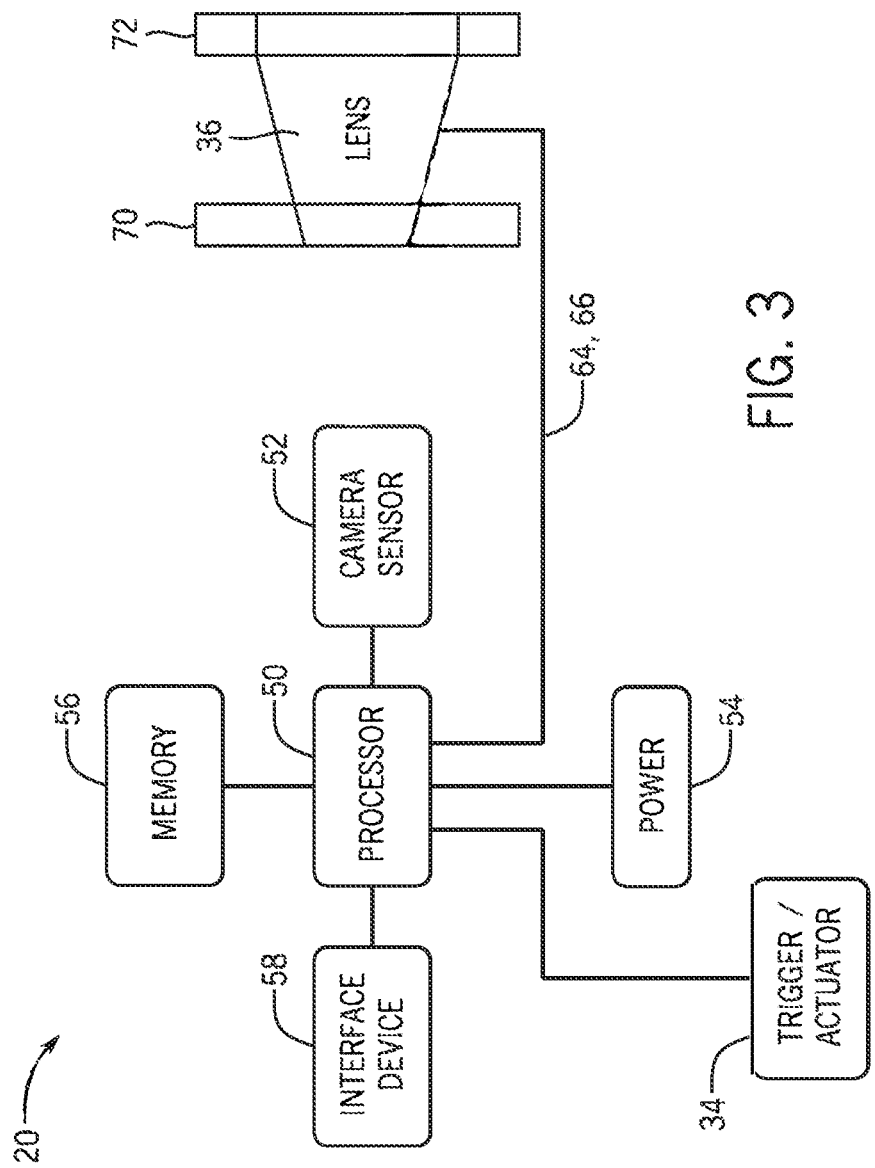
FIG. 3 is a schematic diagram illustrating components that can comprise the reader device of FIGS. 1 and 2.

Referring now to FIG. 3, in addition to the components described above with respect to FIGS. 1 and 2, reader 20 can include a processor 50, a camera sensor 52, a power source 54, memory 56, and one or more interface devices 58, such as an audible sound generator, an LED for indicating successful symbol decoding, wireless and/or wired communications, etc. As would be known, the power source 54 could be replaced with a battery to provide power. Processor 50 can be coupled to memory 56 where programs performed by processor 50 can be stored. In addition, processor 50 can direct the storage of images obtained via camera sensor 52 in the memory 56. Processor 50 can also be coupled to camera sensor 52 for receiving image data there from. Known trigger/actuator devices or methods 34 can be coupled to or performed by processor 50 for initiating a symbol reading process. Processor 50 can also be coupled to the variable focus liquid lens 36 for modifying the focus position or focal length of the liquid lens 36.

In typical operation, the reader 20 is positioned such that the camera or lens field of view 42 is directed toward a surface of the item 24 on which the symbol 22 has been applied so that the symbol 22 is disposed within the reader's field of view 42. Once so positioned, the trigger 34 can be activated causing reader 20 to obtain one or more images of the symbol 22 within the field of view 42. Once a suitably focused image of symbol 22 has been obtained, the processor 50 within reader 20, or using the communication interface 58, a processor remote from the reader 20, can attempt to decode the symbol 22 and can then provide the decoded information to other software applications for use. In addition, after successful decoding of the symbol 22, reader 20 may provide an indication to the user that decoding has been successful. Here, although not illustrated in FIG. 1 or 2, the indication of successful decoding may be provided via an audible beep or noise or via illumination of an LED or the like, or both.

Liquid lenses, such as liquid lens 36, are typically constructed of one or more fluids of different refractive indexes, and can be varied by controlling the meniscus, or surface of the liquid. Liquid lenses can be adjusted by application of a control signal 64 to the liquid lens or to a liquid lens actuator. The control signal 64 can comprise a control voltage or a control current, for example. In some types of known liquid lens, for example, two fluids are contained in a tube with transparent end caps. The first is an electrically conducting aqueous solution, and the second is a non-conducting oil. The interior of the tube is coated with a hydrophobic material, which causes the aqueous solution to form a hemispherical lens that can be adjusted by applying a DC voltage across the coating to decrease its water repellency in a process called electrowetting. Electrowetting adjusts the surface tension of the liquid changing the radius of curvature and adjusting the focal length of the liquid lens.

As discussed above, the optical properties of liquid lenses differ from those of typical glass or plastic lenses. The optical power of a liquid lens, for example, decreases as the temperature of the lens increases, and as the lens ages. When focusing the liquid lens, moreover, there is hysteresis between the control signal 64 and the optical power. That is, as the control signal 64 is increased and decreased, the incremental change in optical power varies, which can detrimentally affect feedback loops.

Embodiments of the technology control the temperature of the adjustable lens 36 so as to reduce the drift effects caused by changes in the lens temperature. To minimize the drift effects, the application of heat can be controlled alone or in combination with controlling aspects of a bias signal 66 to the lens 36 or a lens actuator 96. As described below, the control signal 64 can be removed between the acquisition of consecutive images. The bias signal 66 can be applied in place of the control signal 64. The bias signal 66 can comprise a bias voltage or a bias current, for example. Adjustments can be made in the level of the bias signal 66 and the length of time the bias signal is applied. When adjustments are made in this way, the effects of temperature, both ambient temperature and lens temperature, can be counteracted.

Generally, higher temperatures cause the optical power of the liquid lens 36 to decrease. In this example, current methods increase the focal distance of the reader 20 to adjust for the decrease in optical power. A change in focal distance can be used to compensate for the effect of temperature on the liquid lens, but any time the liquid lens focus is changed, there is risk associated with reducing the sharpness of the images acquired due to the uncertainty of the exact focus the liquid lens should be adjusted to.

Figure 4:
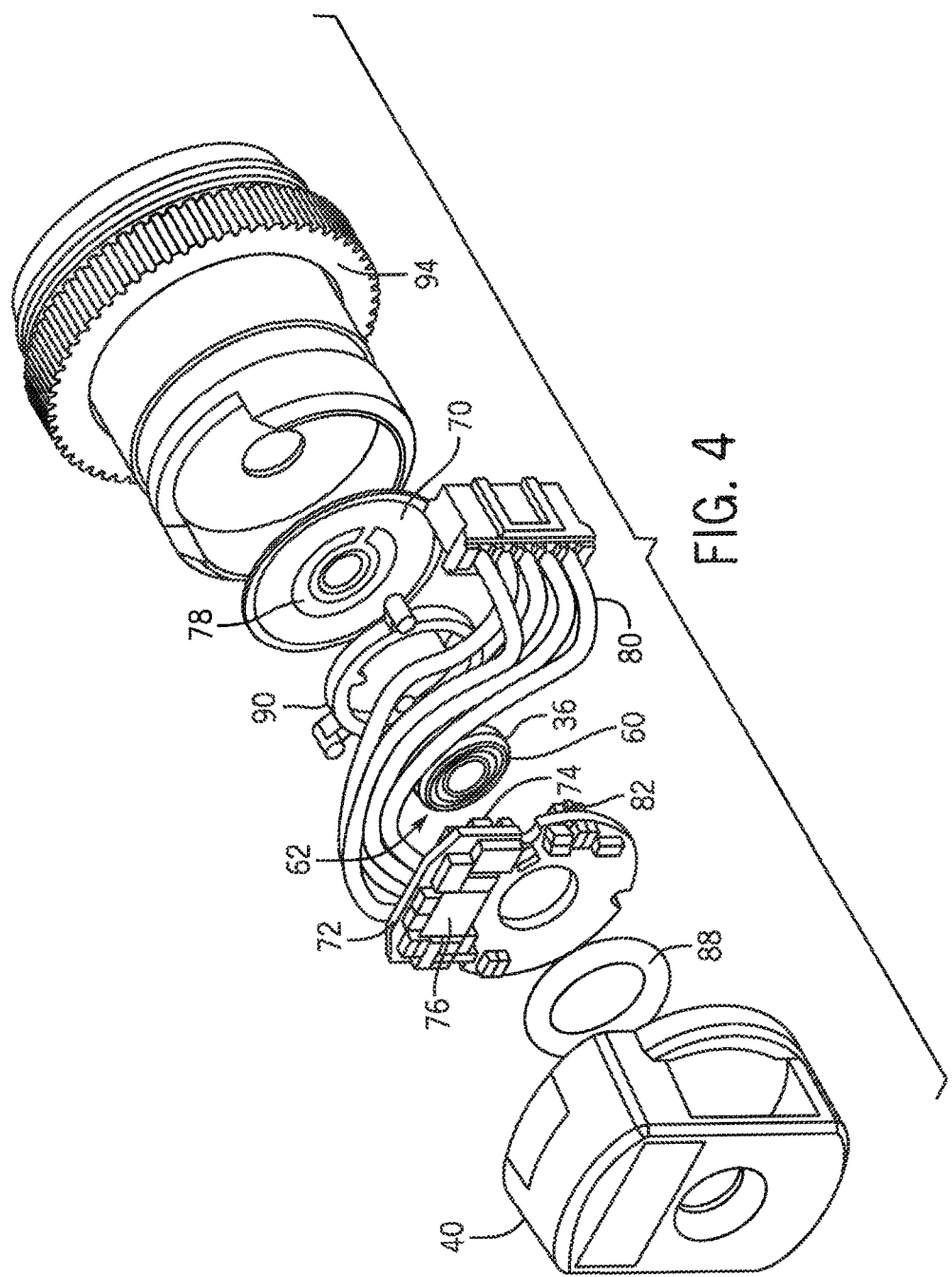
FIG. 4 is an exploded view illustrating an embodiment of a liquid lens and components of the reader device that are positioned in a thermal relationship to the liquid lens.

Referring now to FIG. 4, an embodiment is shown that can be used to significantly reduce or eliminate the focal drift in the liquid lens 36 by stabilizing the temperature of the liquid lens 36. In this embodiment, a portion of the housing 26 has been removed to provide an exploded view of the liquid lens 36 and components that are positioned in contact with and/or near the liquid lens 36. In this embodiment, the liquid lens 36 can be kept at a predetermined control temperature 60 while variations of an ambient temperature 62 can occur surrounding the reader 20. Data such as the predetermined control temperature values 61 and ambient temperature values 63 can be stored in memory 56 (see FIG. 5). The ambient temperature 62 can be measured at or near the liquid lens 36 within the housing 26, or the ambient temperature 62 can be measured outside of the reader 30, or both. The control temperature 60 can be maintained at a constant temperature and/or the control temperature can be maintained at a near constant temperature, e.g., within a range of several degrees. Further, the control temperature 60 can be maintained to be within an operating range of the liquid lens 36, e.g., minus 50 degrees Celsius to 70 degrees Celsius.

In some embodiments, the control temperature 60 can be maintained at or near the high end of the operating range, e.g., 70 degrees Celsius. Some liquid lenses change to a new focal distance quicker at higher temperatures. Therefore, maintaining the control temperature 60 at or near the high end of the operating range would not only provide an operating range of the reader 20 to be as large as possible, but would also serve to reduce or eliminate the drift and improve the focusing speed of the liquid lens 36 due to improved reaction time of the liquids in the liquid lens. It is contemplated that the control temperature 60 can be maintained at a low, or mid-range temperature, or any temperature within the operating range that is at or above the ambient temperature, for example.

Figure 5:
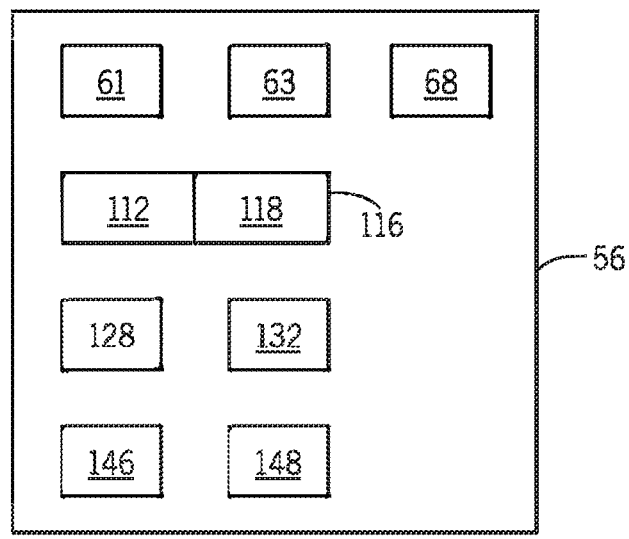
FIG. 5 is a schematic diagram illustrating values and data storable in memory.
Figure 6:
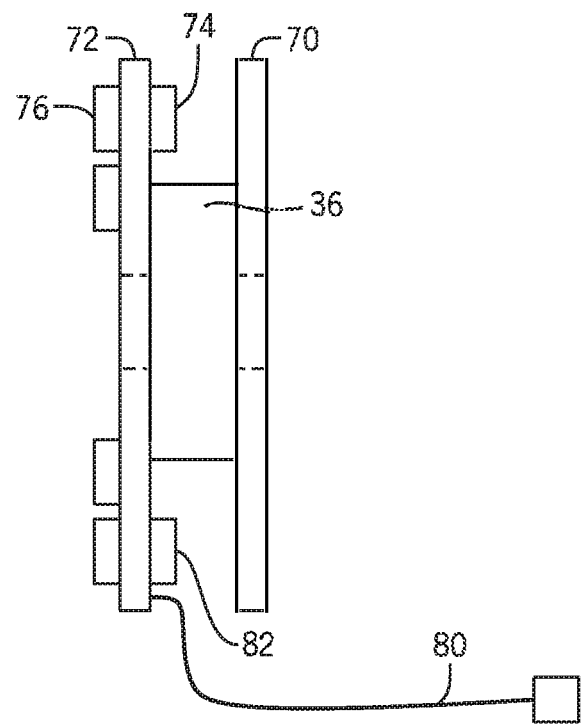
FIG. 6 is a side schematic view illustrating the liquid lens and circuit boards in contact with the liquid lens.

Referring now to FIGS. 4, 5 and 6, and by way of a non-limiting example, the liquid lens 36 can be positioned in thermal and/or physical contact with a first circuit board 70 or between, e.g., thermal and/or physical contact, the first circuit board 70 and a second circuit board 72. One or both of the first circuit board 70 and the second circuit board 72 can include a temperature sensor 74 as part of the control circuitry 76 for the liquid lens 36 and/or the reader 20. By way of example, the first circuit board 70 can include contacts 78 to electrically couple the control circuitry 76 to the liquid lens 36, and the control circuitry 76 on the second circuit board 72 can include liquid lens driver circuitry. A control cable 80 can extend from the second circuit board 72 to electrically connect the control circuitry 76 to the processor 50. A rubber ring 88 can be included to keep a constant pressure on one or both of the first circuit board 70 and a second circuit board 72 with the liquid lens 36 in-between. It is to be appreciated that other configurations and arrangement of components are contemplated.

In some embodiments, one or both of the first circuit board 70 and the second circuit board 72 can be made from a thermally conductive material. An exemplary thermally conductive material is Thermal Clad Insulated Metal Substrate developed by The Bergquist Company. Further, one or both of the first circuit board 70 and the second circuit board 72 can include a controllable heating element 82. The heating element 82 can be controlled to heat the circuit board it is on, e.g., the second circuit board 72, and to heat the ambient air at or near the liquid lens 36.

Figure 7:
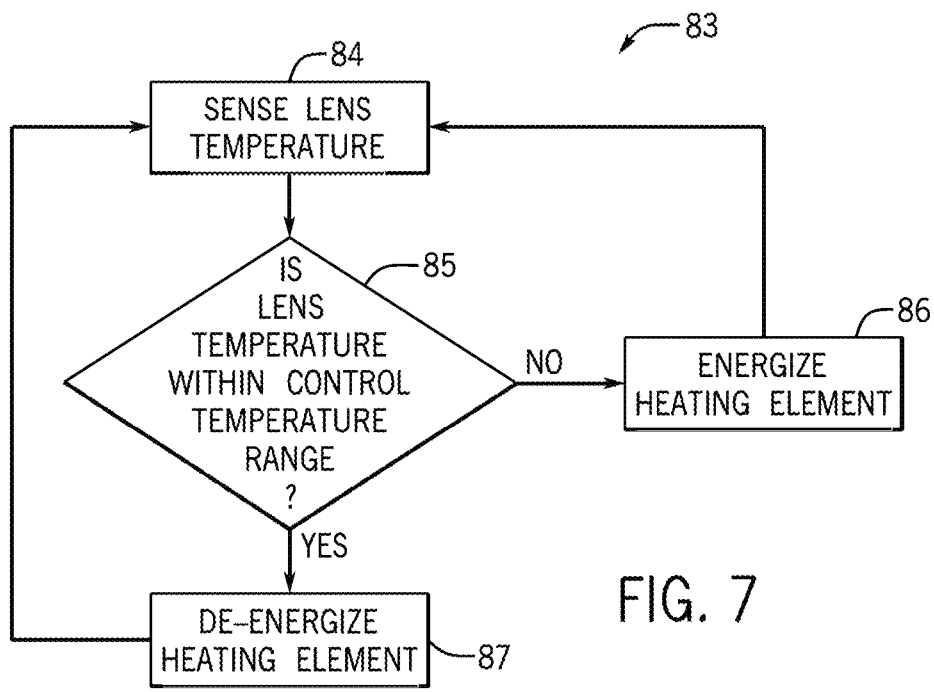
FIG. 7 is a flow chart of a method associated with controlling the temperature of the liquid lens.

In some embodiments, one or both of the first circuit board 70 and the second circuit board 72 can be in electrical, thermal and/or physical contact with the liquid lens 36. When in thermal contact, or physical contact, the heating element 82 can be controlled to generate a heat that thermally affects the liquid lens 36. Referring to FIG. 7, a method 83 is shown for controlling the temperature of the liquid lens. At process block 84, the temperature sensor 74 can sense a temperature value 132 associated with the liquid lens 36. At decision block 85, a feedback loop can compare the temperature value 132 to the control temperature 60. If the temperature value 132 is not at the control temperature 60 or within the control temperature range, at process block 86, the heating element 82 can be energized to increase the temperature of one or both of the first circuit board 70 and the second circuit board 72, and in turn, the temperature of the liquid lens 36. At process block 87, when the temperature value 132 is at the control temperature 60 or within the control temperature range, the heating element 82 can be de-energized, and the liquid lens properties can be maintained.

Additional reader 20 components, when assembled, can enclose the liquid lens 36 and the first circuit board 70 and the second circuit board 72. For example, a guide 90 and the lens housing 40 can physically and thermally enclose all or a portion of the liquid lens 36. Lens barrel 94 and the lens housing 40 can physically and thermally enclose all or a portion of the liquid lens 36 and the first circuit board 70 and the second circuit board 72. Guide 90 can serve to center the liquid lens 36 within the lens barrel 94. Any of the additional components, e.g., the rubber ring 88, the guide 90, the lens housing 40, and the lens barrel 94 can be further optimized for thermal insulation, e.g., by adjusting shape and material properties, in such way that only a minimum of power will be needed to keep the liquid lens 36 at the control temperature 60.

In an additional embodiment, the focal drift in the liquid lens 36 can be reduced or eliminated by stabilizing the temperature of the liquid lens 36. This embodiment can be used alone, or in combination with embodiments described above and shown in FIGS. 4 to 7.

Figure 8:
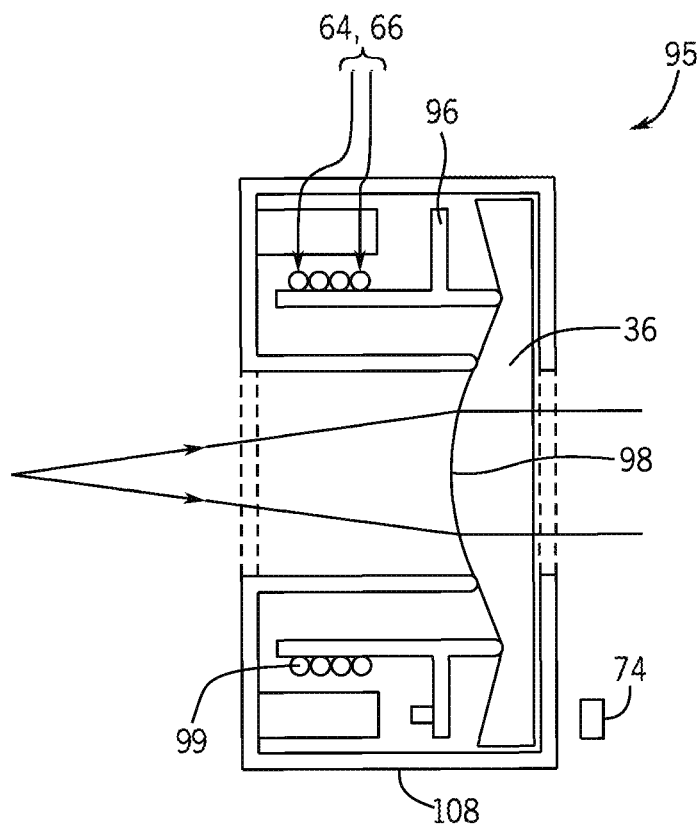
FIG. 8 is a side schematic view illustrating an additional embodiment of a liquid lens including an actuator, and circuit boards in contact with the liquid lens.

For example, other known adjustable lens configurations utilize electrical/mechanical actuator systems such as piezoelectric actuators, small motors, and electromagnetic actuators, e.g., a voice coil, to induce movement to control a lens or lenses, e.g., the meniscus of a liquid lens. In some embodiments, other variable lens elements are also used, for example, by changing the refractive index of a transparent material. FIG. 8 shows an exemplary variable lens 95. The variable lens 95 can include a ring shaped voice coil actuator 96 that is induced to press onto a transparent membrane 98 serving as a transparent sidewall of a container 108. The container is filled with liquid 36. A control signal 64 applied through the voice coil 99 induces the actuator 98 to apply a force to deform the membrane 98 into a convex shape. The convex shape acts as the liquid lens 36, and can be adjusted by adjusting the control signal 64. In these liquid lens configurations, the actuator 96 itself can induce temperature variations of the liquid lens 36 due to the control signal 64 applied to the actuator to change the focus of the liquid lens. The power dissipation in the actuator 96 is generally proportional to the square power of the control signal 64. For example, when the liquid lens 36 is driven to provide a high optical power, e.g., to focus in on a close symbol, more control current to the actuator 96 is required and the heat generation and associated dissipation from the liquid lens 36 is high. Conversely, when the liquid lens 36 is driven at a lower optical power, e.g., to focus in on a farther symbol, less control current to the actuator is required and the heat generation and associated dissipation from the liquid lens 36 is lower. In some applications, the induced temperature variations in the liquid lens 36 can be a challenge to accurately detect with the temperature sensor 74, as the thermal coupling between the actuator 96 and the liquid lens 36 is better, e.g., faster, than the thermal coupling between the liquid lens 36 and the temperature sensor 74. This is at least partially due to the physical contact with the liquid lens 36 and the actuator 96.

Accordingly, the undesirable actuator induced temperature variations in the liquid lens 36 can be controlled by controlling a bias signal 66 to the actuator 96. The bias signal 66 can be applied when the control signal 64 is not being applied to the actuator for adjustment of the focus of the lens for an image acquisition, thereby controlling the induced temperature variations and the associated induced drift effects. The bias signal 66 through the actuator can be controlled to reduce the temperature variations caused by internal heating and/or ambient temperature.

Figure 9:
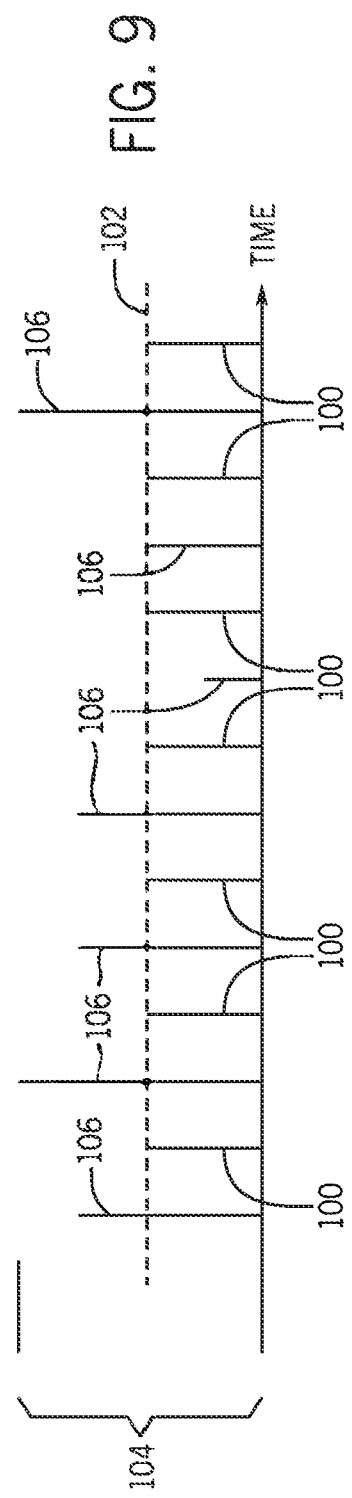

Referring to FIG. 9, liquid lenses are commonly operated where the liquid lens is driven to return to a default position 100, typically in the middle 102 of the focal range 104, after each focus operation 106. The default position 100 fails to consider any past operation of the liquid lens, e.g., if the liquid lens 36 was recently driven at a high focal power or a low focal power. As seen in FIG. 9, the liquid lens 36 was driven at a higher focal power more than it was driven at a lower focal power. This operation would typically increase the temperature of the liquid lens, thereby inducing drift effects and reducing the sharpness of acquired images.

Figure 10:
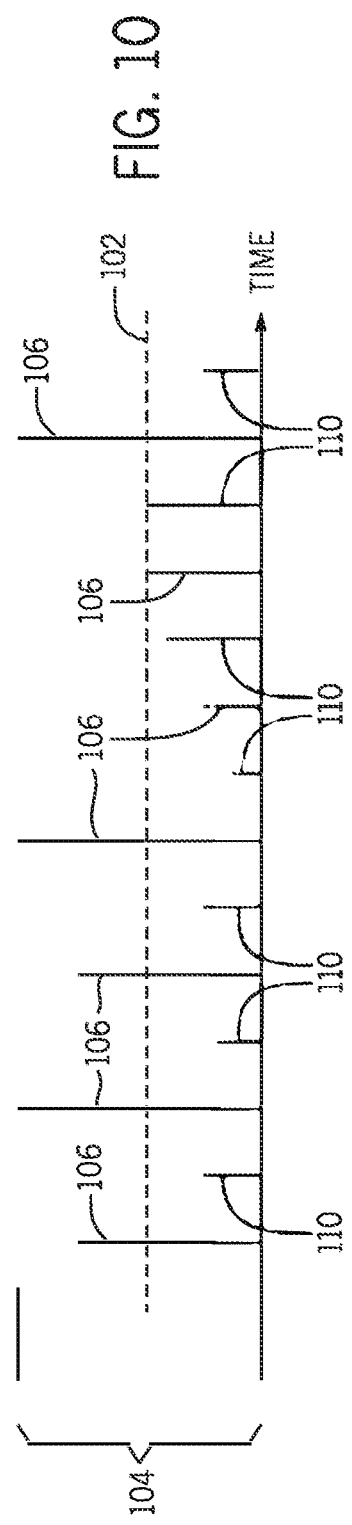
FIG. 10 is a chart similar to FIG. 9 and showing the same relative positions the liquid lens is driven to, and instead showing calculated return positions the lens is returned to for controlling the temperature of the liquid lens.

Referring to FIG. 10, instead, in some embodiments, the bias signal 66 to the actuator 96 can be controlled in such way that the average heat dissipation by the liquid lens 36 and actuator 96 is kept generally constant. Constant heat dissipation can equate to a constant temperature, and a constant temperature can equate to a reduction or no drift effects. For example, a history 68 of the liquid lens operation can be maintained in memory 56, and the processor 50 can instruct a return position based on an analysis of the past history. For example, if the liquid lens 36 was driven to the same focal powers as shown in FIG. 9, the processor can determine that the liquid lens 36 would increase in temperature. Instead of returning the liquid lens 36 to the middle of its focal range 102, the liquid lens 36 could be returned to a desired focal power position 110 with the bias signal 66, where the bias signal could be reduced enough to counterbalance the higher control signal 64 used for the higher focal powers. The processor 50 can manage the application of the bias signal 66 to the actuator 96 to average the current applied to the actuator to reduce the induced temperature variations and the associated induced drift effects.

Similarly, the bias signal 66 to the actuator 96 can be controlled in such a way that the bias signal is dependent on the measured temperature of the liquid lens 36 to reduce the induced temperature variations and the associated induced drift effects. For example, the liquid lens 36 can be driven with a bias signal 66 that temporarily decreases after the liquid lens 36 has been set to a high optical power for an image acquisition, and temporarily increases after the liquid lens has been set to a low optical power.

Figure 11:
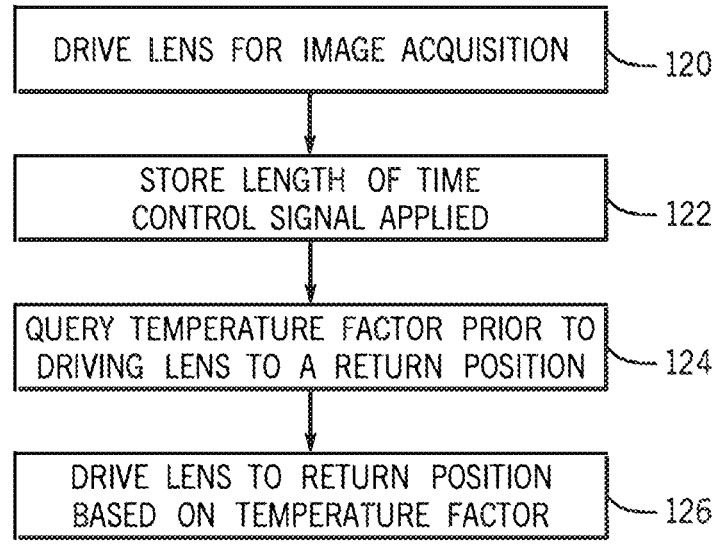
FIGS. 11, 12, and 13 are flow charts of methods associated with controlling the temperature of the liquid lens according to embodiments of the technology.

Referring to FIG. 11, method 114 shows where a temperature factor 116 is maintained and tracked for query by the processor 50. The temperature factor 116 can be a value associated with the amount of time a specific control signal 64 is applied to the liquid lens 36. In this example, the temperature factor 116 does not include a measured temperature value 132, although in some embodiments, a measured temperature value 132 may be included. When the liquid lens 36 is not being actively driven by the control signal 64 for an image acquisition, the processor 50 can adjust the bias signal 66 to compensate for the past control signal applied. At process block 120, the processor 50 drives the liquid lens 36 for a specific amount of time at a specific control signal 64 to acquire an image. At process block 122, a time value 112 for the specific amount of time the specific control signal is applied and a control value 118 for a specific control current can both be stored in memory 56 as elements of the temperature factor 116 (see FIG. 5). After the image has been acquired and the temperature factor 116 has been stored, the processor 50 can query the temperature factor 116 from memory, at process block 124, in order to compute a return position for the liquid lens, based on the temperature factor 116.

As a non-limiting example, if 100 milliamps of control signal 64 was applied to the actuator 96 for 10 milliseconds, the processor 50 can then determine that the liquid lens 36 should be driven with a bias signal 66 current of 10 milliamps for 100 milliseconds to lower the temperature of the liquid lens 36 to the control temperature 60. At process block 126, the processor 50 can then drive the liquid lens to the return position based on the analysis of the temperature factor 116. The method can repeat at process block 120.

Depending on when the liquid lens 36 is driven to a focal power during use of the reader 20, a counter 128 operable in memory 56 and controllable with the processor 50 can be included to count up or down to track the temperature factor. For example, the liquid lens 36 may be driven to a new position prior to the completion of the application of 10 milliamps for 100 milliseconds. The counter 128 can keep track of how much of the 10 milliamps for 100 milliseconds has been applied, and continue the application of the bias signal 66 after the liquid lens 36 has completed the image acquisition. It is to be appreciated that these are examples only, and many factors would affect specific bias signals and application times, as would be understood by one skilled in the art.

Figure 12:
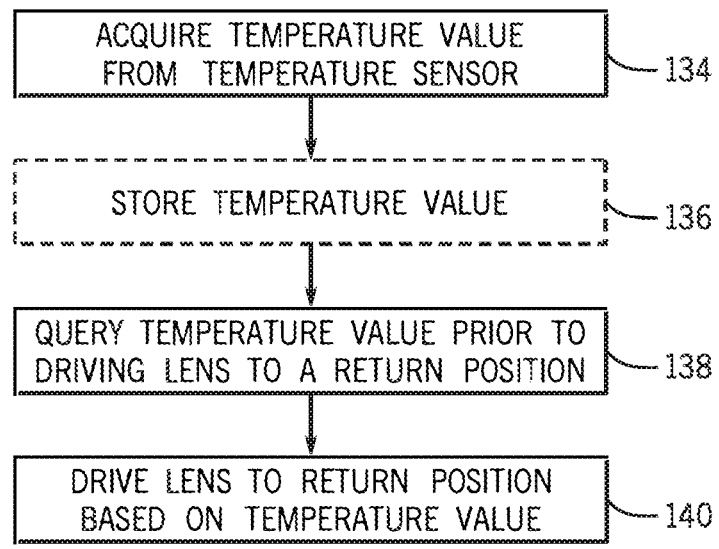

Referring to method 130 in FIG. 12, in some embodiments, the temperature sensor 74 can be read to provide a temperature value 132, and depending on the temperature value 132, alone or in combination with the temperature factor 116, the bias signal 66 can be controlled, i.e., reduced or increased bias signal, in an effort to maintain a consistent and/or predetermined control temperature 60. Use of the temperature sensor 74 has the benefit of including ambient or external temperatures affecting the reader 20, and specifically on the liquid lens 36. At process block 134, a temperature value 132 is acquired from the temperature sensor 74. Optionally, the temperature value 132 can be stored in memory 56 (see FIG. 5), at process block 136. After the image has been acquired and the temperature value 132 has been stored, the processor 50 can query the temperature value 132 from memory 56, at process block 138, in order to compute a return position for the liquid lens 36, based on the temperature value 132. At process block 140, the processor 50 can then drive the liquid lens 36 to the return position using a bias signal 66 based on the temperature value 132 and/or the temperature factor 116. In addition, in some embodiments, tracking the temperature factor 116 can be eliminated. The method can repeat at process block 134.

In some applications, the induced drift may not be able to be completely eliminated, such as when the reader device is subject to large ambient temperature swings, or the liquid lens 36 is operated in such a way that there is insufficient time to control the bias signal 66 to control the temperature of the liquid lens, for example. In these applications, the image sharpness can be determined over a series of images, alone or in combination with controlling the temperature of the liquid lens 36, to adjust a focal distance of the lens.

In most reader applications, a series of images is typically acquired. The series of images can be acquired either within one trigger, such as in a known continuous or manual mode, or over several triggers, such as in a known single trigger mode. An image acquisition parameter, e.g., a focal distance, can be changed by a predetermined small adjustment step 142 between each of the series of images. For one or more of the images in the series of images, the reader 20 can use a sharpness calculation 146 operable in memory 56 to determine a sharpness score 148 for each image. The sharpness score 148 from one image can be compared to a sharpness score from another image to determine the effect of the predetermined small adjustment step 142 between each of the images. The predetermined small adjustment step 142 can improve the sharpness score, or it can reduce the sharpness score, or the sharpness score can remain unchanged. Based on the comparison of the sharpness scores, the processor 50 can determine a direction, e.g., greater or less focal distance, for a next predetermined small adjustment step. In some embodiments, alone or in combination with the sharpness score 148, the processor 50 may also use the ambient temperature change, e.g., an increase or decrease in ambient temperature, to determine a direction of the predetermined small adjustment step 142.

Figure 13:
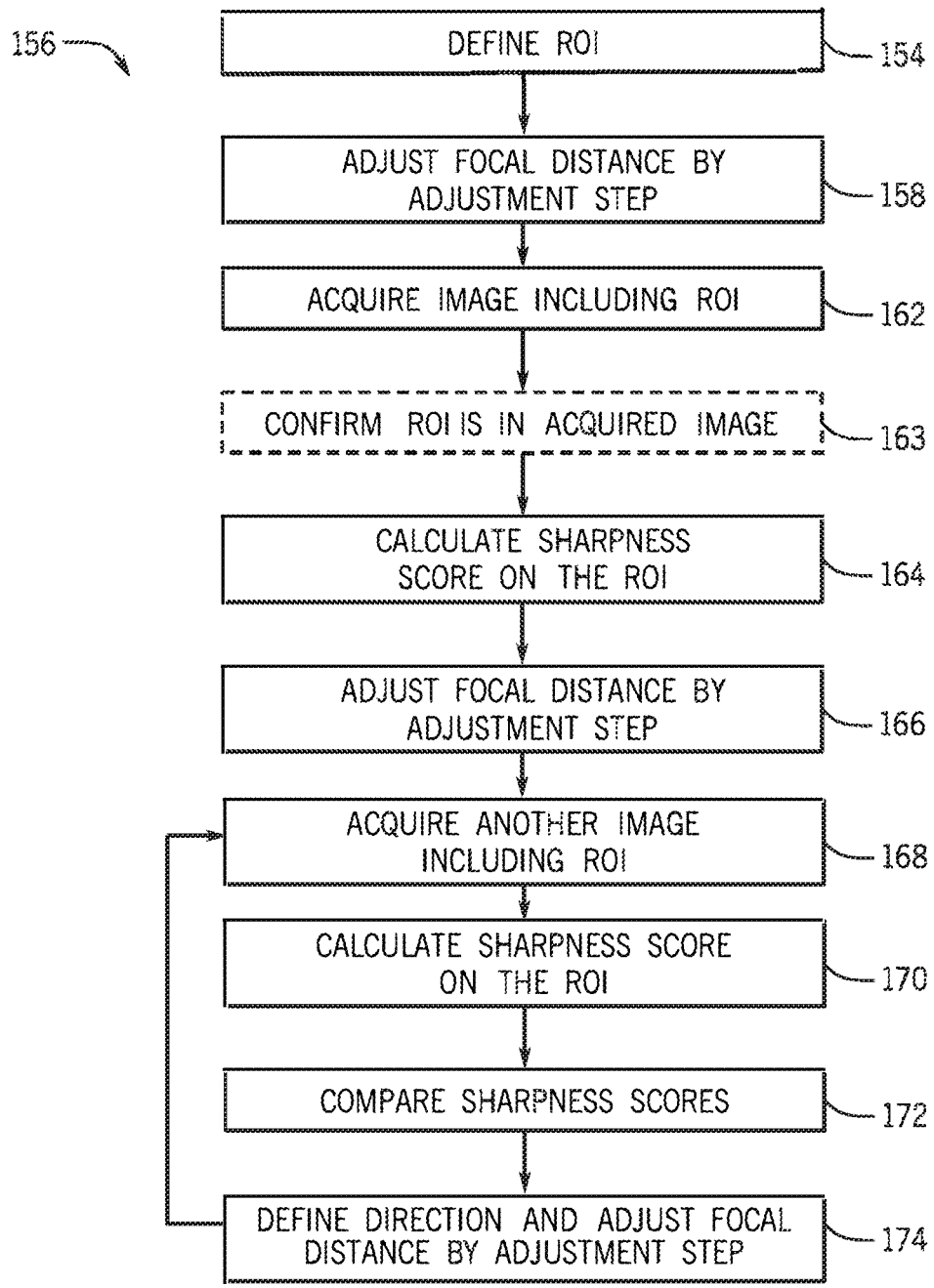

Referring to FIG. 13, in some embodiments, the sharpness calculation 146 can analyze a small region of interest (ROI) 152 within the field of view of one or more images. At process block 154 of method 156, the ROI 152 can either be defined automatically by a symbol, e.g., the barcode 22 as seen in FIG. 1, or the ROI can be defined by the user, e.g., the hashtag symbol 160 as seen in FIG. 1. For example, the sharpness calculation 146 process can be enabled by placing a known ROI 152, e.g., barcode 22 or symbol 160, within the field of view 42 for each image where a sharpness score 148 is going to be calculated. The focal distance of the adjustable lens 36 can be adjusted by the predetermined small adjustment step 142 at process block 158. At process block 162, an image can be acquired that includes the ROI 152. Optionally, the processor 50 can confirm the ROI 152 is in the acquired image, at process block 163. At process block 164, the processor 50 can then run the sharpness calculation 146 on the known ROI 152 identified in the images to generate a sharpness score 148 for the ROI 152 in the acquired image. Next, at process block 166, the focal distance of the adjustable lens 36 can again be adjusted by the predetermined small adjustment step 142. At process block 168, an additional image of the field of view that includes the ROI 152 can be acquired. Again, optionally, the processor 50 can confirm the ROI 152 is in the acquired image. At process block 170, the processor 50 can then run the sharpness calculation 146 on the known ROI 152 identified in the additional image to generate a subsequent sharpness score 148. The first sharpness score 148 can be compared to the subsequent sharpness score 148, at process block 172. Based on the comparison of the sharpness scores, at process block 174, the processor 50 can define a direction for the next predetermined adjustment step, and the focal distance of the adjustable lens 36 can be adjusted in the defined direction by the predetermined small adjustment step 142. The method can then repeat at process block 168 by acquiring another image including the ROI 152 and comparing the sharpness score with the previously calculated sharpness score.

To make sure that the reader 20 does not slowly focus away from the potentially small ROI 152 to the background due to drift, the predetermined small adjustment step to the focal distance can be limited. This can include limiting adjustments to one image acquisition parameter at a time, and/or limiting an amount of an adjustment to the one or more of the image acquisition parameters.

Figure 14A:
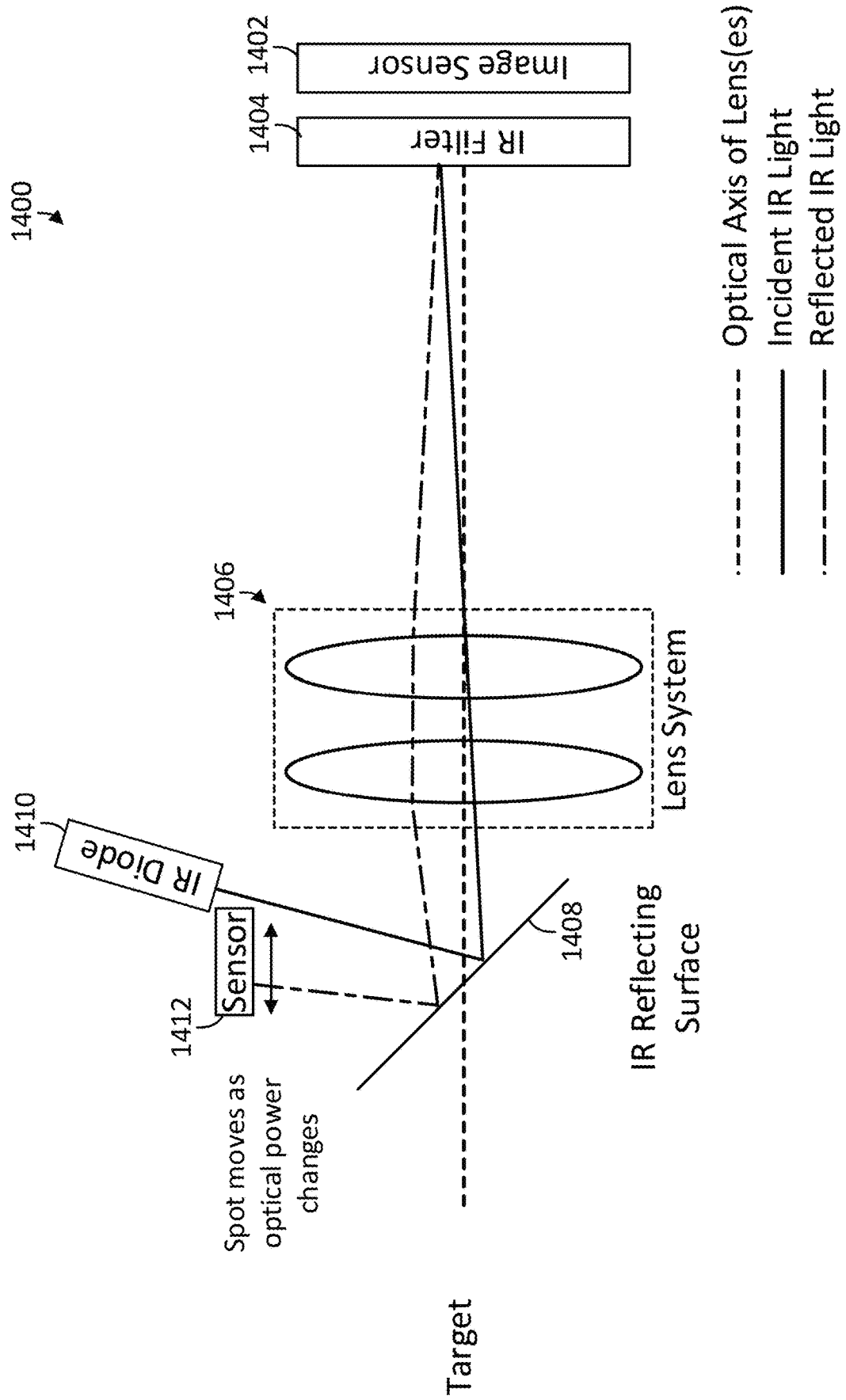
FIG. 14A is a side view illustrating an example of a system for controlling a focusing element susceptible to temperature effects using internally reflected light.

FIG. 14A is a side view illustrating an example of a system for controlling a focusing element susceptible to temperature effects using internally reflected light. In high precision optical systems, environmental variations (e.g., in temperature) can affect the overall optical power. For example, environmental variations can affect focal length of an imaging lens, resulting in reduced image contrast. In a more particular example, systems that include a variable element (e.g., a liquid lens), changes to temperature can noticeably affect a focal length of the variable element, especially in applications in which high image resolution is important (e.g., as part of a symbol reader). Additionally, relatively small variations between parts (e.g., between two liquid lenses manufactured at the same facility) and/or other system fluctuations can affect overall performance such that variables that cause drift (e.g., temperature) may affect two systems with nominally identical parts differently. This can make model-based approaches challenging, as variations can cause a model developed using a particular system to be insufficiently accurate when applied to another system. In some embodiments, a system for controlling a focusing element susceptible to temperature effects using internally reflected light can measure residual optical power drift and can provide feedback to help ensure that the system remains relatively stable.

FIG. 14A shows an example of a system 1400 that includes an image sensor 1402 (e.g., camera sensor 52, such as a CCD area sensor, a CMOS area sensor, etc.), an infrared (IR) reflective IR filter 1404, and a lens system 1406 that can include multiple lenses to focus an image of a target onto image sensor 1402. Additionally, in some embodiments, the system 1400 can include an optical element 1408 that directs IR light toward the image sensor 1402 and transmits visible light from the target to the image sensor 1402, an IR laser diode 1410 that emits light toward the optical element 1408. Note that other light sources can be used in lieu of an IR laser diode, such as a IR light emitting diode (LED) and a physical aperture (and/or other suitable optics) that causes a relatively narrow beam to be emitted toward optical element 1408. The optical element 1408 can be any suitable optical element that can reflect IR light from a first side and transmit visible light through a second side. For example, the optical element 1408 can be implemented using an IR beam splitter. As another example, the optical element 1408 can be implemented using a second reflective IR filter disposed at an angle to the optical axis of the lens system 1406. As yet another example, the optical element 1408 can be implemented using a dichroic mirror. As still another example, the optical element 1408 can be implemented using a broadband beamsplitter mirror. In some embodiments, the optical element 1408 can be disposed at an angle to the optical axis of the lens system 1406 in a range of about 35 degrees to about 55 degrees. For example, the optical element 1408 can be disposed at an angle of about 45 degrees.

In some embodiments, the system 1400 can cause the IR laser diode 1410 to emit light toward the optical element 1408 in a non-lasing mode. For example, the IR laser diode 1410 can be coupled (not shown) to the processor 50, which can provide a control signal that controls operation of the IR laser diode 1410. The processor 50 can drive the IR laser diode 1410 using a control signal having a current that is below a lasing threshold current of the IR laser diode 1410, which can cause the IR laser diode 1410 to emit light that includes photons that fall within a relatively narrow wavelength band with a variety of phases. In a lasing mode, the IR laser diode 1410 can emit light via stimulated emission such that the light includes photons that fall within the relatively narrow wavelength band, and are closely aligned in phase. A lasing threshold current can vary with environmental conditions (e.g., based on a temperature of the IR laser diode) and based on implementation details of the laser diode (e.g., based on materials used to implement the laser diode). For example, the lasing threshold current may increase with temperature of the laser diode. In some embodiments, the IR laser diode can be operated at a current that is below the lasing threshold current at room temperature (e.g., about 20 degrees Celsius). For example, the laser diode can be operated using a control signal with a current below about 60 milliamps (mA). In a more particular example, the laser diode can be operated using a control signal with a current in a range of about 2 mA to about 50 mA.

In some embodiments, light emitted from the IR laser diode 1410 toward optical element 1408 can be reflected toward IR filter 1404, which can cause the emitted light to enter a target side of the lens system 1406, traverse lenses included in the lens system 1406, and be emitted from an image sensor side of the lens system 1406 toward the IR filter 1404. The IR filter 1404 can reflect the IR light emitted by the IR diode 1410 back toward the image sensor side of the lens system 1406. The reflected IR light can enter the image sensor side of the lens system 1406, traverse lenses included in the lens system 1406, and can be emitted from the target side of the lens system 1406 toward the optical element 1408. The optical element 1408 can reflect the IR light emitted from the target side of the lens system 1406 toward a sensor 1412. Sensor 1412 can be referred to as an auxiliary sensor.

In some embodiments, sensor 1412 can be implemented using any suitable component or components that can output one or more signals indicative of a location at which an IR beam impinging on the sensor is centered. For example, sensor 1412 can be implemented using an area sensor (e.g., a CCD area sensor, a CMOS area sensor). In such an example, sensor 1412 can output values corresponding to pixels of the area sensor. The processor 50 (and/or any other suitable processor) can determine a center of a beam of IR light based on values of multiple pixels by determining a location at which a peak intensity (e.g., a center of the IR beam) impinges the sensor 1412. For example, the processor 50 (and/or any other suitable processor) can determine a weighted arithmetic mean of the pixels (e.g., with a weight based on the intensity at each pixel). As another example, the processor 50 (and/or any other suitable processor) can fit a Gaussian curve (or any suitable polynomial curve) to the pixels (e.g., with values based on the intensity at each pixel), and can determine a center of the beam based on a maximum of the curve. Note that the location at which the peak can be determined with sub-pixel accuracy by fitting an intensity profile of pixel intensities.

As another example, sensor 1412 can be implemented using a quadrant photodiode, which can output signals indicative of intensity of light received at four quadrants that are separated by a relatively small gap. The processor 50 (and/or any other suitable processor) can determine a center of a beam of IR light based on the values output by each of the four quadrant detectors (e.g., detectors 1, 2, 3, and 4). For example, when a beam is centered on a quadrant photodetector the values from the four detectors can be expected to be equal. Changes in position can be determined by determining a difference between the two pairs of quadrants. For example, the sum of two neighboring quadrants (e.g., quadrants 1 and 2) can be compared (e.g., by determining a difference) to the sum of the other two quadrants (e.g., quadrants 3 and 4) to determine a position of the beam along a first axis (e.g., an X axis). In such an example, the sum of two neighboring quadrants along a second axis (e.g., quadrants 1 and 3) can be compared to the sum of the other two quadrants (e.g., quadrants 2 and 4) to determine a position of the beam along the second axis (e.g., a Y axis).

Figure 14B:
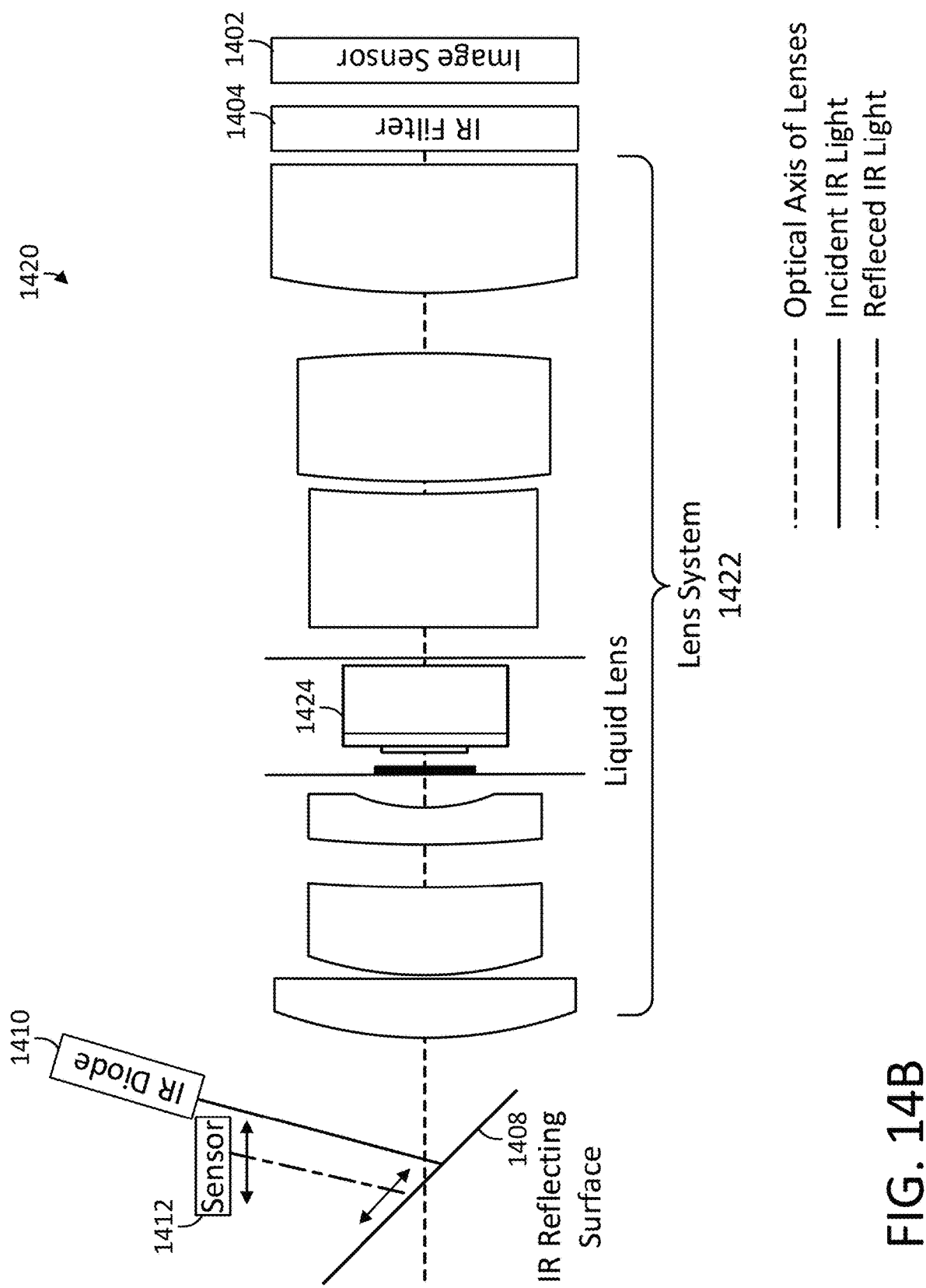
FIG. 14B is a side view illustrating another example of a system for controlling a focusing element susceptible to temperature effects using internally reflected light.

In some embodiments, the optical element 1408 and the IR laser diode 1410 can be disposed such that IR light that returns from the IR filter 1404 impinges the sensor 1412 at a location that is dependent on the optical power of the lens system 1406. For example, the optical element 1408 can be positioned at an angle to an optical axis of the lens system 1406 and the IR laser diode 1410 can be disposed such that the IR light reflected toward the side of the lens system 1406 closest to the target does not travel along the optical axis of the lens system 1406. Note that although the beam is shown in FIGS. 14A and 14B as being disposed at a particular angle with respect to the optical element 1408 and aimed to reflect from a particular portion of the optical element 1408, this is merely an example. The IR diode 1410 can be disposed at an suitable angle, and can be aimed at any suitable position, such that the beam enters the aperture stop of the lens system 1406, reflects from the IR filter 1404, and exits the aperture stop of the lens system 1406 such that the beam is reflected toward the sensor 1412. The precise angle and aiming position can be adjusted based on the optical design of the lens system 1406 (e.g., based on an objective lens that is being monitored). In a more particular example, the IR laser diode 1410 can be disposed such that the IR light reflected toward the target side of the lens system 1406 travels along a path that is disposed at an angle to the optical axis of the lens system 1406 (i.e., not parallel to the optical axis). In such an example, the IR light reflected toward the target side of the lens system 1406 can be configured to travel along a path that is within about 10 degrees of parallel to the optical axis (e.g., ±10°, but not 0°) If the IR laser diode 1410 is disposed to intersect the target side of the lens system off the optical axis and/or at an angle to the optical axis, the return path of the IR light can be expected to be substantially different than the forward path through the lens system (e.g., the path of the light is affected by the optical power of the lens system). In such an example, as the optical power of the lens system 1406 changes, intentionally (e.g., due to a change in a control signal supplied to a liquid lens) and/or unintentionally (e.g., due to a temperature induced-change in properties of a liquid lens), the round-trip path of the IR light can be expected to change.

Note that if the IR laser diode 1410 is disposed at 45 degrees to the optical component 1408 and intersects the optical component 1408 at the optical axis of the lens system 1406, the return path of the IR light can be expected to be substantially the same as the forward path through the lens system regardless of differences in optical power caused by changes in temperature (e.g., the path of the light would be unaffected by the optical power of the lens system).

As described below in connection with FIG. 15, in some embodiments, system 1400 can use information derived from the sensor 1412 to control an active lens component of lens system 1406. For example, the processor 50 (or any other suitable processor) can receive an output from sensor 1412 when lens system 1406 is focused at a set focal distance (e.g., such that a target distance is included in the depth of field of the system 1400), and can determine a position of an IR light beam received at sensor 1412. In such an example, the processor 50 (or any other suitable processor) can receive an output from sensor 1412 periodically (e.g., at regular and/or irregular intervals), and can determine a current position of an IR light beam received at sensor 1412. The processor 50 can drive one or more components of the lens system 1406 (e.g., a liquid lens) based on a difference between the current position of the IR light beam and the recorded location of the IR light beam. In some embodiments, the IR beam received at sensor 1412 can be about 0.6 millimeters (mm) in diameter (e.g., about 30 pixels of a CCD image sensor), and system 1400 can attempt to maintain a position of the center of the IR beam within 0.001 mm (e.g., 1 micron) of the initial position, which can maintain a stable focal distance for the lens system.

As another example, the processor 50 (or any other suitable processor) can determine that the lens system 1406 is to be focused at a particular focal distance, and can determine a location on the sensor 1412 corresponding to the set focal distance (e.g., based on a calibration of the system 1400), and can drive one or more components of the lens system 1406 (e.g., a liquid lens) based on a difference between a current position of the IR light beam and the location corresponding to the set focal distance.

FIG. 14B is a side view illustrating another example of a system for controlling a focusing element susceptible to temperature effects using internally reflected light. FIG. 14B shows an example of a system 1420 that includes the image sensor 1402, the infrared (IR) reflective IR filter 1404, the optical element 1408, the IR laser diode 1410, sensor 1412, and a lens system 1422 that includes multiple lenses that can focus an image of a target onto the image sensor 1402.

In some embodiments, the lens system 1422 can include a liquid lens 1424 with a variable focus that can be controlled by applying a control signal. For example, the liquid lens 1424 can be any suitable liquid lens that is susceptible to temperature effects, such as a liquid lens described above in connection with FIGS. 1 to 6.

In some embodiments, the system 1420 can operate in a similar manner to system 1400. For example, light from the IR laser diode 1410 can be positioned to emit light that is reflected by the optical element 1408 through the lens system 1422 onto the IR filter 1404 and back through the lens system 1422. After a round trip, the light can be reflected again by the optical element 1408 to be detected by the sensor 1412. In some embodiments, the IR laser diode 1410 and the optical element 1408 can be positioned to cause light to pass near an optical axis when the light passes through an aperture of the lens system 1422.

Note that although systems 1400 and 1420 are described in connection with an IR laser diode, this is merely an example, and any suitable light source configured to emit any suitable wavelength(s) of light can be used. For example, in some embodiments, a visible light source can be used in addition to, or in lieu of, the IR laser diode 1410. In such an example, the image sensor 1402 can be configured to generate image data using non-visible light (e.g., IR light), and a visible light filter can be used in lieu of the IR filter 1404. As another example, a light source that emits light in a wavelength that is utilized by the image sensor 1402 can be used in addition to, or in lieu of, the IR laser diode 1410. In such an example, a filter that reflects a portion of light from the light source can be used in addition to, or in lieu of, the IR filter 1404.

Figure 15:
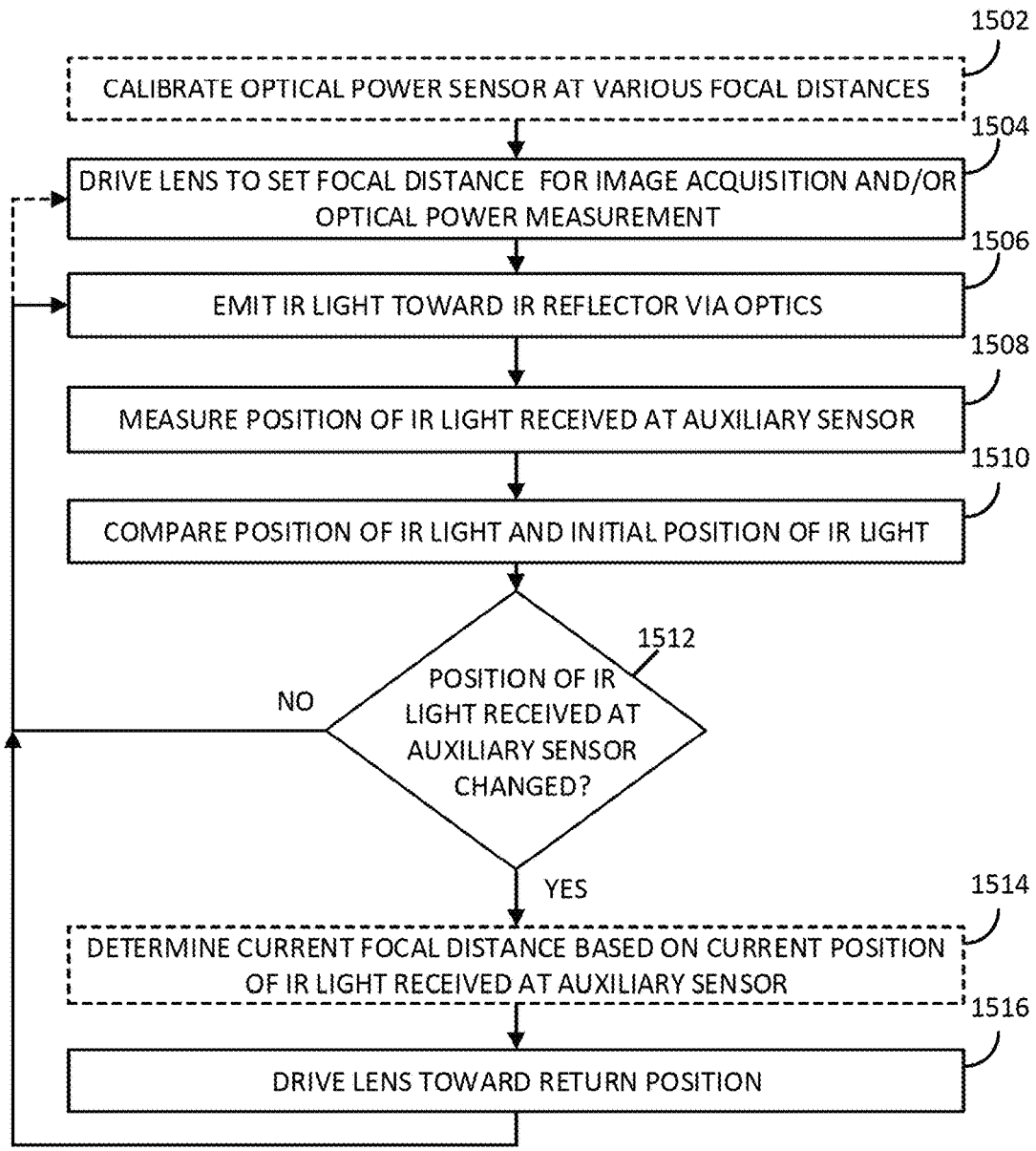
FIG. 15 is a flow chart of a method associated with controlling a focusing element susceptible to temperature effects using a system for controlling a focusing element susceptible to temperature effects using internally reflected light.

FIG. 15 is a flow chart of a method associated with controlling a focusing element susceptible to temperature effects using a system for controlling a focusing element susceptible to temperature effects using internally reflected light. Referring to FIG. 15, a method 1500 is shown for controlling a focusing element susceptible to temperature effects using internally reflected light. At process block 1502, a processor executing at least a portion of method 1500 (e.g., the processor 50 and/or any other suitable processor) can calibrate an optical power sensor (e.g., including the optical element 1408, the IR laser diode 1410, and the sensor 1412) to determine a location of a beam on the sensor (e.g., the sensor 1412) at various focal distances.

For example, the processor can drive the lens system to focus at various distances, and can determine a location of the beam at each focal distance. The processor can record the locations of the beam on the sensor in connection with the known focal distances. The location can later be used as a reference to determine a focal distance of the lens system and/or to drive the lens system to a particular focal distance. In such an example, the locations of the beams can be used to empirically determine the focal distance as the same beam location on the sensor can be expected to correspond to the same focal distance regardless of environmental conditions. In a more particular example, as the temperature of a liquid lens changes the optical power of the liquid lens may be affected.

In some embodiments, process block 1502 can be omitted. For example, a beam location on the sensor can be used as a source of feedback regardless of whether an explicit correlation between location and focal distance is known. As described below, the processor can adjust a magnitude of a control signal (e.g., provided to the liquid lens) in response to any changes in beam location, which can facilitate maintaining a stable position of the beam (and thereby maintaining a stable focal distance).

At process block 1504, a processor executing at least a portion of method 1500 (e.g., processor 50 and/or any other suitable processor) can drive a lens system to a set focal distance for image acquisition and/or a set focal distance for measuring changes in optical power. For example, the processor can perform an autofocus algorithm to attempt to find a focal distance to use for image acquisition. As another example, the processor can set a predetermined focal distance (e.g., based on input received from an external source). In some embodiments, the processor can drive the lens system to a set focal distance using any suitable technique or combination of techniques. For example, the processor can provide a control signal to a liquid lens that causes the liquid lens to change shape and alter a focal distance of the lens system. In some embodiments, the method 1500 can be carried out with the lens system (e.g., a liquid lens in the lens system 1406) in a neutral state (which can be referred to as a relaxed state).

At process block 1506, a processor executing at least a portion of method 1500 (e.g., processor 50 and/or any other suitable processor) can cause an IR laser diode (e.g., IR laser diode 1410) to emit light toward an IR reflector (e.g., IR filter 1404) via various optical elements (e.g., optical element 1408, lens system 1406, etc.). As noted above in connection with FIG. 14B, this is merely an example and any suitable wavelength(s) of light can be used in method 1500.

At process block 1508, a processor executing at least a portion of method 1500 (e.g., processor 50 and/or any other suitable processor) can measure a position of an IR light beam received at an auxiliary sensor (e.g., sensor 1412). In some embodiments, the position of the IR light beam can be measured using any suitable technique or combination of techniques. For example, a center of the beam can be found by calculating a weighted arithmetic mean of the pixels of the auxiliary sensor, using a fitted Gaussian curve, etc.

In some embodiments, the processor can record the position of the IR light beam at a first time (e.g., using memory 56) as a reference position, and can measure a position of the IR beam at subsequent times (e.g., in subsequent control loops) to determine whether the lens system has drifted from the initial focal distance.

At process block 1510, a processor executing at least a portion of method 1500 (e.g., processor 50 and/or any other suitable processor) can compare a current position of the IR light and an initial position of the IR light using any suitable technique or combination of techniques. For example, the processor can calculate a difference between the current position and the initial position. As another example, the processor can calculate a vector from the current position to the initial position. As yet another example, the processor can transform position into a 1-dimensional variable (e.g., via a mapping between position and focal distances), and can determine a difference between the value corresponding to the current position and the value corresponding to the initial position.

At decision block 1512, a processor executing at least a portion of method 1500 (e.g., processor 50 and/or any other suitable processor) can determine whether a position of the IR light received at the auxiliary sensor (e.g., sensor 1412) has changed. In some embodiments, the processor can determine whether the position has changed by at least a threshold amount (e.g., changes of less than 1 micron from the initial position can be disregarded in some embodiments).

If the processor determines that the position has not changed ("NO" at 1512), the method 1500 can return to process block 1506. In some embodiments, the method can emit IR light at 1506 periodically (e.g., at regular and/or irregular intervals). For example, after processor determines that the position has not changed at decision block 1512, the processor can wait a predetermined amount of time before returning to 1506. In some embodiments, if the processor (e.g., processor 50 and/or any other suitable processor) has caused a change in focal distance, the method 1500 can return to 1504 to drive the lens system to the appropriate focal distance.

Otherwise, if the processor determines that the position has changed ("YES" at 1512), the method 1500 can move to process block 1514. At process block 1514, the processor can determine a current focal distance based on the current position of the IR light received at the auxiliary sensor (e.g., based on calibration values determined at 1502). For example, the processor can determine a focal distance associated with the current position based on values in a lookup table generated at process block 1502, based on a curve generated at process block 1502, based on a formula generated at process block 1502, etc. In some embodiments, process block 1514 can be omitted and the method can move to process block 1516 from decision block 1512 when the position has changed.

In some embodiments, in response to the processor determining that the position has changed ("YES" at 1512), the processor can drive the lens system to a neutral position (e.g., by inhibiting a drive signal from being applied to a liquid lens), and can measure the position of the IR beam when the lens system is in the neutral state. For example, 1504 to 1512 can be carried out while the lens system is set to a focal distance for image acquisition, and if a change in a position of the IR beam is detected at 1512, the processor can drive the lens system to a neutral state (e.g., by inhibiting a control signal from being applied), and can check a position of the IR beam in the neutral state to a calibrated position of the IR beam in the neutral state recorded at 1502. As another example, 1504 to 1512 can be carried out while the lens system is set to a neutral state. In such an example, the method can move to 1514 or 1516 after determining that a position has changed at 1512.

At process block 1516, a processor executing at least a portion of method 1500 (e.g., processor 50 and/or any other suitable processor) can drive the lens system toward a return position (e.g., the set focal distance) based on the comparison of the current position of the IR beam and the initial position of the IR beam. After driving the lens to the return position, the method 1500 can return to 1506. In some embodiments, the method 1500 can return to process block 1506 after a predetermined amount of time has elapsed since the IR light was last emitted.

Figure 16A:
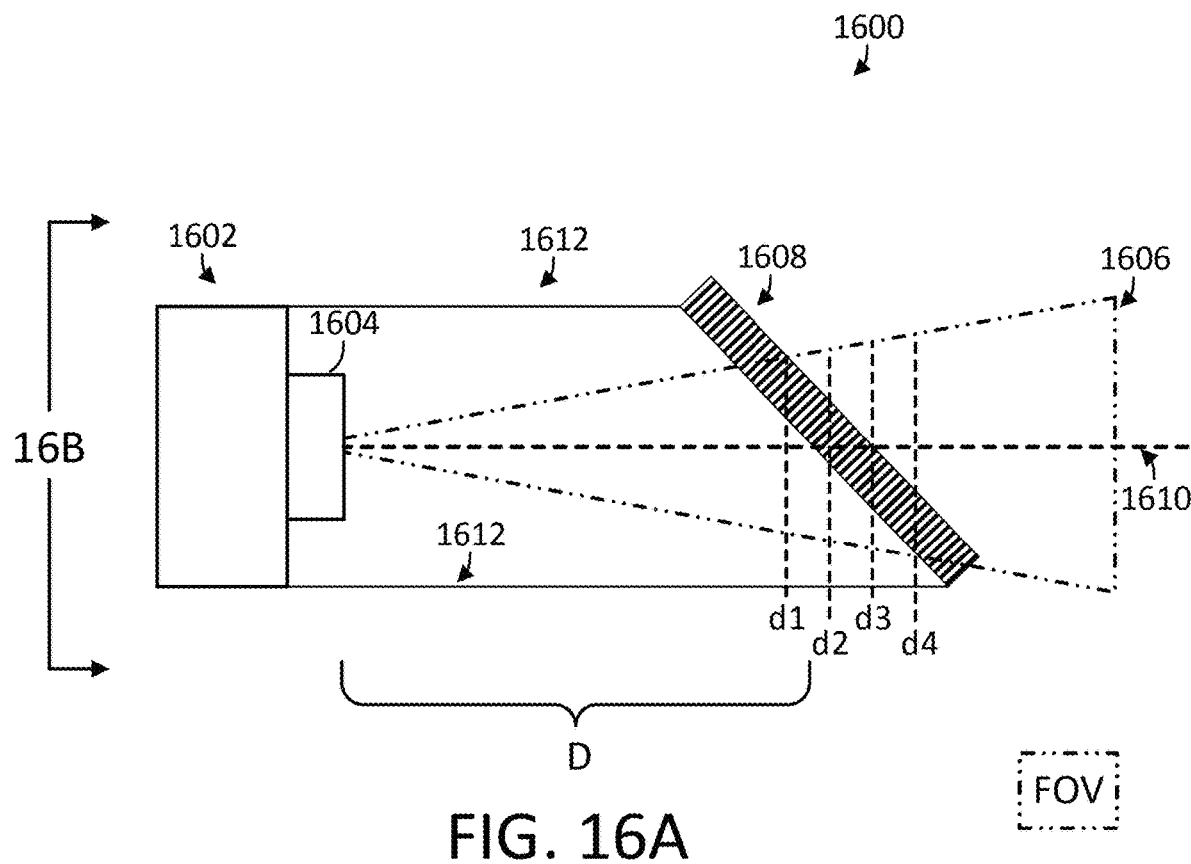
FIG. 16A is a top view illustrating an example of a system for controlling a focusing element susceptible to temperature effects using a patterned target at a relatively close known distance from the focusing element.

FIG. 16A is a top view illustrating an example of a system for controlling a focusing element susceptible to temperature effects using a patterned target at a relatively close known distance from the focusing element. FIG. 16A shows an example of a system 1600 that includes an imaging device 1602 (e.g., the symbol reader 20) having a lens assembly 1604 (e.g., including the lens housing 40 and the adjustable focal length lens 36) which can have a field of view 1606. As described above, the adjustable focal length lens can include a multi-focal liquid lens and/or any other suitable components. For example, the adjustable focal length lens can be implemented using the lens system 1422 shown in FIG. 14B.

In some embodiments, a patterned target 1608 can be provided in the field of view 1606 at a distance D from the lens assembly 1604. Note that while the patterned target 1608 is illustrated facing toward the viewer (e.g., perpendicular to an optical axis 1610 of the lens assembly 1604), this is merely to show a pattern provided on the patterned target 1608, and the patterned target 1608 can be positioned to occlude a portion of the field of view 1606.

In some embodiments, the patterned target 1608 can include a patterned surface that includes a pattern that can be used by the imaging device 1602 to determine a current focal distance of the adjustable focal length lens. For example, the pattern can be formed by a series of stripes (e.g., black and white stripes). In a more particular example, the stripes can be arranged at an angle other than perpendicular to the long axis of the patterned target 1608 (e.g., at an angle of about 2° to about 20°). As another more particular example, the stripes can be arranged to be substantially perpendicular to a long axis of the patterned target 1608. As another example, the pattern can be formed using other geometric shapes, such as tiled squares, triangles, etc. Note that although the patterned target 1608 is described as having a black and white pattern, this is merely an example and the patterned target can be any suitable colors (e.g., two or more contrasting colors). In some embodiments, angling a pattern that includes straight lines (e.g., a pattern of stripes, a tile pattern, etc.) with respect to one or more axes of the image sensor (e.g., defined by the rows and/or columns of photodetectors) can reduce the potential impact of aliasing that can occur when the frequency of the pattern exceeds half the lateral (and/or horizontal, depending on the shape and/or orientation of the pattern) sampling frequency of the image sensor. Angling can facilitate a row (and/or column, depending on shape and/or orientation of the pattern) being treated as a phase-shifted sampling of the same basic signal, which can increase the amount of information that can be extracted from the image of the pattern.

In some embodiments, the patterned target 1608 can be angled with respect to the optical axis 1610 such that part of the pattern is closer to the lens assembly 1604 and part of the pattern is farther from the lens assembly 1604. For example, the patterned target 1608 can be rotated in a range of about 10 degrees and 80 degrees with respect to the optical axis. As another example, the patterned target 1608 can be rotated by between about 20 degrees and 70 degrees with respect to the optical axis. As yet another example, the patterned target 1608 can be rotated by between about 30 degrees and 60 degrees with respect to the optical axis. As still another example, the patterned target 1608 can be rotated by between about 40 degrees and 50 degrees with respect to the optical axis. The distance D from the lens assembly 1604 to a center of the pattern can be any suitable distance. For example, the distance D can be as small as a shortest imaging distance of imaging device 1602, to at least a working distance of the imaging device 1602. In a more particular example, D can be in a range of about 50 mm to about 4 meters (m). As another more particular example, the distance D can be in a range of about 100 mm to about 2 m. As yet another more particular example, the distance D can be in a range of about 300 mm to about 2 m. As still another more particular example, the distance D can be in a range of about 500 mm to about 2 m. As still another more particular example, the distance D can be in a range of about 100 mm to about 300 mm.

In some embodiments, one or more members 1612 can be mechanically coupled to the imaging device 1602 and the patterned target 1608, and can position the patterned target 1608 at a particular distance (e.g., such that a central point of the patterned target 1608 is the distance D from the lens assembly 1604). In some embodiments, the one or more members 1612 can be configured to position the patterned target 1608 to block a portion of the field of view 1606, such as a lower portion of the field of view 1606 always includes at least a portion of the patterned target 1608. Additionally or alternatively, the one or more members can be configured to position the patterned target 1608 to block any other suitable portion(s) of the field of view 1606, such as a top portion or a side portion.

As described below in connection with FIG. 20A, the imaging device 1602 can capture an image of the field of view 1606, which can include at least a portion of the patterned target 1608 and a portion of a scene that may include a target item associated with a symbol (e.g., an item that includes a bar code, a QR code, or any other suitable type of machine readable code). The imaging device can use the portion of the image that includes the patterned target 1608 to determine a current focal distance of the lens assembly 1604. In some embodiments, the imaging device 1602 (e.g., using the processor 50) can estimate image sharpness at various positions corresponding to the patterned target 1608. A portion of the image with the highest sharpness can indicate a focal distance of the variable length focal lens. For example, as the focal distance of the lens assembly 1604 increases a closer portion of the patterned target 1608 can becomes less sharp in an image captured via the lens assembly 1604, and sharpness of a portion of the patterned target 1608 that is farther from the lens assembly 1604 can increase. In some embodiments, the imaging device 1602 can use any suitable technique or combination of techniques to determine a sharpness of the image of the patterned target 1608. For example, the imaging device 1602 can calculate a modulation transform function (MTF) for various portions of the image. In a more particular example, the imaging device 1602 calculate MTF50 (an indication of a spatial frequency at which MTF is 50% of the low frequency MTF) for various portion of the image. In some embodiments, any suitable technique can be used to calculate MTF, such as conventional techniques for calculating MTF.

In some embodiments, if the MTF is at a maximum at a position corresponding to a portion of the patterned target 1608 at a distance d1, d2, d3, or d4, the imaging device can use information about the distance as feedback to control a variable focus optical element of the lens assembly 1604 (e.g., a liquid lens). Alternatively, if the patterned target 1608 is perpendicular to the optical axis of the imaging device 1602, the imaging device 1602 can calculate an MTF for the portion of the FOV corresponding to the patterned target (e.g., having a known pattern at a known distance), and can use the MTF to estimate the current focal distance of the lens assembly (e.g., based on a model of the lens assembly, based on calibrated MTF values and associated focal distances).

As described below in connection with FIG. 20B, the imaging device 1602 can capture an image of the field of view 1606, which can include at least a portion of the patterned target 1608 and a portion of a scene that may include a target item associated with a symbol (e.g., an item that includes a bar code, a QR code, or any other suitable type of machine readable code). The imaging device 1602 can use the portion of the image that includes the patterned target 1608 to estimate a temperature of the adjustable focal length lens and/or current temperature effect on the optical power of the adjustable focal length lens. In some embodiments, the imaging device 1602 (e.g., using the processor 50) can estimate the temperature of the adjustable focal length lens and/or current temperature effect on the optical power of the adjustable focal length lens. A portion of the image with the highest sharpness can be indicative of a current temperature of the adjustable focal length lens and/or a temperature effect on the optical power of the adjustable focal length lens caused by the current temperature of the adjustable focal length lens. For example, as the focal distance of the lens assembly 1604 changes due to temperature, portions of the patterned target 1608 can becomes more and less sharp in an image captured via the lens assembly 1604. In some embodiments, the imaging device 1602 can use any suitable technique or combination of techniques to estimate a current temperature of the adjustable focal length lens and/or a temperature effect on the optical power of the adjustable focal length lens caused by the current temperature of the adjustable focal length lens. For example, the imaging device 1602 can calculate an MTF for various portions of the image, and can estimate a current temperature and/or temperature effect of the adjustable focal length lens based on a control signal applied to the lens, and a location of a maximum MTF (e.g., relative to an initial location of the maximum MTF).

Figure 16B:
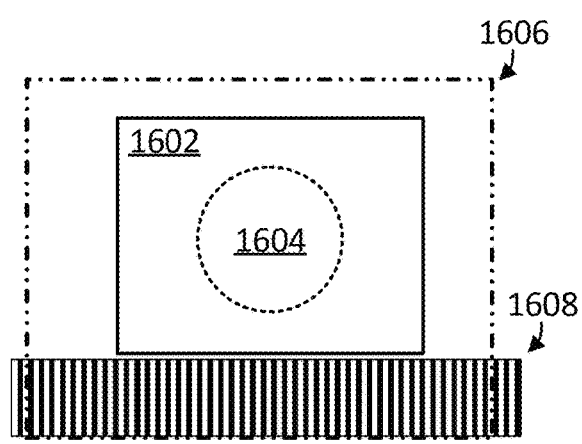
FIG. 16B is a rear view illustrating the example of the system illustrated in FIG. 16A.

FIG. 16B is a rear view illustrating the example of the system illustrated in FIG. 16A. As shown in FIG. 16B, at least a portion of the patterned target 1608 can be positioned within the field of view 1606 of the imaging device 1602. Each image captured by the imaging device 1602 can include the patterned target 1608.

Figure 16C:
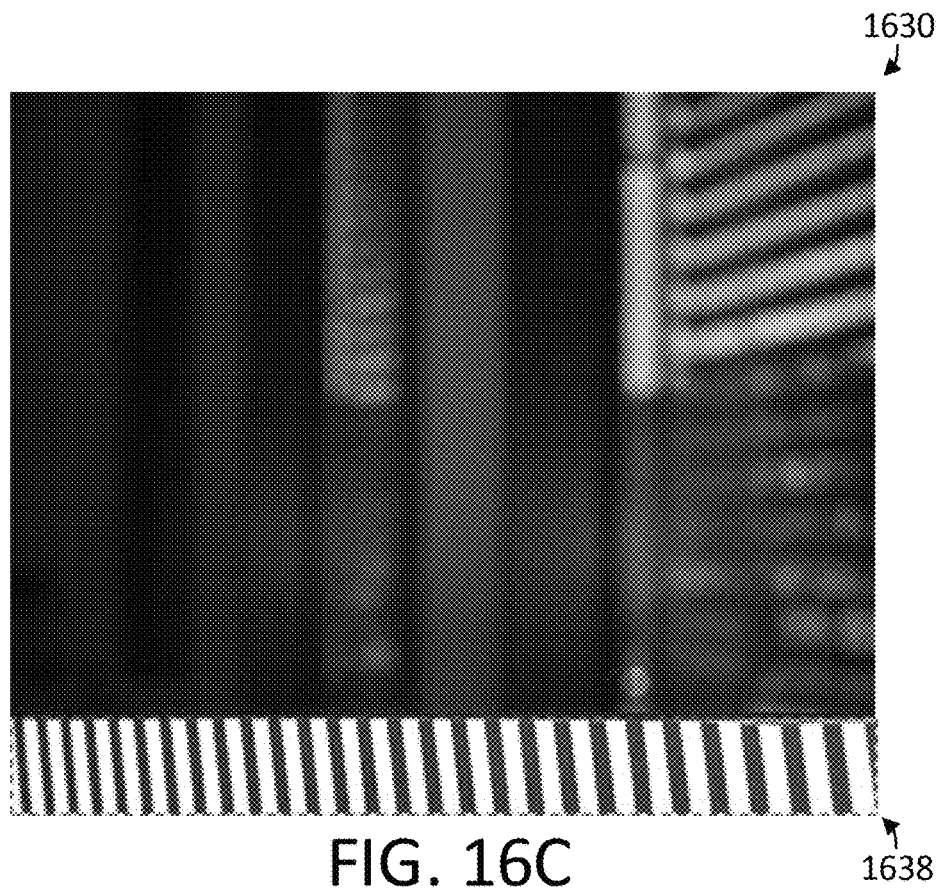
FIG. 16C is an example of an image that includes an angled patterned target positioned at a relatively close known distance from the focusing element of an imaging device.

FIG. 16C is an example of an image 1630 that includes an angled patterned target positioned at a relatively close known distance from the focusing element of an imaging device. In FIG. 16C, a portion 1638 of the image 1630 is pattern corresponding to a patterned target (e.g., a pattern similar to the patterned target 1608 but with angled lines). The stripes in image portion 1638 vary in width, increasing from left to right. Note that this effect is due to the angle of the patterned target which has uniform stripe widths. In some embodiments, the patterned target can have stripes that vary in width. For example, the stripes of the patterned target can be configured to be wider at a portion of the patterned target that is farther from the imaging device and narrower at a portion of the patterned target that is closer to the imaging device. In such an example, the image of the patterned target captured by the imaging device can include stripes that are more uniform in width (e.g., the stripes can appear to have a uniform width in the captured image).

Figure 16D:
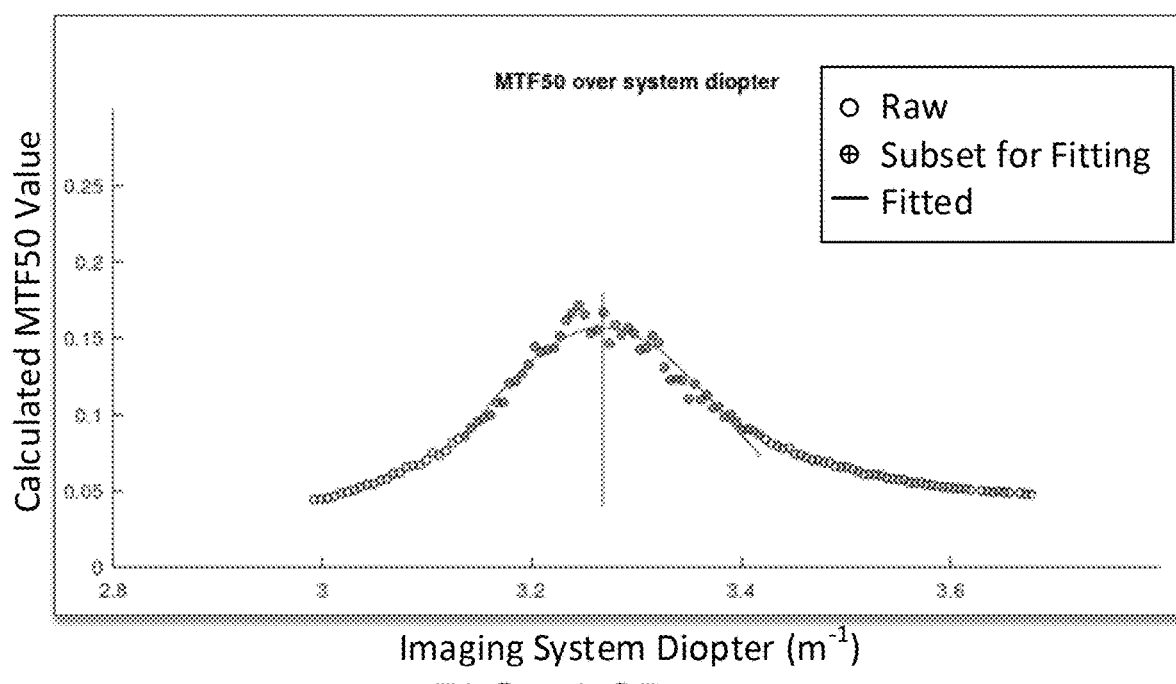
FIG. 16D is a chart of MTF50 estimated from the image portion shown in FIG. 16C.

FIG. 16D is a chart of MTF50 estimated from the image portion 1638 shown in FIG. 16C. As shown in FIG. 16D, MTF50 can be calculated for various regions of interest in the image portion 1638, and a subset of the MTF50 values can be selected for use in estimating a local maximum. The local maximum can be used to determine a current focal plane distance of the imaging system (which is sometimes referred to as the system diopter). In some embodiments, the imaging device 1602 (and/or any suitable computing device) fit a curve using the subset of the MTF50 values, and can identify a maximum value of the curve to be the location of the local maximum. For example, the imaging device 1602 (and/or any suitable computing device) can carry out a least-square regression over a Gaussian distribution based on the subset of values. In such an example, the maximum value can be directly expressed as a coefficient of the fitter function, which can be used to determine the distance of the focal plane.

Figure 17A:
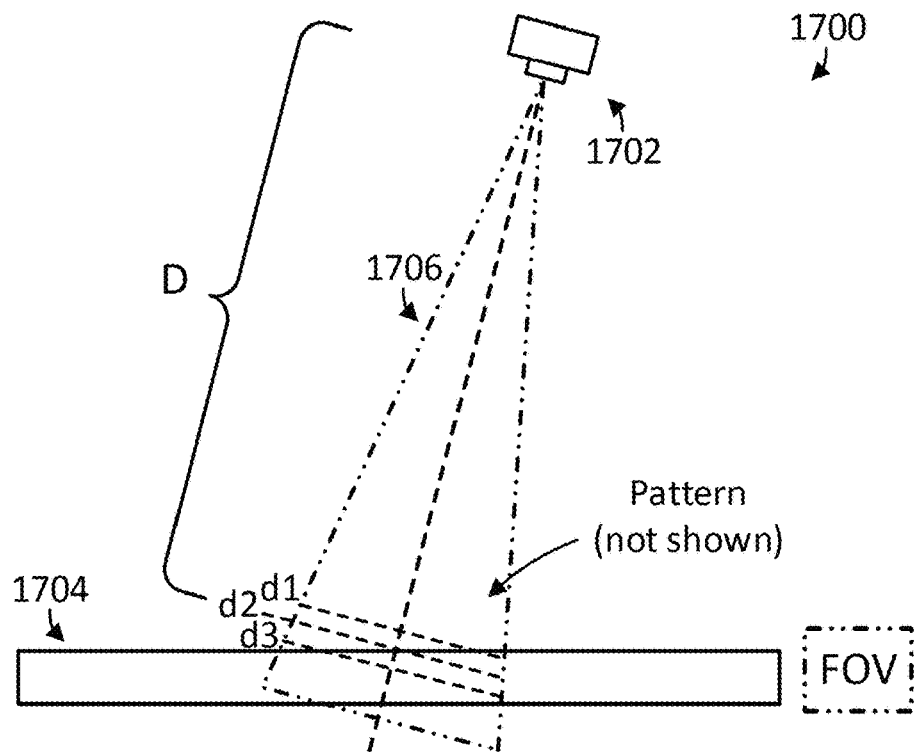
FIG. 17A is a side view illustrating an example of a system for controlling a focusing element susceptible to temperature effects using a patterned target at a known distance from the focusing element.

FIG. 17A is a side view illustrating an example of a system for controlling a focusing element susceptible to temperature effects using a patterned target at a known distance from the focusing element. FIG. 17A shows an example of a system 1700 that includes an imaging device 1702 (e.g., the symbol reader 20) position above a surface 1704. As described above in connection with FIG. 16A, imaging device 1702 can include a lens assembly (e.g., including the lens housing 40 and the adjustable focal length lens 36) which can have a field of view 1706. In some embodiments, the imaging device 1702 can include a liquid lens with a variable focus that can be controlled by applying a control signal. In some embodiments, the surface 1704 can include be a movable surface (e.g., a conveyor belt, conveyor rollers) that can be used to convey objects through the field of view 1706 of the imaging device 1702 (e.g., objects associated with one or more machine readable symbols). Additionally or alternatively, surface 1704 can be a static surface (e.g., a benchtop, a countertop, a table, etc.) that can be used to position an object for scanning by the imaging device 1702.

Figure 17B:
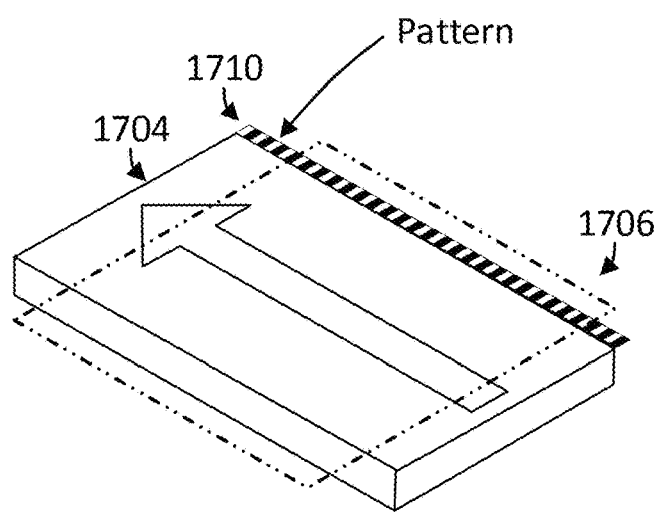
FIG. 17B is a perspective view illustrating a portion of the example of the system illustrated in FIG. 17A.

In some embodiments, the imaging device 1702 can be positioned (e.g., via one or more members, which may or may not be mechanically coupled to the surface 1704) at a particular distance from the surface 1704 and the associated patterned target (e.g., such that a central point of the patterned target is the distance D from the imaging device 1702). In some embodiments, the imaging device 1702 can be positioned such that the patterned target and a portion of the surface 1704 are included in the field of view 1706 (e.g., as shown in FIG. 17B), such that a portion of the field of view 1706 always includes at least a portion of the patterned target. The distance D from the imaging device 1702 to a center of the pattern can be any suitable distance. For example, the distance D can be as small as a shortest imaging distance of imaging device 1702, to at least a working distance of the imaging device 1702. In a more particular example, D can be in a range of about 50 mm to about 4 m. As another more particular example, the distance D can be in a range of about 100 centimeters (cm) to about 2 m. As yet another more particular example, the distance D can be in a range of about 120 cm to about 180 cm.

In some embodiments, the system 1700 can operate in a similar manner to system 1600. For example, as described below in connection with FIGS. 20A and 20B, the imaging device 1702 can capture an image of the field of view 1706, which can include at least a portion of the patterned target, a portion of the surface 1704, and at least a portion of a target item positioned on the surface 1704, which can be associated with a symbol (e.g., an item that includes a bar code, a QR code, or any other suitable type of machine readable code). The imaging device 1702 can use the portion of the image that includes the patterned target to determine a current focal distance of the lens assembly and/or a current effect of temperature on the focal distance of the lens assembly. In some embodiments, the imaging device 1702 (e.g., using the processor 50) can estimate image sharpness at various positions corresponding to the patterned target, and a portion of the image with the highest sharpness can indicate a focal distance of the variable length focal lens.

For example, as the focal distance of the lens assembly increases a closer portion of the patterned target can becomes less sharp in an image captured via the lens assembly, and sharpness of a portion of the patterned target that is farther from the lens assembly can increase. In some embodiments, the imaging device 1702 can use any suitable technique or combination of techniques to determine a sharpness of the image of the patterned target. For example, the imaging device 1702 can calculate an MTF for various portions of the image. In a more particular example, the imaging device 1702 calculate MTF50 (an indication of a spatial frequency at which MTF is 50% of the low frequency MTF) for various portion of the image.

In a more particular example, if the MTF is at a maximum at a position corresponding to a portion of the patterned target at a distance d1, d2, or d3, the imaging device 1702 can use information about the distance as feedback to control a variable focus optical element of the lens assembly (e.g., a liquid lens).

As described below in connection with FIG. 20B, the imaging device 1702 can capture an image of the field of view 1706, which can include at least a portion of the patterned target 1710 and a portion of a scene that may include a target item associated with a symbol (e.g., an item that includes a bar code, a QR code, or any other suitable type of machine readable code). The imaging device 1702 can use the portion of the image that includes the patterned target 1710 to estimate a temperature of the adjustable focal length lens and/or current temperature effect on the optical power of the adjustable focal length lens. In some embodiments, the imaging device 1702 (e.g., using the processor 50) can estimate the temperature of the adjustable focal length lens and/or current temperature effect on the optical power of the adjustable focal length lens.

FIG. 17B is a perspective view illustrating a portion of the example of the system illustrated in FIG. 17A. The surface 1704 can be associated with a patterned target 1710 that is positioned within the field of view 1706 of the imaging device 1702. As shown by the arrow in FIG. 17B, items can move along surface 1704 (e.g., on a conveyor belt, on conveyor rollers, etc.) such that a surface of the item passes through the field of view 1706. The imaging device 1702 can periodically (e.g., at regular and/or irregular intervals) capture an image that includes at least a portion of the patterned target 1710, and can use the portion of the image corresponding to the patterned target 1710 to estimate a current focal distance of the lens assembly of the imaging device 1702. As described above in connection with FIG. 16A, the patterned target 1710 can include stripes that are disposed perpendicular to the long axis of the patterned target 1710. Alternatively, the patterned target 1710 can include stripes that are tilted from perpendicular to the long axis. Additionally, stripes of the patterned target 1710 can have a uniform width or a non-uniform width. As described above in connection with FIG. 16C, stripes of uniform width can appear to have non-uniform widths in an image captured by imaging device 1702 due to the angle between the optical axis and the long axis of the patterned target. The patterned target 1710 can be configured to have stripes of non-uniform width that appear more uniform when captured by the imaging device 1702 from a particular position (at a particular height and angle with respect to the patterned target).

FIG. 18 is a top view illustrating another example of a system for controlling a focusing element susceptible to temperature effects using a patterned target at a known distance from the focusing element. FIG. 18 shows an example of a system 1800 that includes an imaging device 1802 (e.g., the symbol reader 20) position near a surface 1804. As described above in connection with FIG. 16A, imaging device 1802 can include a lens assembly (e.g., including the lens housing 40 and the adjustable focal length lens 36) which can have a field of view 1806. In some embodiments, the imaging device 1802 can include a liquid lens with a variable focus that can be controlled by applying a control signal. In some embodiments, a reflector 1808 can have a reflective surface 1810 that can cause the field of view 1806 to cross over the surface 1804, which can facilitate placement of imaging device 1802 close to surface 1804 while keeping a cross-sectional area of the field of view 1806 at a near side of the surface 1804 a reasonable size (e.g., to reduce the likelihood that a code on a surface of item close to the near side of the surface 1804 is outside of the field of view 1806).

In some embodiments, the surface 1804 can include be a movable surface (e.g., a conveyor belt, conveyor rollers) that can be used to convey objects through the field of view 1806 of the imaging device 1802 (e.g., objects associated with one or more machine readable symbols). Note that although the arrow in FIG. 18 indicates that items on surface 1804 move in a particular direction through the field of view 1806 this is merely an example, and items can move in any suitable direction. Additionally or alternatively, surface 1804 can be a static surface (e.g., a benchtop, a countertop, a table, etc.) that can be used to position an object for scanning by the imaging device 1802.

In some embodiments, the imaging device 1802 can be positioned (e.g., via one or more members, which may or may not be mechanically coupled to the surface 1804) at a particular distance from the reflective surface 1810, and a patterned target 1812 can be positioned on a far side of the surface 1804 (e.g., such that a central point of the patterned target 1812 is a distance D=D1+D2 from the imaging device 1802). For example, the distance D1 can be in a range of about 50 mm to about 2 m, and D can be in a range of about 300 mm to about 4 m. In a more particular example, D1 can be in range of about 500 mm to about 2 m, and D can be in a range of about 1 m to about 4 m. In some embodiments, the imaging device 1802 can be positioned such that the patterned target 1812 is included in the field of view 1806, unless it is occluded by an object on surface 1804. Note that while the patterned target 1812 is illustrated facing toward the viewer (e.g., perpendicular to an optical axis of the imaging device 1812), this is merely to show a pattern provided on the patterned target 1812, and the patterned target 1812 can be positioned to face toward reflective surface 1810.

In some embodiments, the system 1800 can operate in a similar manner to system 1700. For example, as described below in connection with FIG. 20A and 20B, the imaging device 1802 can capture an image of the field of view 1806, which can include at least a portion of the patterned target 1812 and an area above surface 1804. In such an example, the field of view 1806 can periodically (e.g., at regular and/or irregular intervals) include a portion of a target item positioned on the surface 1804, which can be associated with a symbol (e.g., an item that includes a bar code, a QR code, or any other suitable type of machine readable code). In the system 1800, the imaging device 1802 can be positioned to capture an image(s) of a side(s) of the target item facing the reflective surface 1810.

In some embodiments, the imaging device 1802 can use the portion of the image that includes the patterned target 1812 to determine a current focal distance of the lens assembly and/or a current effect of temperature on the focal distance of the lens assembly. In some embodiments, the imaging device 1802 (e.g., using the processor 50) can estimate image sharpness at various positions corresponding to the patterned target, and a portion of the image with the highest sharpness can indicate a focal distance of the variable length focal lens. If the patterned target 1812 is perpendicular to the optical axis of the imaging device 1802 (as shown in FIG. 18), the imaging device 1802 can calculate an MTF for the portion of the FOV corresponding to the patterned target (e.g., having a known pattern at a known distance), and can use the MTF to estimate the current focal distance of the lens assembly (e.g., based on a model of the lens assembly, based on calibrated MTF values and associated focal distances). For example, as the focal distance of the lens assembly increases, the pattern can become more or less sharp in an image captured via the lens assembly, and the imaging device 1802 can estimate a focal distance Alternatively, if the patterned target 1812 is tilted with respect to the optical axis, an optical path length between the patterned target 1812 and the imaging device 1802 can be shorter for one end of the patterned target 1812 and longer at the other end of the patterned target 1812. The patterned target 1812 can be tilted with respect to the optical axis using any suitable technique or combination of techniques. For example, as described above in connection with FIGS. 16A, 16B, 17A, and 17B, the patterned target can be mechanically tilted with respect to the optical axis. As another example, the reflective surface 1810 can be positioned such that an angle between the optical axis and the reflective surface is greater than or less than 45 degrees. Tilting the reflective surface 1810 can cause the optical axis of the imaging device 1802 to cross the surface 1804 at non-perpendicular angle, which can cause the field of view 1806 to be effectively tilted with respect to the patterned target 1812. In some embodiments, the patterned target 1812 can be effectively tilted with respect to the imaging device 1802 using a combination of techniques, for example by mechanically tilting the patterned target such that the left side (from the perspective of FIG. 18) is father from the surface 1804 than the right side, and by tilting the reflective surface 1810 to an angle greater than 45 degrees such that the field of view 1806 is rotated toward the imaging device 1802 (or vice versa, with the right side of patterned target 1812 being farther from the surface 1804 and the mirror tilted at an angle less than 45 degrees). For example, an angle between the mirror normal and the and the optical axis can be in a range of about 20 degrees to about 60 degrees.

In some embodiments, the imaging device 1802 can use any suitable technique or combination of techniques to determine a sharpness of the image of the patterned target. For example, the imaging device 1802 can calculate an MTF for various portions of the image. In a more particular example, the imaging device 1802 calculate MTF50 (an indication of a spatial frequency at which MTF is 50% of the low frequency MTF) for various portion of the image.

As described above in connection with FIG. 16A, the patterned target 1812 can include stripes that are disposed perpendicular to the long axis of the patterned target 1812. Alternatively, the patterned target 1812 can include stripes that are tilted from perpendicular to the long axis. Additionally, stripes of the patterned target 1812 can have a uniform width or a non-uniform width. As described above in connection with FIG. 16C, stripes of uniform width can appear to have non-uniform widths in an image captured by imaging device 1802 if the patterned target is tilted with respect to the optical axis. The patterned target 1812 can be configured to have stripes of non-uniform width that appear more uniform when captured by the imaging device 1802 from a particular position (at a particular height and angle with respect to the patterned target).

FIG. 19A is a top view illustrating yet another example of a system for controlling a focusing element susceptible to temperature effects using a patterned target at a known distance from the focusing element. FIG. 19A shows an example of a system 1900 that includes an imaging device 1902 (e.g., the symbol reader 20) position near a surface 1904. As described above in connection with FIG. 16A, imaging device 1902 can include a lens assembly (e.g., including the lens housing 40 and the adjustable focal length lens 36) which can have a field of view 1906. In some embodiments, the imaging device 1902 can include a liquid lens with a variable focus that can be controlled by applying a control signal. In some embodiments, a reflector 1908 can have a reflective surface 1910 that can cause the field of view 1906 to cross over the surface 1904, which can facilitate placement of imaging device 1902 close to surface 1904 while keeping a cross-sectional area of the field of view 1906 at a near side of the surface 1904 a reasonable size.

In some embodiments, the surface 1904 can include a movable surface (e.g., a conveyor belt, conveyor rollers) that can be used to convey objects through the field of view 1906 of the imaging device 1902 (e.g., objects associated with one or more machine readable symbols). Note that although the arrow in FIG. 19A indicates that items on surface 1904 move in a particular direction through the field of view 1906 this is merely an example, and items can move in any suitable direction. Additionally or alternatively, surface 1904 can be a static surface (e.g., a benchtop, a countertop, a table, etc.) that can be used to position an object for scanning by the imaging device 1902.

In some embodiments, the imaging device 1902 can be positioned (e.g., via one or more members, which may or may not be mechanically coupled to the surface 1904) at a particular distance from the reflective surface 1910, and a patterned target 1912 can be provided on reflective surface 1910 (e.g., such that a central point of the patterned target 1912 is a distance D from the imaging device 1902). For example, the distance D can be in a range of about 50 mm to about 3 m. In a more particular example, D can be in range of about 500 mm to about 2 m.

In some embodiments, the imaging device 1902 can be positioned such that the patterned target 1912 is always included in the field of view 1906. Note that while the patterned target 1912 is illustrated facing toward the viewer (e.g., perpendicular to an optical axis of the imaging device 1902), this is merely to show a pattern provided on the patterned target 1912, and the patterned target 1912 can be positioned to face toward imaging device 1902 (e.g., as shown in FIG. 19B). Note that although the patterned target 1912 is shown as occupying only a portion of the field of view 1906, this is merely an example chosen to illustrate the relative locations of the patterned target, the imaging device 1902, and the field of view 1906. As described below, using a different wavelength range to image patterned target than is used to scan for symbols can facilitate occupying a large portion of the field of view 1906 without substantially impacting performance of scanning processes. For example, the patterned target 1912 can fill at least half of the field of view. As another example, the patterned target 1912 can fill the entire field of view.

In some embodiments, the patterned target 1912 can be provided using a color or colors that are not used during scanning of items on surface 1904. For example, the imaging device 1902 can be configured to use red light to scan for symbols (e.g., a bar code, a QR code, or any other suitable type of machine readable code), and the patterned target 1912 can be provided in connection with the reflective surface 1910 using another color(s). In a more particular example, the patterned target 1912 can be provided by causing a portion of the surface to preferentially reflect green, blue, and/or any other suitable color(s) other than red (e.g., using colored pigment, using a color-selective reflective filter). As another more particular example, the patterned target 1912 can be provided by projecting light of another color (e.g., green, blue, and/or any other suitable color(s)) onto the reflective surface 1910 to form the patterned target. As yet another more particular example, the patterned target 1912 can be provided by emitting light of another color (e.g., green, blue, and/or any other suitable color(s)) through the reflective surface 1910 (e.g., using a light source(s) within reflector 1908).

As another example, the imaging device 1902 can be configured to use at least a portion of the visible spectrum (e.g., from about 380 nanometers (nm) to about 750 nm) to scan for symbols (e.g., a bar code, a QR code, or any other suitable type of machine readable code), and the patterned target 1912 can be provided using non-visible light (e.g., infrared light), or vice versa.

In some embodiments, the system 1900 can operate in a similar manner to system 1700. For example, as described below in connection with FIG. 20A and 20B, the imaging device 1902 can capture an image of the field of view 1906, which can include at least a portion of the patterned target 1912 and an area above surface 1904. In such an example, the field of view 1906 can periodically (e.g., at regular and/or irregular intervals) include a portion of a target item positioned on the surface 1904, which can be associated with a symbol (e.g., an item that includes a bar code, a QR code, or any other suitable type of machine readable code). In the system 1900, the imaging device 1902 can be positioned to capture an image(s) of a side(s) of the target item facing the reflective surface 1910.

In some embodiments, the imaging device 1902 can use the portion of the image that includes the patterned target 1912 to determine a current focal distance of the lens assembly and/or a current effect of temperature on the focal distance of the lens assembly. In some embodiments, the imaging device 1902 (e.g., using the processor 50) can estimate image sharpness at various positions corresponding to the patterned target, and a portion of the image with the highest sharpness can indicate a focal distance of the variable length focal lens and/or a current effect of temperature on the focal distance of the lens assembly.

For example, as the focal distance of the lens assembly increases a closer portion of the patterned target can becomes less sharp in an image captured via the lens assembly, and sharpness of a portion of the patterned target that is farther from the lens assembly can increase. In some embodiments, the imaging device 1902 can use any suitable technique or combination of techniques to determine a sharpness of the image of the patterned target. For example, the imaging device 1902 can calculate an MTF for various portions of the image. In a more particular example, the imaging device 1902 calculate MTF50 (an indication of a spatial frequency at which MTF is 50% of the low frequency MTF) for various portion of the image.

As described above in connection with FIG. 16A, the patterned target 1912 can include stripes that are disposed perpendicular to the long axis of the patterned target 1912. Alternatively, the patterned target 1912 can include stripes that are tilted from perpendicular to the long axis. Additionally, stripes of the patterned target 1912 can have a uniform width or a non-uniform width. As described above in connection with FIG. 16C, stripes of uniform width can appear to have non-uniform widths in an image captured by imaging device 1902 due to the angle of the patterned target 1912. The patterned target 1912 can be configured to have stripes of non-uniform width that appear more uniform when captured by the imaging device 1902 from a particular position (at a particular height and angle with respect to the patterned target).

FIG. 19B is a rear view illustrating the example of the system illustrated in FIG. 19A. As shown in FIG. 19B, at least a portion of the patterned target 1912 can be positioned within the field of view 1906 of the imaging device 1902. In some embodiments, each image captured by the imaging device 1902 can include the patterned target 1912. Alternatively, in embodiments in which the patterned target 1912 can be selectively provided (e.g., via light projected onto reflective surface 1910), a portion of images captured by the imaging device 1902 can include the patterned target 1912.

Figure 19C:
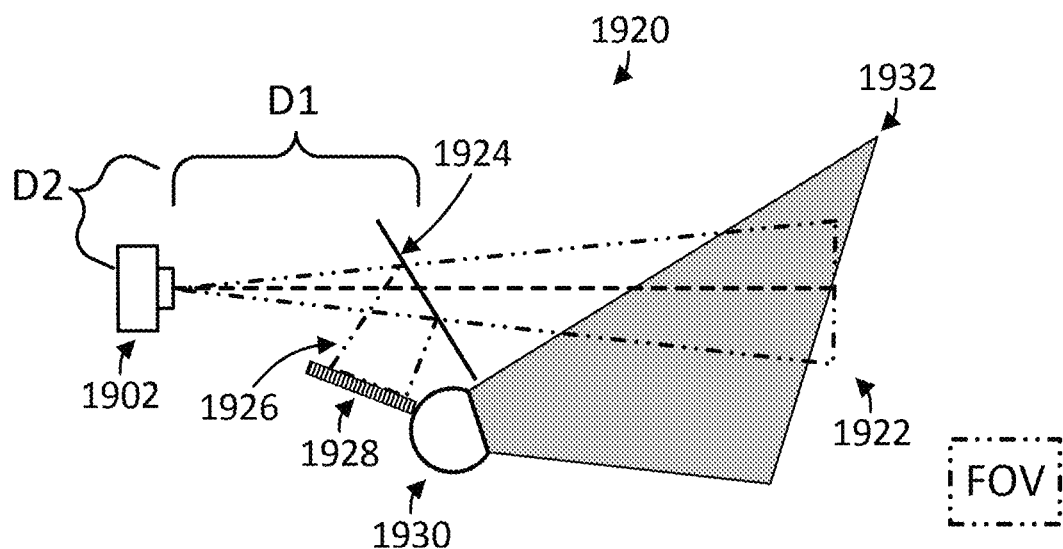
FIG. 19C is a top view top view illustrating still another example of a system for controlling a focusing element susceptible to temperature effects using a patterned target at a known distance from the focusing element.

FIG. 19C is a top view top view illustrating still another example of a system for controlling a focusing element susceptible to temperature effects using a patterned target at a known distance from the focusing element. FIG. 19C shows an example of a system 1920 that includes the imaging device 1902 (e.g., the symbol reader 20).

In some embodiments, the system 1920 can be disposed near a surface (e.g., the surface 1904) such that symbols on objects that pass through a field of view 1922 of the imaging device 1902 can be scanned. In some embodiments, the imaging device 1902 of the system 1920 can be positioned (e.g., via one or more members, which may or may not be mechanically coupled to the surface) at a particular distance from the surface. For example, the system 1920 can be positioned above the surface to capture a top-down view of the surface (e.g., as shown in FIG. 7 in connection with system 1700). As another example, the system 1920 can be positioned near a side of the surface to capture a side view of a space above the surface.

In some embodiments, the system 1920 can include a partially-reflective surface 1924 that can cause a second field of view 1926 to be deflected toward a patterned target 1928, while the field of view 1922 can cover a space associated with the surface. Note that although the field of view 1922 is shown as extending along the optical axis of the imaging device 1902, this is merely an example, and the field of view 1922 can be deflected (e.g., to one side) by a second reflector (e.g., positioned farther from the imaging device 1902 than the reflective surface 1924 to facilitate placement of imaging device 1902 close to the surface.

In some embodiments, the reflective surface 1924 can be positioned such that an optical axis of the imaging device 1902 intersects the reflective surface 1924 a distance D1 from the imaging device 1902, and the patterned target 1928 can be provided at a distance D2 from the reflective surface 1924 such that a central point of the patterned target 1924 is a distance D=D1+D2 from the imaging device 1902. For example, the distance D1 can be in a range of about 50 mm to about 2 m, and D can be in a range of about 300 mm to about 4 m. In a more particular example, D1 can be in range of about 500 mm to about 2 m, and D can be in a range of about 1 m to about 4 m.

In some embodiments, the reflective surface 1924 can be configured to selectively cause the patterned target 1928 to be included in the field of view 1922. For example, the imaging device 1902 can be configured to use red light to scan for symbols (e.g., a bar code, a QR code, or any other suitable type of machine readable code), and the patterned target 1928 can be imaged using another color(s). In a more particular example, the patterned target 1928 can be provided by causing the reflective surface 1924 to preferentially reflect green, blue, and/or any other suitable color(s) other than red (e.g., using colored pigment, using a color-selective reflective filter), and to transmit other colors (e.g., red). As another more particular example, the patterned target 1928 can be provided by projecting light of another color (e.g., green, blue, and/or any other suitable color(s)) onto the patterned target 1928 and/or the reflective surface 1924. As yet another more particular example, the patterned target 1928 can be provided by emitting light of another color (e.g., green, blue, and/or any other suitable color(s)) in a pattern corresponding to the patterned target 1928 (e.g., via a mask associated with the patterned target 1928, using a projector that can transmit the pattern associated with the patterned target 1928, etc.) toward the reflective surface 1924. As still another more particular example, the reflective surface 1924 can be configured to reflect the patterned target 1928 at particular times (e.g., by mechanically moving the reflective surface 1924 in and out of the field of view 1922, or by using a tunable active reflector). Note that this is merely an example, and the patterned target 1928 can be imaged using any suitable color or colors (including colors outside the visible spectrum).

Note that the patterned target 1928 can occupy any suitable portion of the field of view 1926. As described above, by selectively reflecting the patterned target (e.g., using a wavelength-selective reflector), the patterned target 1928 can occupy a large portion of the field of view 1926 without impacting the quality of images of objects captured using the field of view 1922. For example, the patterned target 1928 can fill at least half of the field of view 1926. As another example, the patterned target 1928 can fill the entire the field of view 1926.

In some embodiments, a light source 1930 can be positioned such that an illumination pattern 1932 substantially overlaps at least a portion of the field of view 1922. In some embodiments, the light source 1930 can be physically coupled to the imaging device 1902, the reflecting surface 1924, and/or the patterned target 1928. For example, as described above in connection with FIG. 16A, one or more members can be can be mechanically coupled to the imaging device 1902 and one r more of the reflecting surface 1924, the patterned target 1928, and/or the light source 1930. In some embodiments, the light source 1930 can generate the illumination pattern 1932 at a particular periodicity (e.g., at regular and/or irregular intervals), and images of the patterned target 1928 captured at times when the light source 1930 is not illuminated can be used to determine a metric associated with the imaging device 1902. Additionally or alternatively, in some embodiments, another light source (not shown) can illuminate the patterned target 1928 at regular and/or irregular intervals (e.g., when light source 1930 is not illuminated, when an object is not present within field of view 1922). For example, such a light source can be which may be associated with, or incorporated into, the imaging device 1902.

In some embodiments, the system 1920 can operate in a similar manner to system 1700. For example, as described below in connection with FIG. 20A and 20B, the imaging device 1902 can capture an image of the field of view 1926, which can include at least a portion of the patterned target 1928. In some embodiments, the imaging device 1902 can use the portion of the image that includes the patterned target 1928 to determine a current focal distance of the lens assembly and/or a current effect of temperature on the focal distance of the lens assembly. In some embodiments, the imaging device 1902 (e.g., using the processor 50) can estimate image sharpness at various positions corresponding to the patterned target, and a portion of the image with the highest sharpness can indicate a focal distance of the variable length focal lens and/or a current effect of temperature on the focal distance of the lens assembly.

Figure 19D:
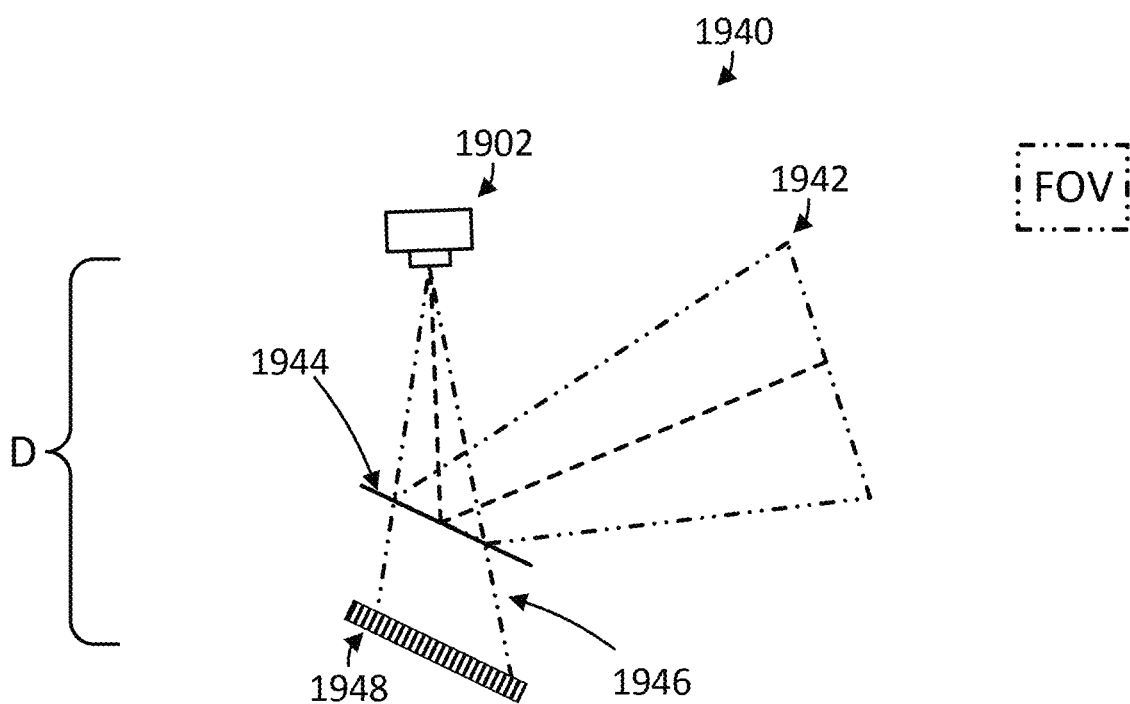
FIG. 19D is a top view top view illustrating a further example of a system for controlling a focusing element susceptible to temperature effects using a patterned target at a known distance from the focusing element.

FIG. 19D is a top view top view illustrating a further example of a system for controlling a focusing element susceptible to temperature effects using a patterned target at a known distance from the focusing element. FIG. 19D shows an example of a system 1940 that includes the imaging device 1902 (e.g., the symbol reader 20).

In some embodiments, the system 1940 can be disposed near a surface (e.g., the surface 1904) such that symbols on objects that pass through a field of view 1942 of the imaging device 1902 can be scanned. In some embodiments, the imaging device 1902 of the system 1940 can be positioned (e.g., via one or more members, which may or may not be mechanically coupled to the surface) at a particular distance from the surface. For example, the system 1940 can be positioned above the surface to capture a top-down view of the surface (e.g., by positioning the optical axis of the imaging device 1902 parallel to the surface). As another example, the system 1940 can be positioned near a side of the surface to capture a side view of a space above the surface (e.g., as described above in connection with FIGS. 18 and 19A).

In some embodiments, the system 1940 can include a partially-reflective surface 1944 that can cause the field of view 1942 to be deflected toward the surface, and allowing a second field of view 1946 to include a patterned target 1948 positioned behind the reflective surface 1944.

In some embodiments, the reflective surface 1944 can be positioned such that an optical axis of the imaging device 1902 intersects the patterned target 1948 a distance D from the imaging device 1902. For example, the distance D can be in a range of about 300 mm to about 4 m. In a more particular example, D can be in a range of about 1 m to about 4 m.

In some embodiments, the reflective surface 1944 can be configured to selectively cause the patterned target 1948 to be included in the field of view 1946. For example, the imaging device 1902 can be configured to use red light to scan for symbols (e.g., a bar code, a QR code, or any other suitable type of machine readable code), and the patterned target 1948 can be imaged using another color(s). In a more particular example, the patterned target 1948 can be provided by causing the reflective surface 1944 to preferentially transmit green, blue, and/or any other suitable color(s) other than red (e.g., using colored pigment, using a color-selective reflective filter), and to reflect other colors (e.g., red). As another more particular example, the patterned target 1948 can be provided by projecting light of another color (e.g., green, blue, and/or any other suitable color(s)) onto the patterned target 1948. As yet another more particular example, the patterned target 1948 can be provided by emitting light of another color (e.g., green, blue, and/or any other suitable color(s)) in a pattern corresponding to the patterned target 1948 (e.g., via a mask associated with the patterned target 1948, using a projector that can transmit the pattern associated with the patterned target 1948, etc.) toward the reflective surface 1944. As still another more particular example, the reflective surface 1944 can be configured to allow the imaging device 1902 to image the patterned target 1948 at particular times (e.g., by mechanically moving the reflective surface 1944 in and out of the field of view 1946, or by using a tunable active reflector). Note that this is merely an example, and the patterned target 1948 can be imaged using any suitable color or colors (including colors outside the visible spectrum).

Note that the patterned target 1948 can occupy any suitable portion of the field of view 1946. As described above, by selectively transmitting the patterned target (e.g., using a wavelength-selective reflector), the patterned target 1948 can occupy a large portion of the field of view 1946 without impacting the quality of images of objects captured using the field of view 1942. For example, the patterned target 1948 can fill at least half of the field of view 1946. As another example, the patterned target 1948 can fill the entire the field of view 1946.

Although not shown, in some embodiments, a light source can be positioned such that an illumination pattern substantially overlaps at least a portion of the field of view 1942. In some embodiments, the light source can incorporated into the imaging device 1902. Additionally or alternatively, the light source be physically coupled to the imaging device 1902, the reflecting surface 1944, and/or the patterned target 1948. For example, as described above in connection with FIG. 16A, one or more members can be can be mechanically coupled to the imaging device 1902 and one or more of the reflecting surface 1944, the patterned target 1948, and/or the light source. In some embodiments, the light source can generate the illumination pattern at a particular periodicity (e.g., at regular and/or irregular intervals), and images of the patterned target 1948 captured at times when the light source is not illuminated can be used to determine a metric associated with the imaging device 1902. Additionally or alternatively, in some embodiments, another light source (not shown) can illuminate the patterned target 1948 at regular and/or irregular intervals (e.g., when the light source used is not illuminated, when an object is not present within field of view 1922). For example, such a light source can be associated with, or incorporated into, the reflective surface 1944 (e.g., on a side facing the patterned target 1948).

In some embodiments, the system 1940 can operate in a similar manner to system 1700. For example, as described below in connection with FIG. 20A and 20B, the imaging device 1902 can capture an image of the field of view 1946, which can include at least a portion of the patterned target 1948. In some embodiments, the imaging device 1902 can use the portion of the image that includes the patterned target 1948 to determine a current focal distance of the lens assembly and/or a current effect of temperature on the focal distance of the lens assembly. In some embodiments, the imaging device 1902 (e.g., using the processor 50) can estimate image sharpness at various positions corresponding to the patterned target, and a portion of the image with the highest sharpness can indicate a focal distance of the variable length focal lens and/or a current effect of temperature on the focal distance of the lens assembly.

Figure 20A:
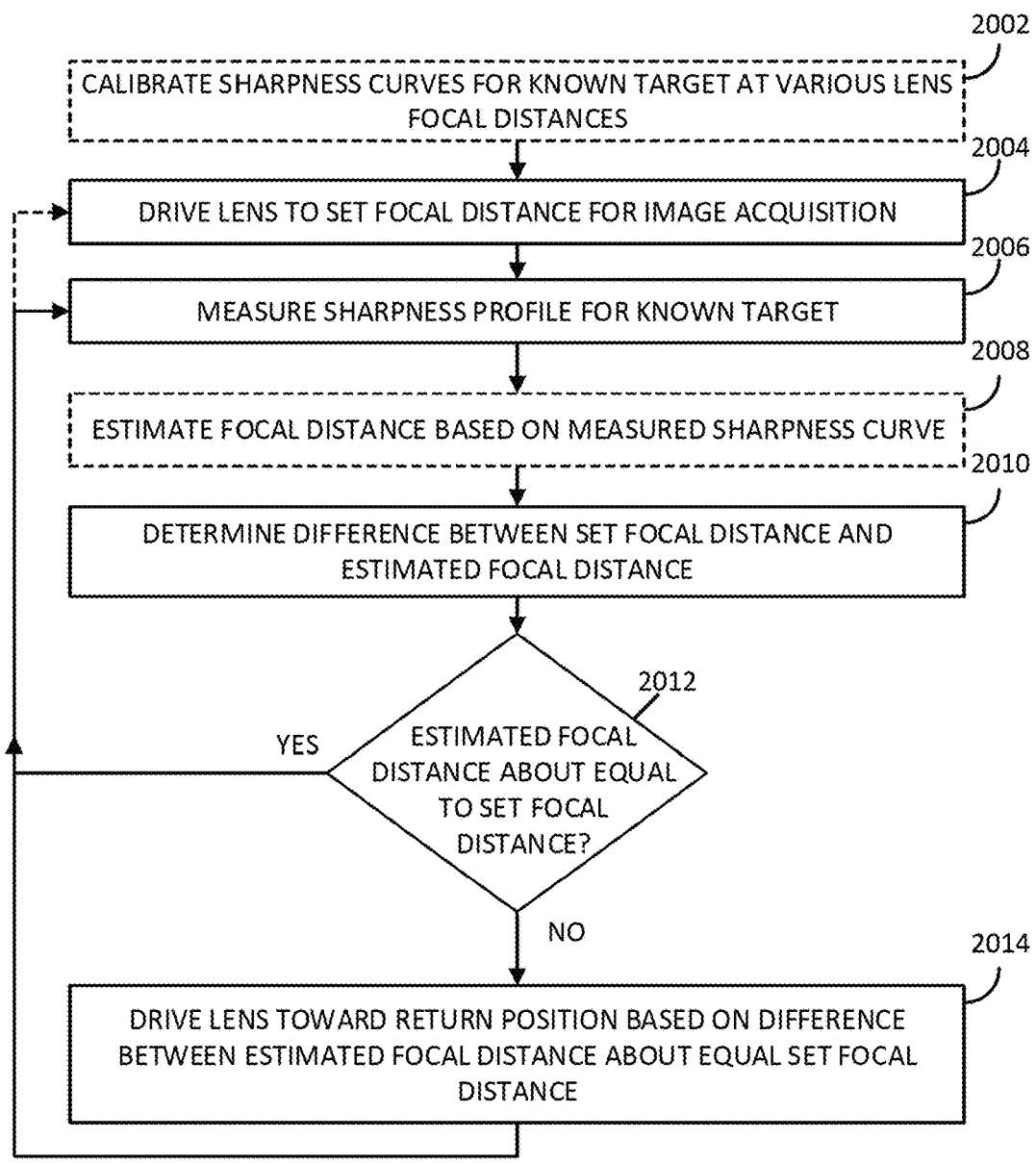
FIG. 20A is a flow chart of a method associated with controlling a focusing element susceptible to temperature effects using a patterned target at a known distance.

FIG. 20A is a flow chart of a method associated with controlling a focusing element susceptible to temperature effects using a patterned target at a known distance. Referring to FIG. 20A, a method 2000 is shown for controlling a focusing element susceptible to temperature effects using a patterned target at a known distance. At process block 2002, a processor executing at least a portion of method 2000 (e.g., the processor 50 and/or any other suitable processor) can calibrate sharpness curves for a known patterned target (e.g., the patterned target 1608, the patterned target 1710, the patterned target 1812, the patterned target 1912, the patterned target 1928, or the patterned target 1948) at various lens focal distances.

In some embodiments, the patterned target can be tilted with respect to the optical axis such that part of the patterned target is closer to the imaging device and another part of the patterned target is farther from the imaging device (e.g., as shown in FIGS. 16A, 17B, 19A, 19C, and 19D). In some such embodiments, the processor can drive the variable focus lens(es) to various focal distances (e.g., based on a calibration target, at a known temperature, etc.), and can estimate the sharpness of different portions of the patterned target (e.g., MTF, MTF50). The processor can use the estimated sharpness to generate a sharpness profile or profiles associated with the focal distance. The processor can record information about the sharpness profile and/or the sharpness profile itself for use in determining a focal distance of the imaging device based on an image of the patterned target.

Alternatively, in some embodiments, the patterned target can be flat with respect to the optical axis (e.g., as shown in FIG. 18). In some such embodiments, the processor can drive the variable focus lens(es) to various focal distances (e.g., based on a calibration target, at a known temperature, etc.), and can estimate the sharpness of the patterned target (e.g., MTF, MTF50). The processor can record information about the sharpness of the target for use in determining a focal distance of the imaging device based on sharpness of an image of the patterned target.

In some embodiments, process block 2002 can be omitted. For example, a sharpness profile of a tilted patterned target or a sharpness of a flat patterned target can be used as a source of feedback regardless of whether an explicit correlation between sharpness and focal distance is known. As described below, the processor can adjust a magnitude of a control signal (e.g., provided to the liquid lens) in response to changes in sharpness profile or sharpness, which can facilitate maintaining a stable sharpness profile or sharpness (and thereby maintaining a stable focal distance).

At process block 2004, a processor executing at least a portion of method 2000 (e.g., processor 50 and/or any other suitable processor) can drive a lens system to a set focal distance for image acquisition. For example, the processor can perform an autofocus algorithm to attempt to find a focal distance to use for image acquisition. As another example, the processor can set a predetermined focal distance (e.g., based on input received from an external source). In some embodiments, the processor can drive the lens system to a set focal distance using any suitable technique or combination of techniques. For example, the processor can provide a control signal to a liquid lens that causes the liquid lens to change shape and alter a focal distance of the lens system.

At process block 2006, a processor executing at least a portion of method 2000 (e.g., processor 50 and/or any other suitable processor) can estimate sharpness of a portion of an image captured by an imaging device (e.g., symbol reader 20, imaging device 1602, imaging device 1702, imaging device 1802, imaging device 1902), the portion of the image including a patterned target. In some embodiments, the processor can estimate sharpness of multiple portions of the patterned target. Alternatively, in some embodiments, the processor can estimate sharpness of the patterned target.

In some embodiments, the processor can generate a sharpness profile for the portion of the image corresponding to the patterned target at block 2006. In some embodiments, the processor can record the sharpness profile of the patterned target generated from a first image (e.g., using memory 56) as a reference sharpness profile, and can use sharpness profiles patterned target generated from subsequently captured images (e.g., in subsequent control loops) to determine whether the lens system has drifted from the initial focal distance.

At process block 2008, a processor executing at least a portion of method 2000 (e.g., processor 50 and/or any other suitable processor) can estimate a current focal distance based on the measured sharpness curve. For example, the processor can determine a position of a maximum of the sharpness profile (e.g., a location of a maximum in an MTF50 profile) and can determine a focal distance associated with the location of the maximum. As another example, the processor can determine a sharpness for the patterned target (e.g., an MTF50 of the portion of the image representing the patterned target) and can determine a focal distance associated with the sharpness.

In some embodiments, process block 2008 can be omitted. For example, information derived from sharpness profiles of a patterned target can be used to determine whether a current focus has changed, a direction of a change, and/or a magnitude of the change. As described below, the processor can adjust a magnitude of a control signal (e.g., provided to the liquid lens) in response to changes in sharpness profile or sharpness, which can facilitate maintaining a stable sharpness profile or sharpness (and thereby maintaining a stable focal distance) with or without explicitly estimating a current focal distance.

At process block 2010, a processor executing at least a portion of method 2000 (e.g., processor 50 and/or any other suitable processor) can determine a difference between a set focal distance (e.g., the focal distance to which the lens was driven at 2004) and a current estimated focal distance using any suitable technique or combination of techniques. For example, the processor can calculate a difference between the current position of a maximum of a sharpness profile and the initial position of the maximum of the sharpness profile. In such an example, a difference in a position of a maximum and/or a difference in a shape of the sharpness profile can indicate that an optical power of the liquid lens (and/or other components of the lens assembly, such as the lens assembly 1604) has changed (e.g., if the control signal has been maintained at a relatively constant value). As another example, the processor can calculate a difference between the current sharpness (e.g., MTF50) of the patterned target and the initial sharpness of the patterned target (e.g., when the patterned target is perpendicular to the optical axis, the pattern can be characterized by a single sharpness value). In such an example, a difference in a current sharpness and an initial sharpness can indicate that an optical power of the liquid lens (and/or other components of the lens assembly, such as the lens assembly 1604) has changed (e.g., if the control signal has been maintained at a relatively constant value). As yet another example, the processor can calculate a difference between the current estimated focal distance and the initial focal distance.

At decision block 2012, a processor executing at least a portion of method 2000 (e.g., processor 50 and/or any other suitable processor) can determine whether the estimated focal distance is about equal to the set focal distance (e.g., within a threshold). In some embodiments, the processor can determine whether the estimated focal distance has changed by at least a threshold amount. For example, a threshold for a liquid lens that is adjustable in discrete steps can be a change that is smaller than the smallest step size can be disregarded.

If the processor determines that the focal distance is about the same ("YES" at 2012), the method 2000 can return to process block 2006. In some embodiments, the method can measure a sharpness profile at 2006 periodically (e.g., at regular and/or irregular intervals). For example, after the processor determines that the focal distance is about the same at decision block 2012, the processor can wait a predetermined amount of time before returning to 2006. In some embodiments, if the processor (e.g., processor 50 and/or any other suitable processor) has caused a change in focal distance, the method 2000 can return to 2004 to drive the lens system to the appropriate focal distance.

Otherwise, if the processor determines that the focal distance is not the same ("NO" at 2012), the method 2000 can move to process block 2014. At process block 2014, the processor can drive the lens system toward a return position (e.g., the set focal distance) based on the difference between the current focal distance and the set focal distance determined at block 2010. For example, the processor can change a magnitude of a control signal in a direction that causes the lens system to move back toward the return position. As described below in connection with FIG. 21, the difference determined at 2010 can be used to generate a feedback signal that causes the value of the control signal to change.

After driving the lens to the return position, the method 2000 can return to 2006. In some embodiments, the method 2000 can return to process block 2006 after a predetermined amount of time has elapsed since a sharpness profile or sharpness of the patterned target has been generated. Additionally or alternatively, in some embodiments, if the processor determines that the focal distance is not the same ("NO" at 2012), the method 2000 can cause a further action to be performed (e.g., an action related to a self-diagnosis function). For example, the processor can record an indication that the optical power changed and/or can record a magnitude of the change. As another example, the processor can cause an indication to be presented that maintenance may be required to correct a change in optical power. In such an example, a record of changes in optical power over time can be used (e.g., by a technician) to determine whether maintenance is called for.

Figure 20B:
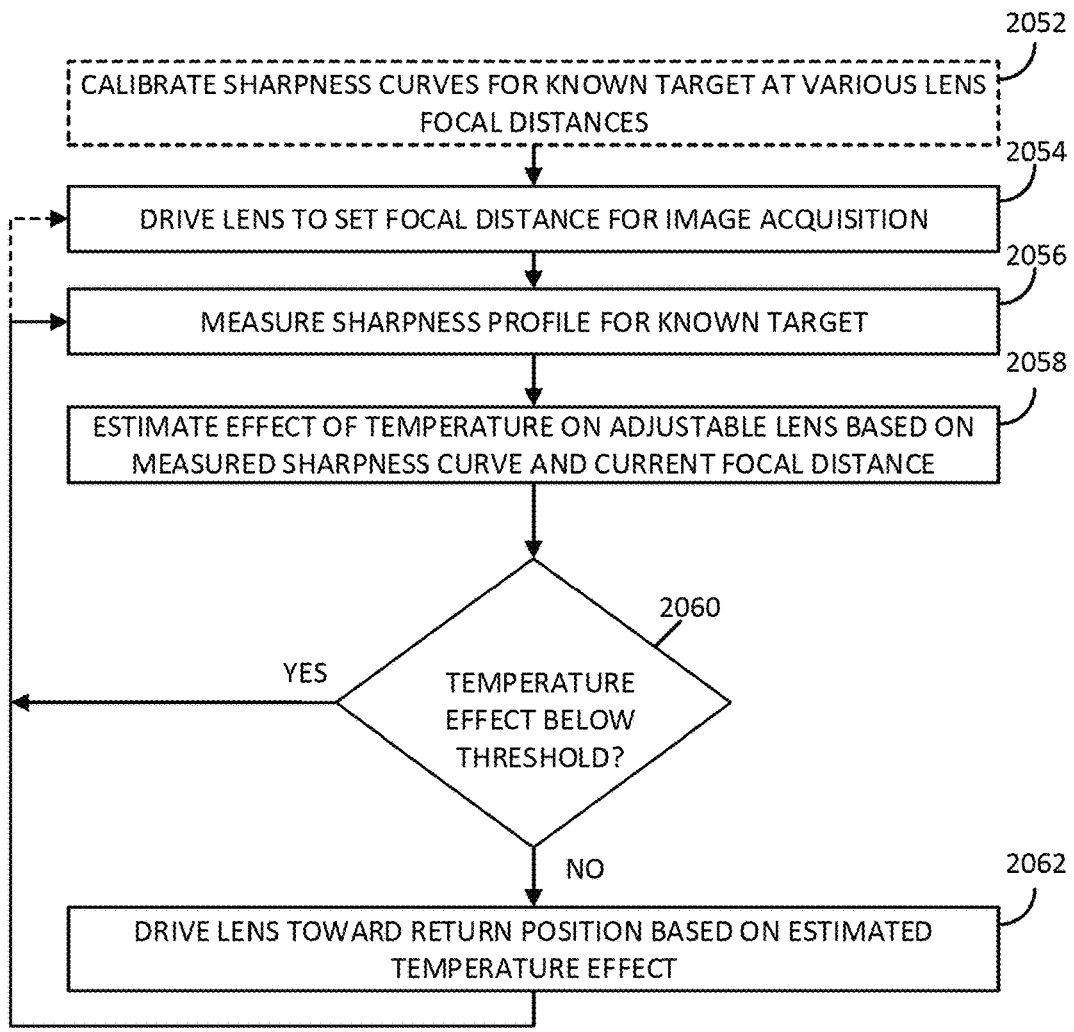
FIG. 20B is a flow chart of another method associated with controlling a focusing element susceptible to temperature effects using a patterned target at a known distance.

FIG. 20B is a flow chart of another method associated with controlling a focusing element susceptible to temperature effects using a patterned target at a known distance. Referring to FIG. 20B, a method 2050 is shown for controlling a focusing element susceptible to temperature effects using a patterned target at a known distance. At process block 2052, a processor executing at least a portion of method 2050 (e.g., the processor 50 and/or any other suitable processor) can calibrate sharpness curves for a known patterned target (e.g., the patterned target 1608, the patterned target 1710, the patterned target 1812, the patterned target 1912, the patterned target 1928, or the patterned target 1948) at various lens focal distances and/or various lens temperatures.

In some embodiments, the patterned target can be tilted with respect to the optical axis such that part of the patterned target is closer to the imaging device and another part of the patterned target is farther from the imaging device (e.g., as shown in FIGS. 16A, 17B, 19A, 19C, and 19D). In some such embodiments, the processor can drive the variable focus lens(es) to various focal distances (e.g., based on a calibration target, at a known temperature, etc.) and/or temperatures by applying control signals of particular magnitudes and/or by heating or cooling the lens to a particular temperature, and can estimate the sharpness of different portions of the patterned target (e.g., MTF, MTF50). The processor can use the estimated sharpness to generate a sharpness profile or profiles associated with the magnitude of the control signal and/or temperature. The processor can record information about the sharpness profile and/or the sharpness profile itself for use in estimating a temperature of the lens and/or a temperature effect based on an image of the patterned target.

Alternatively, in some embodiments, the patterned target can be flat with respect to the optical axis (e.g., as shown in FIG. 18). In some such embodiments, the processor can drive the variable focus lens(es) to various focal distances (e.g., based on a calibration target, at a known temperature, etc.) and/or temperatures by applying control signals of particular magnitudes and/or by heating or cooling the lens to a particular temperature, and can estimate the sharpness of the patterned target (e.g., MTF, MTF50). The processor can record information about the sharpness of the target for use in estimating a temperature of the lens and/or a temperature effect based on an image of the patterned target.

As described below, the processor can adjust a magnitude of a control signal (e.g., provided to the liquid lens) in response to an estimated temperature effect derived from a sharpness profile or sharpness of a patterned target, which can facilitate adjustments to account for temperature drift (and thereby maintaining a more accurate focal distance).

At process block 2054, a processor executing at least a portion of method 2050 (e.g., processor 50 and/or any other suitable processor) can drive a lens system to a set focal distance for image acquisition. For example, the processor can perform an autofocus algorithm to attempt to find a focal distance to use for image acquisition. As another example, the processor can set a predetermined focal distance (e.g., based on input received from an external source). In some embodiments, the processor can drive the lens system to a set focal distance using any suitable technique or combination of techniques. For example, the processor can provide a control signal to a liquid lens that causes the liquid lens to change shape and alter a focal distance of the lens system.

At process block 2056, a processor executing at least a portion of method 2050 (e.g., processor 50 and/or any other suitable processor) can estimate a temperature of the lens and/or a temperature effect caused by the current temperature of the lens based on a sharpness of a portion of an image captured by an imaging device (e.g., symbol reader 20, imaging device 1602, imaging device 1702, imaging device 1802, imaging device 1902), the portion of the image including a patterned target. In some embodiments, the processor can estimate sharpness of multiple portions of the patterned target. Alternatively, in some embodiments, the processor can estimate sharpness of the patterned target.

In some embodiments, the processor can generate a sharpness profile for the portion of the image corresponding to the patterned target at block 2056. In some embodiments, the processor can record the sharpness profile of the patterned target generated from a first image (e.g., using memory 56) as a reference sharpness profile, and can use sharpness profiles of the patterned target generated from subsequently captured images (e.g., in subsequent control loops) to estimate a temperature and/or temperature effect to calculate a corrected control signal to apply to the adjustable focal length lens.

At process block 2058, a processor executing at least a portion of method 2050 (e.g., processor 50 and/or any other suitable processor) can estimate a current temperature and/or effect of temperature on the adjustable focal length lens based on the measured sharpness curve. For example, the processor can determine a position of a maximum of the sharpness profile (e.g., a location of a maximum in an MTF50 profile) and can determine an estimated temperature and/or effect of temperature based on the control signal and the location of the maximum. As another example, the processor can determine a sharpness for the patterned target (e.g., an MTF50 of the portion of the image representing the patterned target) and can determine an estimated temperature and/or effect of temperature based on the control signal and the sharpness.

At decision block 2060, a processor executing at least a portion of method 2050 (e.g., processor 50 and/or any other suitable processor) can determine whether a temperature effect is below a threshold using any suitable technique or combination of techniques. For example, the processor can calculate a value of an adjusted control signal to apply to the adjustable focal length lens to achieve the set focal distance based on the estimated temperature and/or estimated temperature effect, and determine whether the difference between the adjusted control signal and the control signal applied at 2054 is below a threshold.

If the processor determines that the temperature effect is below a threshold ("YES" at 2060), the method 2050 can return to process block 2056. In some embodiments, the method can measure a sharpness profile at 2056 periodically (e.g., at regular and/or irregular intervals). For example, after the processor determines that the temperature effect is below a threshold at decision block 2060, the processor can wait a predetermined amount of time before returning to 2056. In some embodiments, if the processor (e.g., processor 50 and/or any other suitable processor) has caused a change in focal distance, the method 2050 can return to 2054 to drive the lens system to the appropriate focal distance.

Otherwise, if the processor determines that the focal distance is not the same ("NO" at 2060), the method 2050 can move to process block 2062. At process block 2062, the processor can drive the lens system to a return position (e.g., the set focal distance) based on an adjusted control signal to correct for a temperature effect estimated at 2058. For example, the processor can change a magnitude of a control signal to a value that causes the lens system to move to the return position.

After driving the lens to the return position, the method 2050 can return to 2056. In some embodiments, the method 2050 can return to process block 2056 after a predetermined amount of time has elapsed since a sharpness profile or sharpness of the patterned target has been generated.

Figure 21:
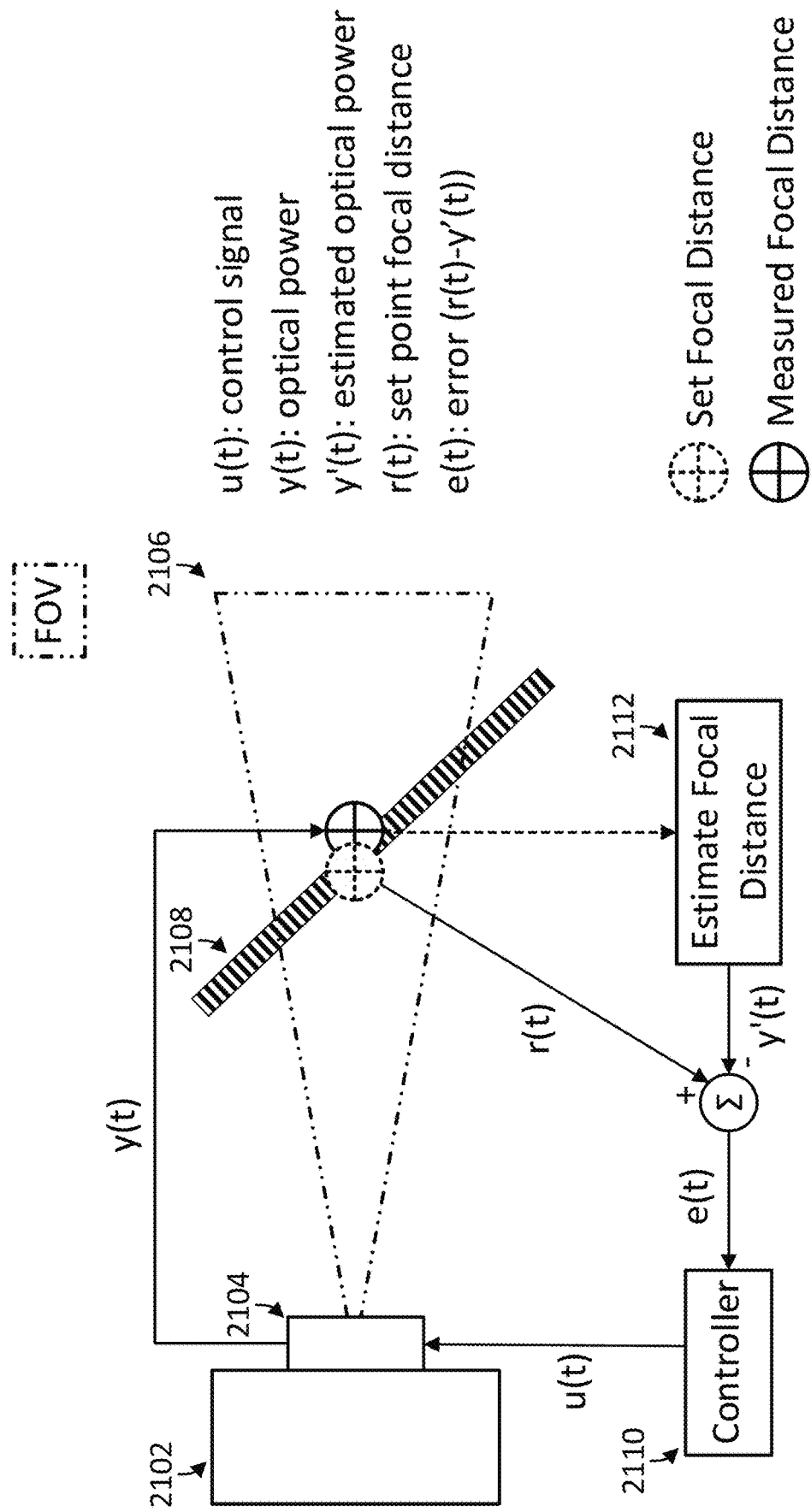
FIG. 21 is a top view conceptually illustrating feedback in a system for controlling a focusing element susceptible to temperature effects using a patterned target at a known distance.

FIG. 21 is a top view conceptually illustrating feedback in a system for controlling a focusing element susceptible to temperature effects using a patterned target at a known distance. FIG. 21 shows an example of an imaging device 2102 (e.g., the symbol reader 20) having a lens assembly 2104 (e.g., including the lens housing 40 and the adjustable focal length lens 36) which can have a field of view 2106 positioned to include a patterned target 2108. In some embodiments, a controller 2110 (e.g., implemented by the processor 50 or provided as a separate controller) can provide a control signal u(t) (e.g., control signal 64) to an adjustable focal length lens of the lens assembly 2104. As described above in connection with FIG. 1, the control signal can comprise a control current or a control voltage, and a focal length of the adjustable focal length lens can change based on the magnitude of the control signal u(t), which can impact the optical power y(t) of the lens assembly 2104.

In some embodiments, a signal r(t) can correspond to a nominal control value to drive the focal distance of the lens assembly to a set focal distance. For example, the imaging device can use a model and/or calibrated values to determine a control signal value r(t) for a particular focal distance. As another example, r(t) can be a control signal value when a focal distance of the imaging assembly is initially set (e.g., at 2004).

In some embodiments, the optical power y(t) can drift over time (e.g., due to changes in the temperature of the adjustable focal length lens), such that the current focal distance shifts away from the set focal distance. For example, initially the optical power y(t) can reflect the control signal value r(t), and y(t) can drift from r(t) as conditions change (e.g., as temperature of the lens changes).

The imaging device can estimate a current focal distance at 2112 (e.g., via processor 50 and/or any other suitable processor) to generate an estimate y'(t) of the optical power. In some embodiments, a signal representing the estimated optical power y'(t) can be scaled to correspond to values of the control signal r(t).

The imaging device (e.g., via processor 50 and/or any other suitable processor) can compare the estimated optical power y'(t) to the set point focal distance r(t). For example, the processor can determine a difference between the set point focal distance r(t) and the estimated optical power y'(t), which can produce an error value e(t) that reflects the difference.

The imaging device (e.g., via processor 50 and/or any other suitable processor) can adjust the value of the control signal u(t) based on the error signal e(t) to drive the adjustable focal length lens back toward the set point focal distance. For example, the controller 2110 can use the error signal e(t) to adjust a value of the control signal u(t), which can cause the focal distance of the lens assembly 2104 to move toward the set focal distance.

Figure 22A:
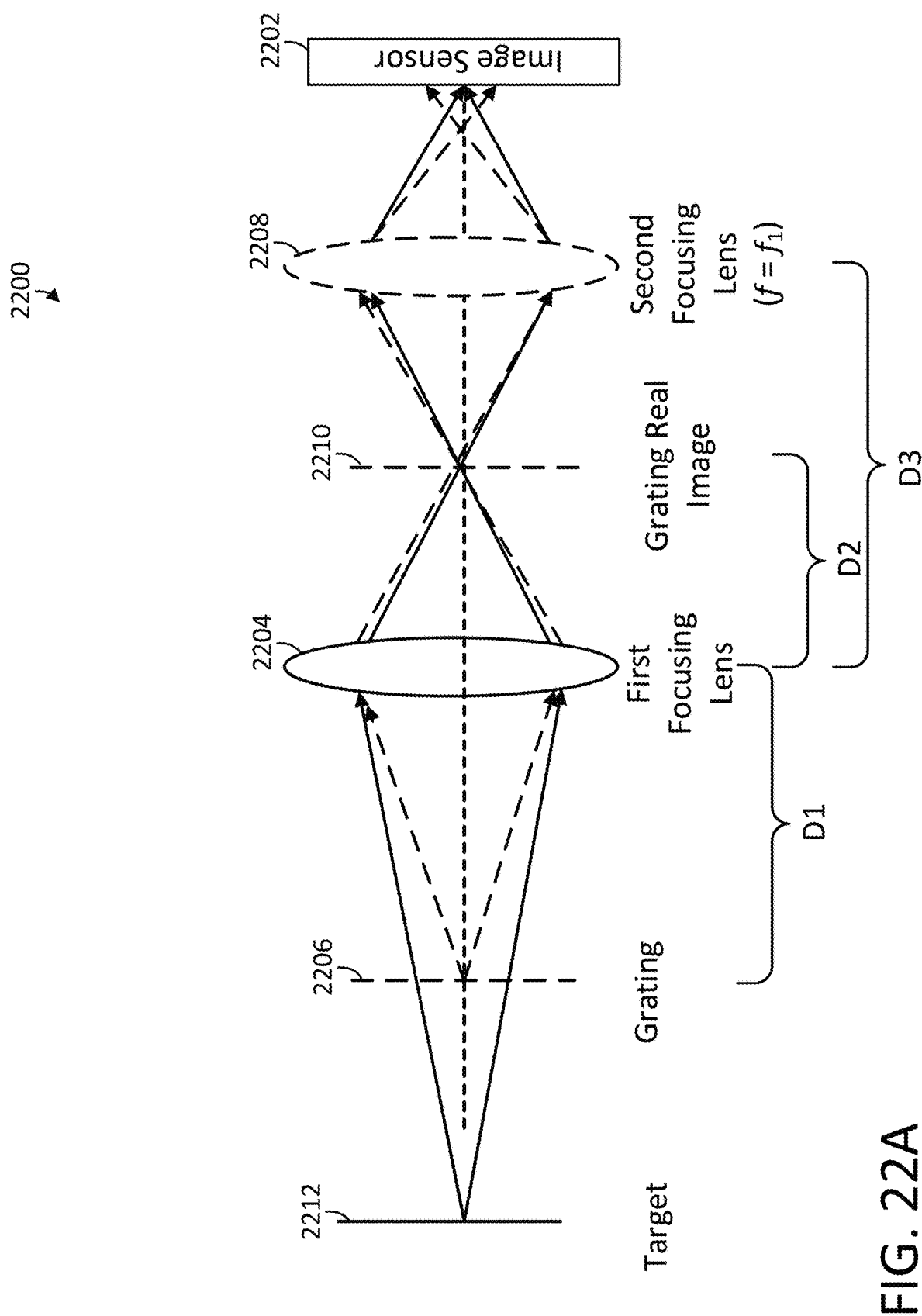
FIG. 22A is a side view illustrating an example of a system for estimating an impact of temperature on a focusing element susceptible to temperature effects using a patterned target at a known position within a lens system.
Figure 22B:
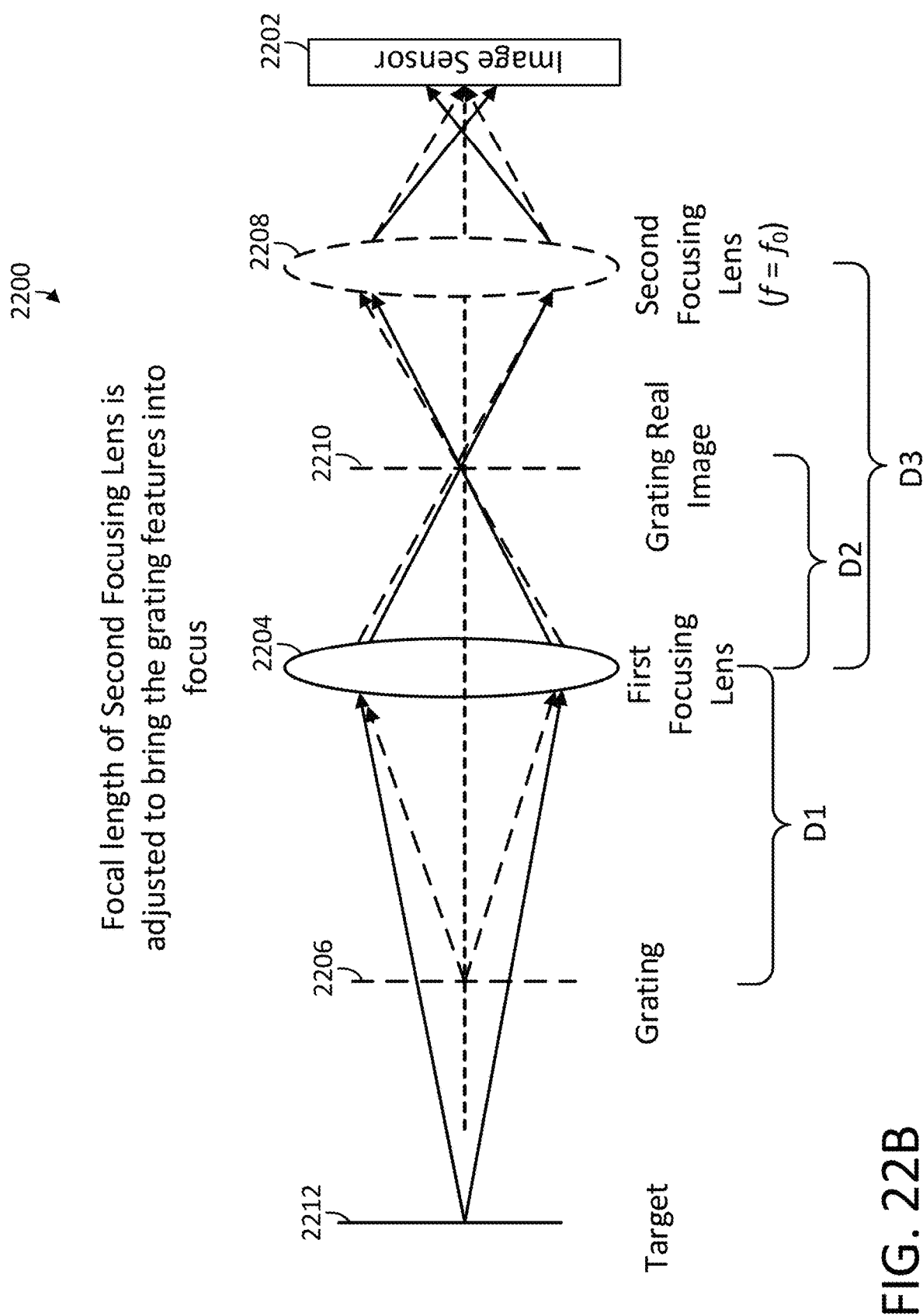
FIG. 22B is the side view of FIG. 22A in which the patterned target at the known position is brought into focus.

FIG. 22A is a side view illustrating an example of a system for estimating an impact of temperature on a focusing element susceptible to temperature effects using a patterned target at a known position within a lens system, and FIG. 22B is the side view of FIG. 22A in which the patterned target at the known position is brought into focus. FIG. 22A shows an example of a system 2200 that includes an image sensor 2202 (e.g., camera sensor 52, such as a CCD area sensor, a CMOS area sensor, etc.), a first focusing lens 2204, a grating 2206, and a second focusing lens 2208. In some embodiments, although not shown, the system 2200 can include additional optical elements (e.g., additional lenses) that cause an image of a target 2212 to be focused onto the image sensor 2202. In some embodiments, the second focusing lens 2208 can be an adjustable focal length lens (e.g., adjustable focal length lens 36) that is susceptible to temperature effects, such as a liquid lens described above in connection with FIGS. 1 to 6.

In some embodiments, the grating 2206 can be positioned between the target 2212 and the first focusing lens 2204 at a distance D1 from the first focusing lens 2204 such that the first focusing lens 2204 forms an intermediate image 2210 of the grating 2206 at a distance D2 from the first focusing lens 2204. The distances D1 can be fixed, and the distance D2 can vary if the optical power of the focusing lens 2204 changes. In some embodiments, the first focusing lens 2204 can be a lens that is subject to relatively low levels of drift due to variables such as temperature (e.g., a non-variable lens, such as a glass or plastic lens). Accordingly, the focal length of the first focusing lens 2204, and also the distance D2, can be relatively stable, while the focal length of the second lens 2208 can be more variable. The second focusing lens 2208 can be positioned a distance D3 from the first focusing lens 2204 and can be configured to focus the intermediate image 2210 onto the image sensor 2202. In some embodiments, the distances between the grating 2206, the first focusing lens 2204, the second focusing lens 2208, and the image sensor 2202 can be configured such that the intermediate image is sharply focused onto the image sensor 2202 at a particular optical power (e.g., corresponding to a particular focal length $f_0$ of the second lens 2208), and is less sharply focused when the optical power changes, which may be due to temperature changes of the second focusing lens 2208, or may be due to a driving signal applied to the second focusing lens 2208 to bring the target 2212 into focus (e.g., to a focal length $f_1$, as shown in FIG. 22A).

In some embodiments, the grating 2206 can be configured to form one or more features on the image sensor 2202. For example, the grating 2206 can be implemented using an optical grating (e.g., an amplitude grating implemented with chromium grating lines on glass, or a phase grating implemented using steps etched into glass). A processor (e.g., processor 50 and/or any other suitable processor) can analyze a portion of an image captured by image sensor 2202 to determine sharpness of the feature(s) formed by the grating 2206.

As described below in connection with FIG. 25, in some embodiments, system 2200 can use information derived from the image sensor 2202 to control an active lens component of second focusing lens 2208. For example, the processor 50 (or any other suitable processor) can receive an image output from image sensor 2202 when the second focusing lens 2208 is focused at a reference focal distance $f_0$ (e.g., a focal distance at which grating features were previously in-focus, a focal distance that results from a control signal at a reference level being provided to the liquid lens), and the processor 50 can determine whether the grating features are in-focus. If the grating features are not in focus, the processor 50 can perform an auto-focus algorithm to bring the grating features into focus. In some embodiments, when the grating features are in-focus, the processor 50 can determine a difference between a reference control signal and a current control signal, and can use the difference to adjust a control signal during operation to scan a target item positioned in a field of view of the image sensor 2202 (e.g., an item that includes a bar code, a QR code, or any other suitable type of machine readable code).

Figure 23:
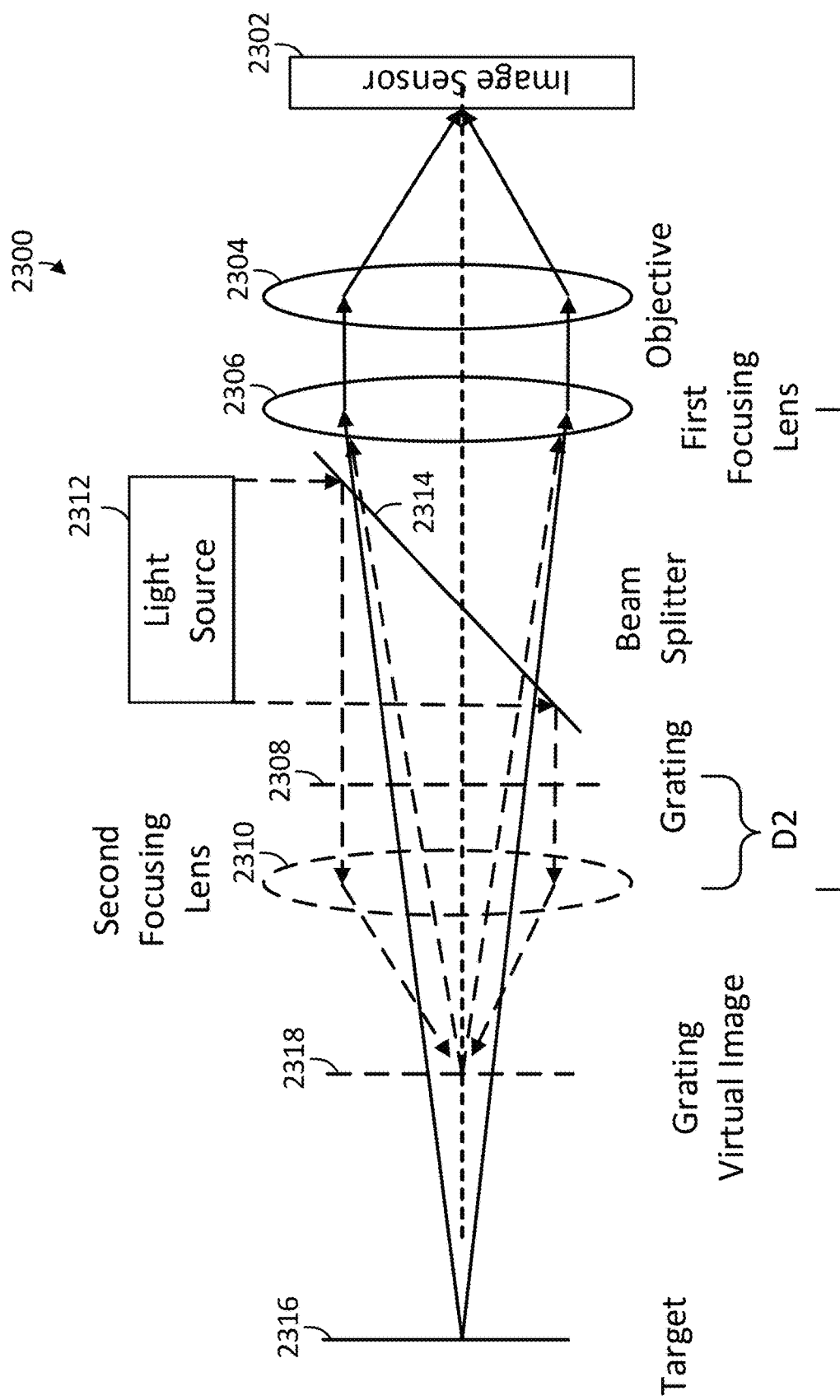
FIG. 23 is a side view illustrating another example of a system for estimating an impact of temperature on a focusing element susceptible to temperature effects using a patterned target at a known position within a lens system.

FIG. 23 is a side view illustrating another example of a system for estimating an impact of temperature on a focusing element susceptible to temperature effects using a patterned target at a known position within a lens system. FIG. 23 shows an example of a system 2300 that includes an image sensor 2302 (e.g., camera sensor 52, such as a CCD area sensor, a CMOS area sensor, etc.), an objective lens 2304, a first focusing lens 2306, a grating 2308, and a second focusing lens 2310.

In some embodiments, the system 2300 can include a light source 2312 that emits light toward an optical element 2314 that directs light from the light source 2314 toward the grating 2308, and transmits at least a portion of light received from a target 2316 to the image sensor 2302. For example, the optical element 2308 can be implemented using a beam splitter, a dichroic filter, a hot mirror, a cube beamsplitter, etc.

In some embodiments, although not shown, the system 2300 can include additional optical elements (e.g., additional lenses) that cause an image of a target 2316 to be focused onto the image sensor 2302. In some embodiments, the objective lens 2304 and the first focusing lens 2306 can be subject to relatively low levels of drift due to variables such as temperature (e.g., these lenses can be non-variable lenses, such as glass or plastic lenses),and the second focusing lens 2310 can be an adjustable focal length lens (e.g., adjustable focal length lens 36) that is susceptible to temperature effects, such as a liquid lens described above in connection with FIGS. 1 to 6. In some embodiments, the objective lens 2304 can be configured to focus light transmitted by the optical system (e.g., including the first focusing lens 2306, and the second focusing lens 2310) onto the image sensor 2302.

In some embodiments, the grating 2308 can be positioned between the optical element 2314 and the secondary lens 2310 at a distance D2 from the second focusing lens 2310 such that light from light source 2312 passes through the grating 2308 and is received by the second focusing lens 2310. The second focusing lens 2310 can reflect the light received from the light source 2312 via the grating 2308 to form a virtual image 2318 of the grating 2308 at an apparent distance D3 from the secondary lens 2310, where the distance D3 is based on the characteristics of the second focusing lens.

In some embodiments, the distances between the grating 2308, the first focusing lens 2306, and the second focusing lens 2310, and the image sensor 2302 can be configured such that the virtual image is sharply focused onto the image sensor 2302 at a particular optical power (e.g., a particular focal length of the second focusing lens 2310), and is less sharply focused when the optical power drifts (e.g., due to temperature changes of the second focusing lens 2310).

In some embodiments, the grating 2308 can be configured to form one or more features on the image sensor 2302. A processor (e.g., processor 50 and/or any other suitable processor) can analyze a portion of an image captured by image sensor 2302 to determine sharpness of the feature(s) formed by the grating 2308.

As described below in connection with FIG. 25, in some embodiments, system 2300 can use information derived from the image sensor 2302 to control an active lens component of the second focusing lens 2310. For example, the processor 50 (or any other suitable processor) can receive an image output from image sensor 2302 when lens system is focused at a reference focal distance (e.g., a focal distance at which grating features were previously in-focus, a focal distance that results from a control signal at a reference level being provided to the liquid lens), and the processor 50 can determine whether the grating features are in-focus. If the grating features are not in focus, the processor 50 can perform an auto-focus algorithm to bring the grating features into focus. In some embodiments, when the grating features are in-focus, the processor 50 can determine a difference between a reference control signal and a current control signal, and can use the difference to adjust a control signal during operation to scan a target item positioned in a field of view of the image sensor 2302 (e.g., an item that includes a bar code, a QR code, or any other suitable type of machine readable code).

Figure 24B:
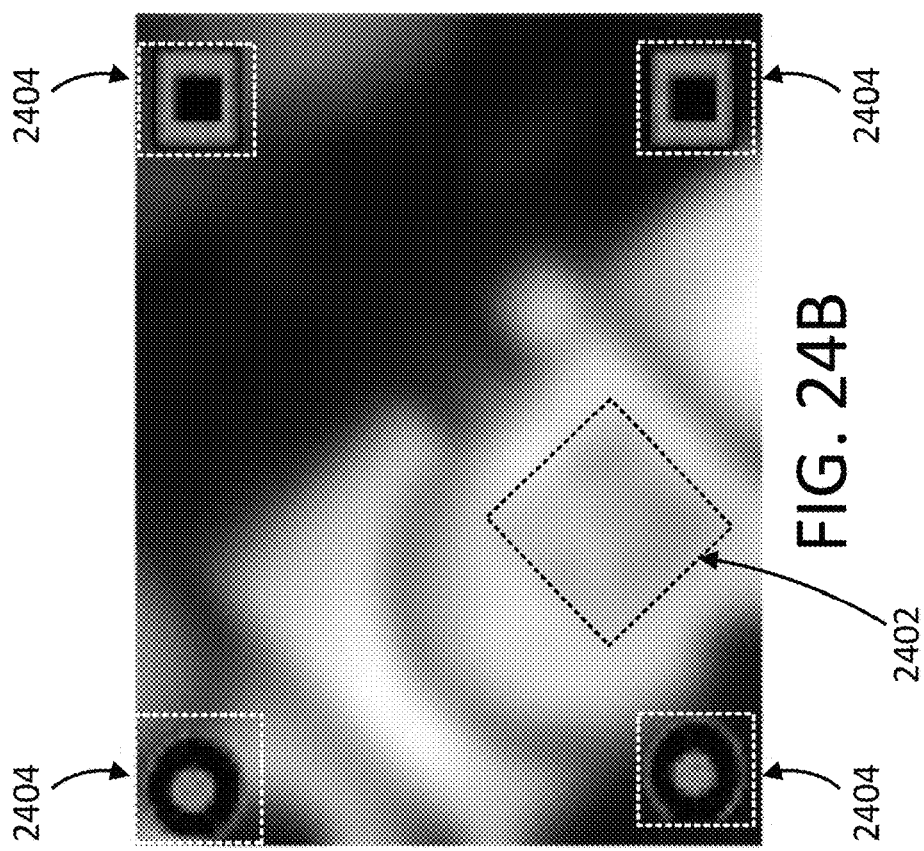
FIGS. 24A and 24B are examples images that include grating features that are out-of-focus and in-focus, respectively.
Figure 24A:
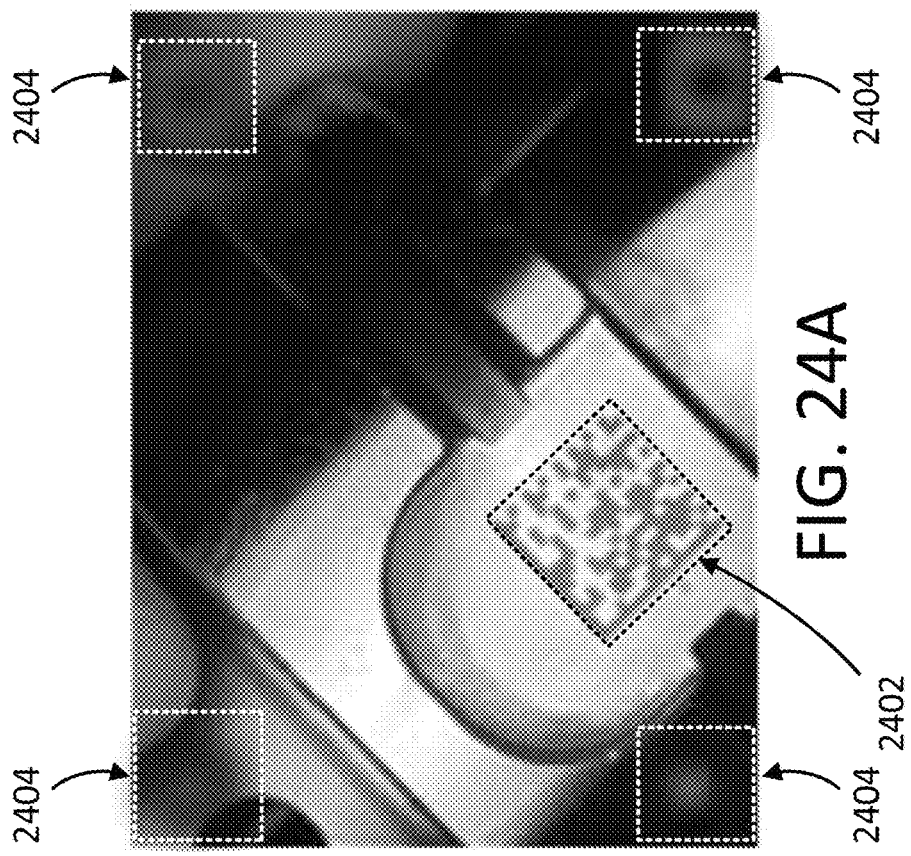

FIGS. 24A and 24B are examples images that include grating features that are out-of-focus and in-focus, respectively. FIG. 24A shows an example image of a target that includes a symbol 2402 (shown in black dashed lines) that is in-focus, and grating features 2404 (shown inside dashed white lines) that are out-of-focus. FIG. 24B shows an example image of the target that includes a symbol 2402 (shown in black dashed lines) that is out-of-focus, and grating features 2404 (shown inside dashed white lines) that are in-focus.

During an operation to scan a target item that may include a symbol (such as symbol 2402), such as a bar code, a QR code, or any other suitable type of machine readable code. As described above in connection with, for example, FIG. 16A, items may be moved through a field of view of an imaging device (e.g., the imaging device 2202 or imaging device 2302). It may be desirable to maintain a set focal distance that is expected to cause symbols (e.g., the symbol 2402) on items that pass through the field of view to be in-focus without repeatedly performing autofocusing for each item. As described above, a change in temperature of a liquid lens can affect the optical power of the liquid lens, and application of a control signal to the liquid lens can cause a change in temperature. Accordingly, if the imaging device repeatedly provides the same control signal it may cause the focal distance of the liquid lens to drift from a set focal distance. The imaging device can periodically cause grating features (e.g., the grating features 2404) to be brought into focus, and can determine a control signal value (e.g., a control current) that caused the grating features to be in-focus. As the optical power of the liquid lens changes (e.g., due to temperature changes), the control signal value that causes the grating features to be in-focus can change. The change in the control signal value that causes the grating features to be in-focus can be used to estimate a change control signal value that is expected to cause the liquid lens to focus at the set focal distance.

Figure 25:
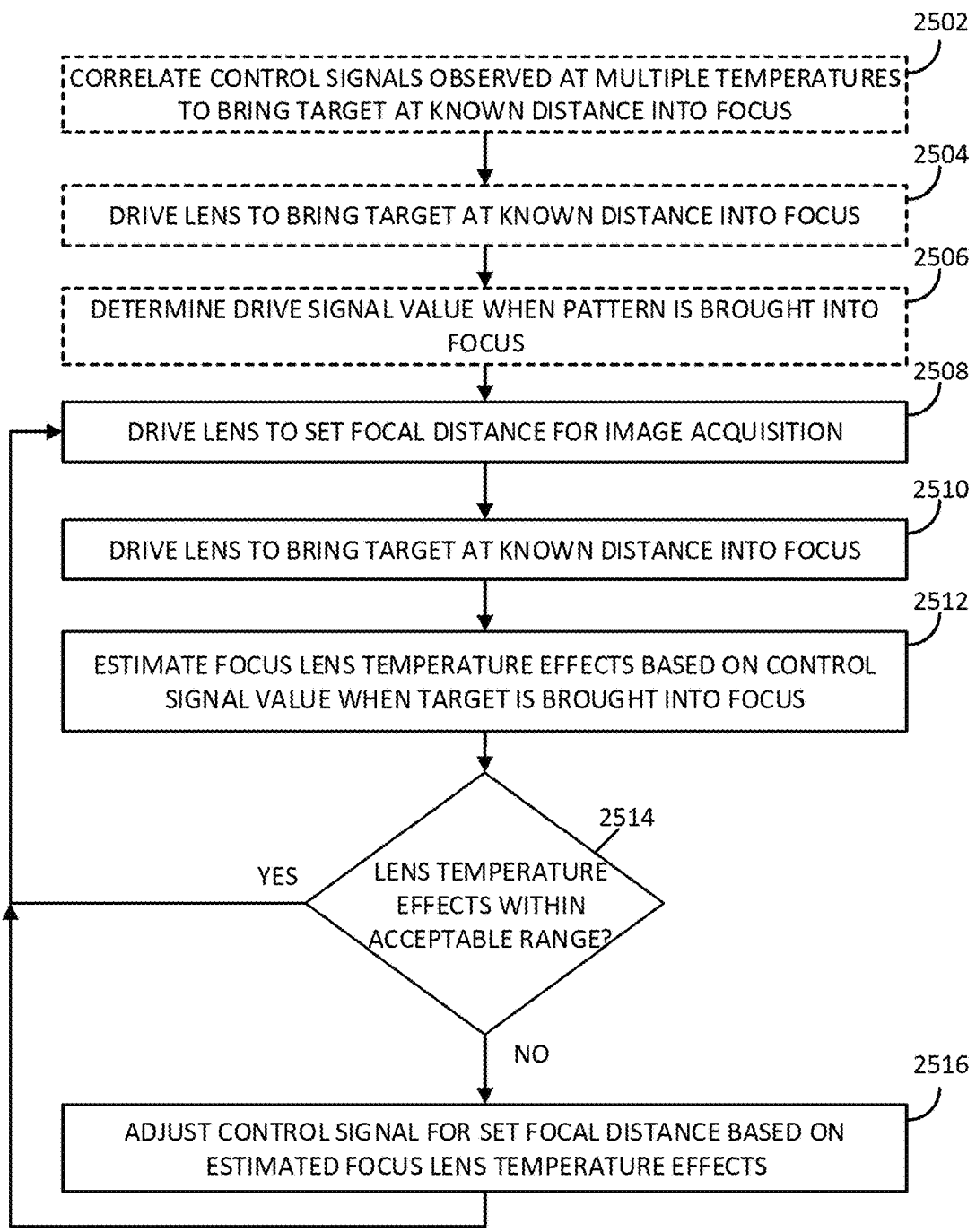
FIG. 25 is a flow chart of a method associated with controlling a focusing element susceptible to temperature effects based on an estimated impact of temperature on the focusing element.

FIG. 25 is a flow chart of a method associated with controlling a focusing element susceptible to temperature effects based on an estimated impact of temperature on the focusing element. Referring to FIG. 25, a method 2500 is shown for controlling a focusing element susceptible to temperature effects using a target at a known distance. At process block 2502, a processor executing at least a portion of method 2500 (e.g., the processor 50 and/or any other suitable processor) can measure a value of a control voltage when a target, a portion of a target, and/or multiple targets at a known distance (e.g., patterned target 1608, patterned target 1710, patterned target 1812, patterned target 1912, or grating features 2402) are brought into focus at various temperatures. For example, the temperature of a focusing element (e.g., a liquid lens) can be measured (e.g., using a temperature sensor) and the temperature can be adjusted using any suitable technique or combination of techniques.

In some embodiments, when the target is in-focus, the optical power of the lens(es) used to image the target is the same, but the value of the control signal varies. The value of the control signal that brings the target into focus at each temperature can be measured, and can be used to generate a model (e.g., a curve, a lookup table, an equation, etc.) relating lens temperature to control signal value at a constant optical power. The processor can record information about the control signal values that bring the target into focus at various lens temperatures for use in determining a temperature effect on the optical power based on a control signal value when the target at a known distance is brought into focus.

In some embodiments, process block 2502 can be omitted. For example, a control signal value can be used as a source of feedback regardless of whether an explicit correlation between control signal values and temperature is known. As described below, the processor can adjust a magnitude of a control signal (e.g., provided to the liquid lens) provided to drive a lens to a set focal distance in response to changes in a control signal value that brings the target at the known distance into focus.

At process block 2504, a processor executing at least a portion of method 2500 (e.g., the processor 50 and/or any other suitable processor) can drive a focusing element (e.g., a liquid lens) to bring the target at the known distance into focus. For example, the processor can drive the lens to bring the target at the known distance into focus using an autofocus algorithm that uses only image data corresponding to the target at the known distance. In such an example, the target can be brought into focus during an initialization of an imaging device.

At process block 2504, a processor executing at least a portion of method 2500 (e.g., the processor 50 and/or any other suitable processor) can determine a value of the control signal when the target at the known distance is brought into focus. In some embodiments, the processor can record the value of the control signal for use as a reference value that can be used to estimate the temperature effect on a lens. For example, if during operation the value of the control signal that brings the target at the known distance into focus increases, the processor can estimate that the temperature of the lens has increased.

In some embodiments, process blocks 2504 and 2506 can be omitted. For example, a control signal value can be used as a source of feedback based on calibration data and/or a model, which may or may not have been derived using an imaging device that is executing the method 2500.

At process block 2508, a processor executing at least a portion of method 2500 (e.g., processor 50 and/or any other suitable processor) can drive a lens system to a set focal distance for image acquisition. For example, the processor can perform an autofocus algorithm to attempt to find a focal distance to use for image acquisition. As another example, the processor can set a predetermined focal distance (e.g., based on input received from an external source). In some embodiments, the processor can drive the lens system to a set focal distance using any suitable technique or combination of techniques. For example, the processor can provide a control signal to a liquid lens that causes the liquid lens to change shape and alter a focal distance of the lens system.

At process block 2510, a processor executing at least a portion of method 2500 (e.g., processor 50 and/or any other suitable processor) can drive the lens system to bring the target at the known distance into focus. For example, the processor can drive the lens to bring the target at the known distance into focus using an autofocus algorithm that uses only image data corresponding to the target at the known distance.

At process block 2512, a processor executing at least a portion of method 2500 (e.g., processor 50 and/or any other suitable processor) can estimate focus lens temperature effects based on the control signal value when the target at the known distance is brought into focus at 2510. For example, the processor can compare the value of the control signal when the target at the known distance was brought into focus at 2510 to a reference value (e.g., determined at 2506). Based on the difference, the processor can determine whether the lens has been affected by temperature (and/or any other effect that can change the optical power of the liquid lens). As another example, the processor can compare the value of the control signal to calibration values to estimate a temperature of the lens. As yet another example, the processor can use a model of temperature effects and the value of the control signal to estimate a temperature of the lens. In such examples, the processor can use an estimated temperature (and/or estimated temperature effect) to estimate a control signal value to achieve a particular focal distance and/or optical power of the lens system (e.g., a set focal distance).

At decision block 2514, a processor executing at least a portion of method 2500 (e.g., processor 50 and/or any other suitable processor) can determine whether the lens temperature effects are within an acceptable range. For example, the processor can determine whether the difference between the reference control signal value (e.g., determined at 2506) and a control signal value determined at 2512 is within a threshold. For example, the threshold can be based on a smallest step size that can be used to adjust the focal length of the lens. In a more particular example, a difference that is smaller than the smallest step size that can be used to adjust the focal length can be disregarded. As another example, the processor can estimate a change in control signal value (e.g., from the value applied at 2508) needed to drive the lens to the set focal distance from a previous control signal value. In such an example, the processor can use an estimated temperature (e.g., estimated at 2512 based on calibration and/or a model) to estimate a value of a control signal to apply to the liquid lens to drive the lens system to the set focal distance. The processor can compare the estimated control signal value to a recently applied control signal value (e.g., applied when the imaging device attempted to scan an item). The processor can determine whether the difference between the estimated control signal value (e.g., determined at 2512) and a recent control signal value (e.g., applied at 2508) is within a threshold (e.g., based on a step size between focal lengths of the lens).

If the processor determines that the temperature effects are within an acceptable range ("YES" at 2514), the method 2500 can return to process block 2508. In some embodiments, the method can drive the lens to bring the target at the known distance into focus at 2510 periodically (e.g., at regular and/or irregular intervals). For example, after the processor determines that the estimated temperature effects are within an acceptable range at decision block 2514, the processor can wait a predetermined amount of time before moving to block 2510 from block 2508. In some embodiments, if the processor (e.g., processor 50 and/or any other suitable processor) has caused a change in focal distance, the method 2500 can return to 2508 to drive the lens system to the appropriate focal distance.

Otherwise, if the processor determines that the focal distance is not the same ("NO" at 2514), the method 2500 can move to process block 2516. At process block 2516, the processor can adjust a control signal value for the set focal distance based on the focus lens temperature effects estimated at block 2512. For example, the processor can change a magnitude of a control signal in a direction that compensates for a temperature-induced effect on the optical power of the focusing lens.

After adjusting the control signal value at block 2516, the method 2500 can return to 2508. In some embodiments, the method 2500 can wait a predetermined amount of time before moving to block 2510 from block 2508.

Although the present technology has been described with reference to preferred embodiments, workers skilled in the art will recognize that changes may be made in form and detail without departing from the spirit and scope of the technology. For example, the present technology is not limited to reducing temperature induced drift effects on a liquid lens used in a machine vision system, and may be practiced with other systems incorporating liquid lenses. For example, although a fixed-mount system is shown and described above, the machine vision system can be a hand-held system. In a hand-held system, the distance from the vision system to a symbol or character to be read can be known or determined, and under these circumstances, adjustment of the focus can, in some applications, be simplified.

The particular embodiments disclosed above are illustrative only, as the technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. A vision system comprising:
   an image sensor;
   an adjustable focus liquid lens having a field of view and an optical axis, a focus of the liquid lens being adjustable with a control signal applied to the liquid lens for capture of an image using the image sensor;
   a reflective filter disposed between the image sensor and the adjustable focus liquid lens, the reflective filter configured to reflect light in a first range of wavelengths, and transmit light in a second range of wavelengths;
   a light source configured to emit light within the first range of wavelengths;
   a second sensor; and
   an optical element configured to direct light emitted by the light source through the adjustable focus liquid lens toward the reflective filter, and direct light reflected by the reflective filter through the adjustable focus liquid lens toward the second sensor.

2. The vision system of claim 1, wherein the second sensor comprises an area sensor.

3. The vision system of claim 1, wherein the second sensor comprises a quadrant photodiode.

4. The vision system of claim 1, wherein the light source comprises a laser diode.

5. The vision system of claim 4, wherein the laser diode is operated below a lasing threshold associated with the laser diode.

6. The vision system of claim 1, wherein the first range of wavelengths includes infrared.

7. The vision system of claim 1, further comprising a processor that is configured to:
   receive output from the second sensor at a first time;
   receive output from the second sensor at a second time;
   determine a difference between a position of the light emitted by the light source at the first time and a position of the light emitted by the light source at the second time; and
   adjust the control signal applied to the liquid lens based on the difference.

8. The vision system of claim 1, wherein the optical element comprises a beam splitter configured to reflect light in at least a portion of the first range of wavelengths, and transmit light in at least a portion of the second range of wavelengths.

9. A vision system comprising:
   an imaging device comprising:
      an image sensor; and
      an adjustable focus liquid lens having a field of view and an optical axis, a focus of the liquid lens being adjustable with a control signal applied to the liquid lens for capture of an image using the image sensor; and
   a patterned target mechanically coupled to the imaging device, and positioned within the field of view of the adjustable focus liquid lens.

10. The vision system of claim 9, wherein a long axis of the patterned target is not perpendicular to the optical axis.

11. The vision system of claim 10, wherein the long axis of the patterned target is rotated in a range of about 10 degrees to about 80 degrees to the optical axis.

12. The vision system of claim 9, wherein a long axis of the patterned target is perpendicular to the optical axis.

13. The vision system of claim 9, wherein a center of the patterned target is positioned at a predetermined distance from the adjustable focus liquid lens.

14. The vision system of claim 13, wherein the predetermined distance is in a range of about 100 millimeters (mm) to about 2 meters (m).

15. The vision system of claim 14, wherein the predetermined distance is in a range of about 100 mm to about 300 mm.

16. The vision system of claim 14, wherein the predetermined distance is in a range of about 120 centimeters (cm) to about 180 cm.

17. The vision system of claim 9, wherein the patterned target includes a plurality of stripes.

18. The vision system of claim 17, wherein the plurality of stripes are not perpendicular to a long axis of the patterned target.

19. The vision system of claim 18, wherein the plurality of stripes are not parallel to the long axis of the patterned target.

20. The vision system of claim 9, further comprising:
   a mirror disposed along the optical axis between the adjustable focus liquid lens and the patterned target.

21. The vision system of claim 20, wherein the mirror is disposed at an angle to the optical axis.

22. The vision system of claim 20, wherein the imaging device is configured to scan for symbols using light in a first range of wavelengths, and wherein the pattern is provided to the image sensor in a second range of wavelengths.

23. The vision system of claim 22, wherein the first range of wavelengths includes red, and the second range of wavelengths excludes red.

24. The vision system of claim 22, wherein the first range of wavelengths excludes green, and the second range of wavelengths includes green.

25. The vision system of claim 9, wherein the imaging device is configured to:
   capture an image of the patterned target using the image sensor via the adjustable focal length liquid lens;
   determine a sharpness profile indicative of sharpness of different portions of the patterned target using the image; and
   adjust the control signal of the liquid lens based on the sharpness profile and a set focal distance.

26. The vision system of claim 25, wherein the sharpness profile is based on modulation transform function (MTF) 50.

27. The vision system of claim 9, wherein the imaging device is configured to:
   capture an image of the patterned target using the image sensor via the adjustable focal length liquid lens;
   determine a sharpness of the entire patterned target depicted in the image; and estimate a current focal distance of the liquid lens based on the sharpness.

28. The vision system of claim 9, wherein the imaging device is configured to:
- provide a control signal having a first value to the liquid lens, wherein the first value is associated with a set distance;
- perform an autofocus process using the patterned target;
- determine a second control signal value when the patterned target is in focus;
- adjust the first value of the liquid lens based on the determination of the second control signal value; and
- provide a control signal having the adjusted first value to the liquid lens such that the liquid lens is focused at the set focal distance.

29. A vision system comprising:
- an image sensor;
- a first lens having a field of view;
- an adjustable focus liquid lens positioned between a proximate side of the first lens and the image sensor, a focus of the liquid lens being adjustable with a control signal applied to the liquid lens for capture of an image using the image sensor;
- a grating positioned a predetermined distance from a distal side of the first lens,
  - wherein the grating is configured to generate an intermediate image comprising a plurality of grating features between the first lens and the adjustable focus liquid lens, the intermediate image is focused onto the image sensor by the adjustable focus liquid lens when an optical power of the adjustable focus liquid lens is a predetermined optical power, and is defocused when the optical power of the adjustable focus liquid lens diverges from the predetermined optical power.

30. A vision system comprising:
- an image sensor;
- a first lens;
- an adjustable focus liquid lens having a field of view and positioned on a distal side of the first lens, a focus of the liquid lens being adjustable with a control signal applied to the liquid lens for capture of an image using the image sensor;
- a light source;
- an optical element positioned between the first lens and the adjustable focus liquid lens, the optical element configured to direct at least a portion of light emitted by the light source toward the adjustable focus liquid lens, and transmit at least a portion of light received from the adjustable focus liquid lens;
- a grating positioned between the optical element and the adjustable focus liquid lens at a predetermined distance from a proximate side of the adjustable focus liquid lens,
  - wherein the grating is configured to generate a virtual image comprising a plurality of grating features, the virtual image is focused onto the image sensor by the first lens when the an optical power of the adjustable focus liquid lens is a predetermined optical power, and is defocused when the optical power of the adjustable focus liquid lens diverges from the predetermined optical power.

* * * * *